(12) United States Patent
Weber et al.

(10) Patent No.: US 7,149,854 B2
(45) Date of Patent: Dec. 12, 2006

(54) EXTERNAL LOCKING MECHANISM FOR PERSONAL COMPUTER MEMORY LOCATIONS

(75) Inventors: Frederick D. Weber, San Jose, CA (US); Dale E. Gulick, Austin, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 875 days.

(21) Appl. No.: 09/870,889

(22) Filed: May 30, 2001

(65) Prior Publication Data

US 2003/0041248 A1     Feb. 27, 2003

(51) Int. Cl.
G06F 12/00     (2006.01)

(52) U.S. Cl. ............... 711/152; 711/150; 711/151; 711/163; 711/164; 713/2; 713/183; 713/186; 713/320

(58) Field of Classification Search .......... 711/151, 711/150, 163, 1, 152; 713/1, 182; 365/185.04
See application file for complete search history.

(56) References Cited

U.S. PATENT DOCUMENTS

| | | | |
|---|---|---|---|
| 5,408,629 A | | 4/1995 | Tsuchiva et al. ............ 395/425 |
| 5,421,006 A | * | 5/1995 | Jablon et al. ................ 714/36 |
| 5,442,704 A | * | 8/1995 | Holtey ........................ 711/163 |
| 5,475,829 A | * | 12/1995 | Thome ........................ 711/152 |
| 5,537,540 A | * | 7/1996 | Miller et al. ................. 714/38 |
| 5,623,673 A | * | 4/1997 | Gephardt et al. ........... 710/260 |
| 5,682,310 A | * | 10/1997 | Pedneau et al. ............ 710/261 |
| 5,721,877 A | * | 2/1998 | Heflinger et al. ........... 711/163 |
| 5,850,559 A | * | 12/1998 | Angelo et al. .............. 713/320 |
| 5,944,821 A | * | 8/1999 | Angelo ........................ 726/22 |
| 6,026,016 A | * | 2/2000 | Gafken ..................... 365/185.04 |
| 6,122,732 A | | 9/2000 | Ahuja ........................... 713/1 |
| 6,154,819 A | | 11/2000 | Larsen et al. ............... 711/163 |
| 6,188,602 B1 | | 2/2001 | Alexander et al. ...... 365/185.04 |
| 6,816,925 B1 | * | 11/2004 | Watts, Jr. ..................... 710/36 |
| 2002/0004810 A1 | * | 1/2002 | Reneris ....................... 709/104 |

OTHER PUBLICATIONS

Intel, "Low Pin Count (LPC) Interface Specification Revision 1.0," pp. 1-31 (Sep. 29, 1997).
FIPS Pub 140-1 Federal Information Processing Standards Publication, "Security Requirements for Cryptographic Modules" (Jan. 11, 1994).
Intel, "Communication and Networking Riser Specification," Revision 1.0 (Feb. 7, 2000).
"Handbook of Applied Cryptography" CRC Press 1997 pp. 154-157, 160-161, 191-198, 203-212.
International Search Report PCT/US 02/11930 dated Apr. 17, 2002.

* cited by examiner

Primary Examiner—Mano Padmanabhan
Assistant Examiner—Mardochee Chery
(74) Attorney, Agent, or Firm—Williams, Morgan & Amerson

(57) ABSTRACT

A method and system for providing an external locking mechanism for memory locations. The memory includes a first plurality of storage locations configured with BIOS data and a second plurality of storage locations. The second plurality of storage locations includes a first plurality of blocks readable only in SMM and a second plurality of blocks readable in SMM and at least one operating mode other than SMM. The computer system includes a bus, a memory coupled to the bus, and a device coupled to access the memory over the bus. The memory includes a plurality of storage locations, divided into a plurality of memory units. The device includes one or more locks configured to control access to one or more of the plurality of memory units.

21 Claims, 73 Drawing Sheets

EXTERNAL LOCKING MECHANISM FOR PERSONAL COMPUTER MEMORY LOCATIONS

TECHNICAL FIELD

This invention relates generally to computing systems, and, more particularly, to an external locking mechanism for controlling access to memory locations, e.g. the ROM BIOS, in a personal computer system.

BACKGROUND ART

FIG. 1A illustrates an exemplary computer system 100. The computer system 100 includes a processor 102, a north bridge 104, memory 106, Advanced Graphics Port (AGP) memory 108, a Peripheral Component Interconnect (PCI) bus 110, a south bridge 112, a battery, an AT Attachment (ATA) interface 114 (more commonly known as an Integrated Drive Electronics (IDE) interface), a universal serial bus (USB) interface 116, a Low Pin Count (LPC) bus 118, an input/output controller chip (SuperI/O™) 120, and BIOS memory 122. It is noted that the north bridge 104 and the south bridge 112 may include only a single chip or a plurality of chips, leading to the collective term "chipset." It is also noted that other buses, devices, and/or subsystems may be included in the computer system 100 as desired, e.g. caches, modems, parallel or serial interfaces, SCSI interfaces, network interface cards, etc.

The processor 102 is coupled to the north bridge 104. The north bridge 104 provides an interface between the processor 102, the memory 106, the AGP memory 108, and the PCI bus 110. The south bridge 112 provides an interface between the PCI bus 110 and the peripherals, devices, and subsystems coupled to the IDE interface 114, the USB interface 116, and the LPC bus 118. The battery 113 is shown coupled to the south bridge 112. The Super I/O™ chip 120 is coupled to the LPC bus 118.

The north bridge 104 provides communications access between and/or among the processor 102, memory 106, the AGP memory 108, devices coupled to the PCI bus 110, and devices and subsystems coupled to the south bridge 112. Typically, removable peripheral devices are inserted into PCI "slots" (not shown) that connect to the PCI bus 110 to couple to the computer system 100. Alternatively, devices located on a motherboard may be directly connected to the PCI bus 110.

The south bridge 112 provides an interface between the PCI bus 110 and various devices and subsystems, such as a modem, a printer, keyboard, mouse, etc., which are generally coupled to the computer system 100 through the LPC bus 118 (or its predecessors, such as an X-bus or an ISA bus). The south bridge 112 includes the logic used to interface the devices to the rest of computer system 100 through the IDE interface 114, the USB interface 116, and the LPC bus 118.

FIG. 1B illustrates certain aspects of the prior art south bridge 112, including those provided reserve power by the battery 113, so-called "being inside the RTC battery well" 125. The south bridge 112 includes south bridge (SB) RAM 126 and a clock circuit 128, both inside the RTC battery well 125. The SB RAM 126 includes CMOS RAM 126A and RTC RAM 126B. The RTC RAM 126B includes clock data 129 and checksum data 127. The south bridge 112 also includes, outside the RTC battery well 125, a CPU interface 132, power and system management units 133, PCI bus interface logic 134A, USB interface logic 134C, IDE interface logic 134B, and LPC bus interface logic 134D.

Time and date data from the clock circuit 128 are stored as the clock data 129 in the RTC RAM 126B. The checksum data 127 in the RTC RAM 126B may be calculated based on the CMOS RAM 126A data and stored by BIOS during the boot process, such as is described below, e.g. block 148, with respect to FIG. 2A. The CPU interface 132 may include interrupt signal controllers and processor signal controllers. The power and system management units 133 may include an ACPI (Advanced Configuration and Power Interface) controller.

System Management Mode (SMM) is a mode of operation in the computer system that was implemented to conserve power. The SMM was created for the fourth generation x86 processors. As newer x86 generation processors have appeared, the SMM has become relatively transparent to the operating system. That is, computer systems enter and leave the SMM with little or no impact on the operating system.

Referring now to the drawings, and in particular to FIG. 2A, a flowchart of a prior art method of initializing a computer system using code stored in the BIOS 122 is shown. During initialization of the power supply, the power supply generates a power good signal to the north bridge, in block 136. Upon receiving the power good signal from the power supply, the south bridge (or north bridge) stops asserting the reset signal for the processor, in block 138.

During initialization, the processor reads the default jump location in block 140. The default jump location in memory is usually at a location such as FFFF0h. The processor performs a jump to the appropriate BIOS code location (e.g. FFFF0h) in the ROM BIOS, copies the BIOS code to the RAM memory, and begins possessing the BIOS code instructions from the RAM memory, in block 142. The BIOS code, processed by the processor, performs a power-on self test (POST), in block 144.

The BIOS code next looks for additional BIOS code, such as from a video controller, IDE controller, SCSI controller, etc. and displays a start-up information screen, in block 146. As examples, the video controller BIOS is often found at C000h, while the IDE controller BIOS code is often found at C800h. The BIOS code may perform additional system tests, such as a RAM memory count-up test, and a system inventory, including identifying COM (serial) and LPT (parallel) ports, in block 148. The BIOS code also identifies plug-and-play devices and other similar devices and then displays a summary screen of devices identified, in block 150.

The BIOS code identifies the boot location, and the corresponding boot sector, in block 152. The boot location may be on a floppy drive, a hard drive, a CDROM, a remote location, etc. The BIOS code next calls the boot sector code at the boot location to boot the computer system, such as with an operating system, in block 154.

It is noted that for a cold boot or a hard (re)boot, all or most of the descriptions given in blocks 136–154 may occur. During a warm boot or a soft (re)boot the BIOS code usually jumps from block 142 into block 148, skipping the POST, memory tests, etc.

In FIG. 2B, a flowchart of a prior art method of operating a computer system in SMM using code stored in the BIOS 122 is shown. An interrupt controller receives a request for SMM, in block 172. The interrupt controller signals the request for SMM to the processor by asserting a system management interrupt (SMI#) signal, in block 174.

The processor recognizes the request for SMM and asserts an SMI ACTive (SMIACT#) signal, in block 176. The system recognizes the SMIACT# signal, disables access to the system RAM, and enables access to system management RAM (SMRAM) space, in block 178.

The current processor state is saved to SMRAM, in block 180. The processor resets to the SMM default state and enters SMM, in block 182. The processor next reads the default pointer and jumps to the appropriate place in SMRAM space, in block 184. In block 186, the source and/or nature of the SMI request is identified.

An SMI handler services the SMI request, in block 188. After servicing the SMI request, the SMI handler issues a return from SMM (RSM) instruction to the processor, in block 190. Upon operating on the RSM instruction, the processor restores the saved state information and continues normal operation, in block 192.

From a hardware point of view, an x86 operating environment provides little for protecting user privacy, providing security for corporate secrets and assets, or protecting the ownership rights of content providers. All of these goals, privacy, security, and ownership (collectively, PSO) are becoming critical in an age of Internet-connected computers. The original personal computers were not designed in anticipation of PSO needs.

From a software point of view, the x86 operating environment is equally poor for PSO. The ease of direct access to the hardware through software or simply by opening the cover of the personal computer allows an intruder or thief to compromise most security software and devices. The personal computer's exemplary ease of use only adds to the problems for PSO.

DISCLOSURE OF INVENTION

In one aspect of the present invention, a computer system is provided. The computer system includes a bus, a memory coupled to the bus, and a device coupled to access the memory over the bus. The memory includes a plurality of storage locations, divided into a plurality of memory units. The device includes one or more locks configured to control access to one or more of the plurality of memory units. In various embodiments, the locks may include a plurality of registers. One or more entries in one or more of the plurality of registers may indicate an access control setting for one or more of the memory units.

In another aspect of the present invention, a memory is provided. The memory includes a first plurality of storage locations configured with BIOS data; and a second plurality of storage locations. The second plurality of storage locations includes a first plurality of blocks readable only in SMM and a second plurality of blocks readable in SMM and at least one operating mode other than SMM.

In still another aspect of the present invention, a method for operating a computer system is provided. The method includes requesting a memory transaction for one or more memory addresses and determining a lock status for the one or more memory addresses. The method also includes returning the lock status for the one or more memory addresses and determining if the lock status for the one or more memory addresses can be changed if the lock status indicates that the memory transaction for the one or more memory addresses is not allowed. The method also includes changing the lock status of the one or more memory addresses to allow the memory transaction if the lock status of the one or more memory addresses can be changed.

In still another aspect of the present invention, another method of operating a computer system is provided. This method includes issuing a request from a first device for a memory transaction for a memory location and receiving the request for the memory transaction at a second device that does not include the memory location or a copy of the contents of the memory location. This method also includes returning a response from the second device to the first device issuing the request for the memory transaction.

BRIEF DESCRIPTION OF THE DRAWINGS

The invention may be understood by reference to the following description taken in conjunction with the accompanying drawings, in which like reference numerals identify similar elements, and in which:

FIG. 1A illustrates a block diagram of a prior art computer system, while

FIGS. 9A, 9B, 9C, 9D, 9E, 9F, and 9G illustrate flowcharts of embodiments of methods for accessing the security hardware, which may be locked, according to various aspects of the present invention;

FIGS. 10A, 10B, and 10C illustrate block diagrams of embodiments of the access locks 460 shown in FIG. 6, while FIG. 10D illustrates a block diagram of an embodiment of the override register, all according to various aspects of the present invention.

Figure 1A:
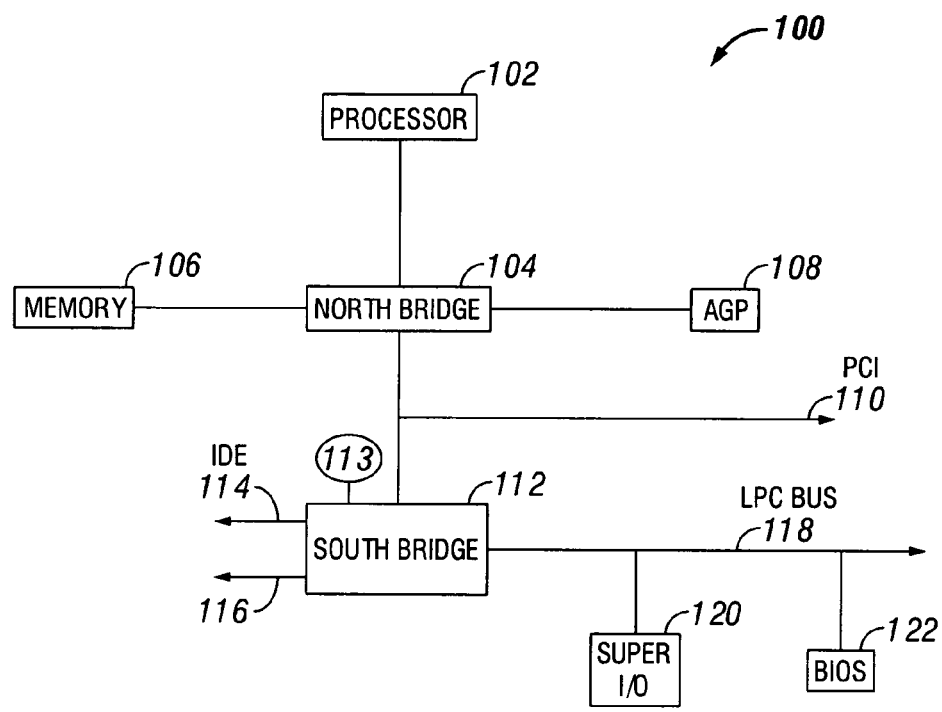
Figure 1B:
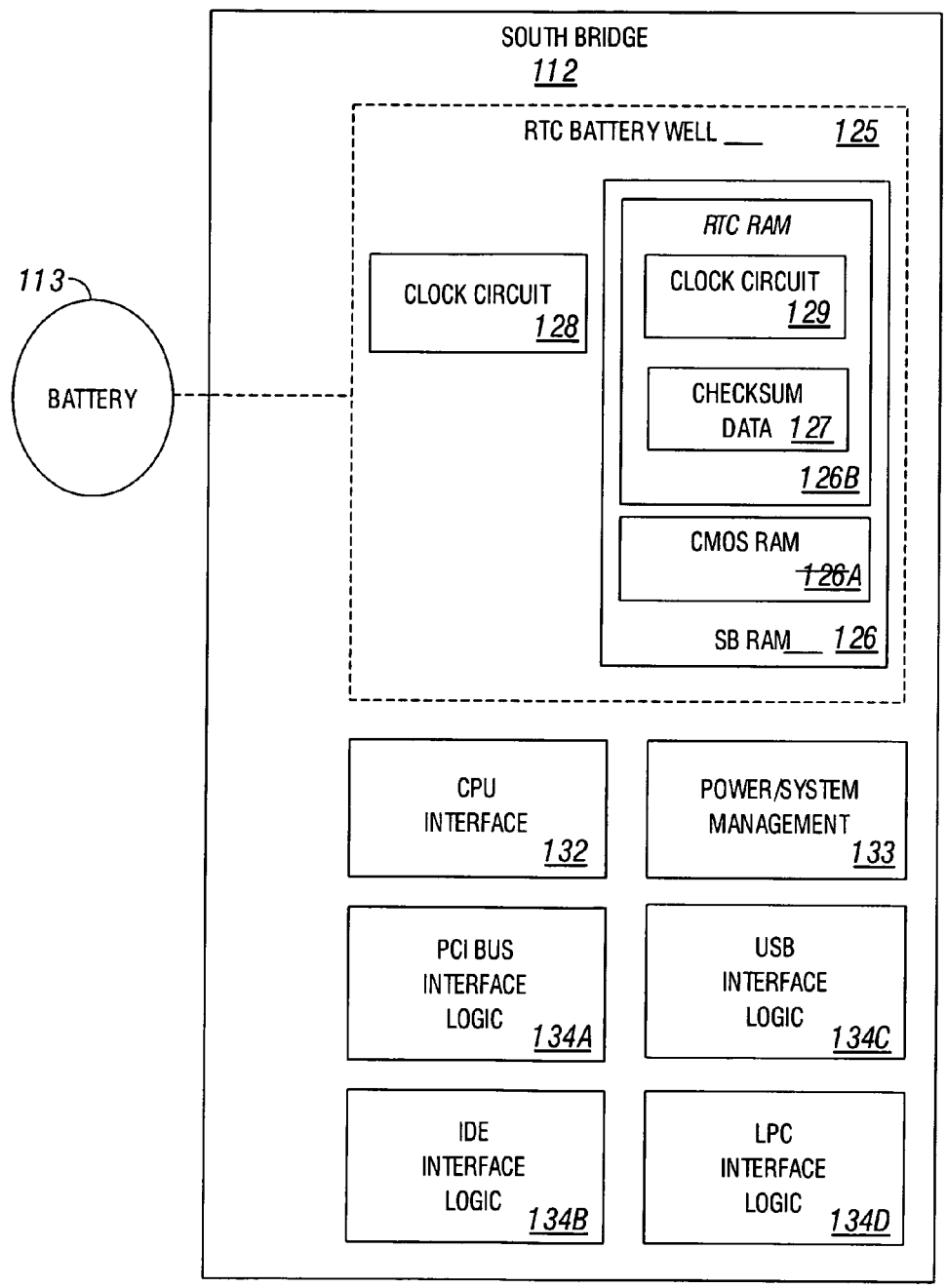
FIG. 1B illustrates a block diagram of a prior art south bridge.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

MODE(S) FOR CARRYING OUT THE INVENTION

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The use of a letter in association with a reference number is intended to show alternative embodiments or examples of the item to which the reference number is connected.

Figure 3:
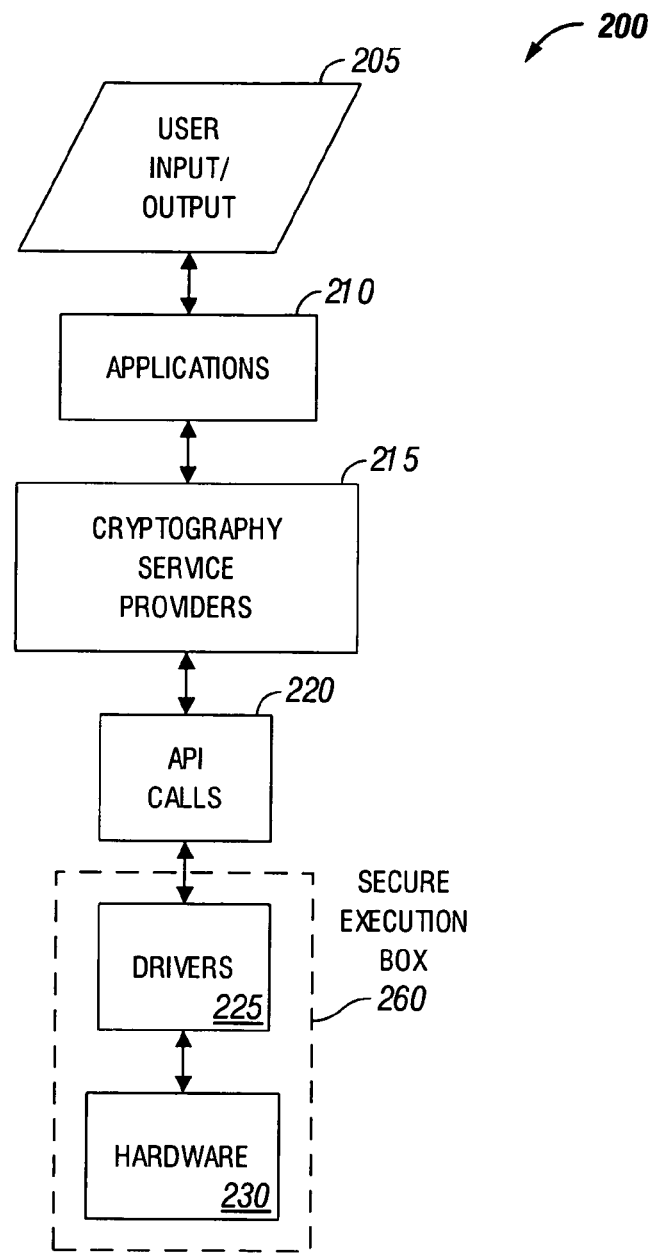
FIG. 3 illustrates a flowchart of an embodiment of data and command flow in a computer system having a secure execution box, according to one aspect of the present invention.

FIG. 3 illustrates a block diagram of an embodiment of a flowchart showing data and command flow in a computer system having a secure execution box 260, according to one aspect of the present invention. User input and output (I/O) data and/or commands 205 are provided to and received from one or more applications 210. The applications 210 exchange data and commands with cryptography service providers 215 within the computer system, such as the computer system 100 or any other computer system. The cryptography service providers 215 may use API (Application Programming Interface) calls 220 to interact with drivers 225 that provide access to hardware 230.

According to one aspect of the present invention, the drivers 225 and the hardware 230 are part of a secure execution box configured to operate in a secure execution mode (SEM) 260. Trusted privacy, security, and ownership (PSO) operations, also referred to simply as security operations, may take place while the computer system is in SEM 260. Software calls propagated from the user I/O 205 and/or the applications 210 may be placed into the secure execution box in SMM 260 via an SMM initiation register 425B (or SMM initiator 425A) discussed below with respect to FIG. 5B (or FIG. 5A). Parameters may be passed into and out of the secure execution box in SEM 260 via an access-protected mailbox RAM 415, also discussed below with FIGS. 5A and 5B. The software calls have access to the secure execution box in SEM 260 to various security hardware resources, such as described in detail below.

Figure 4:
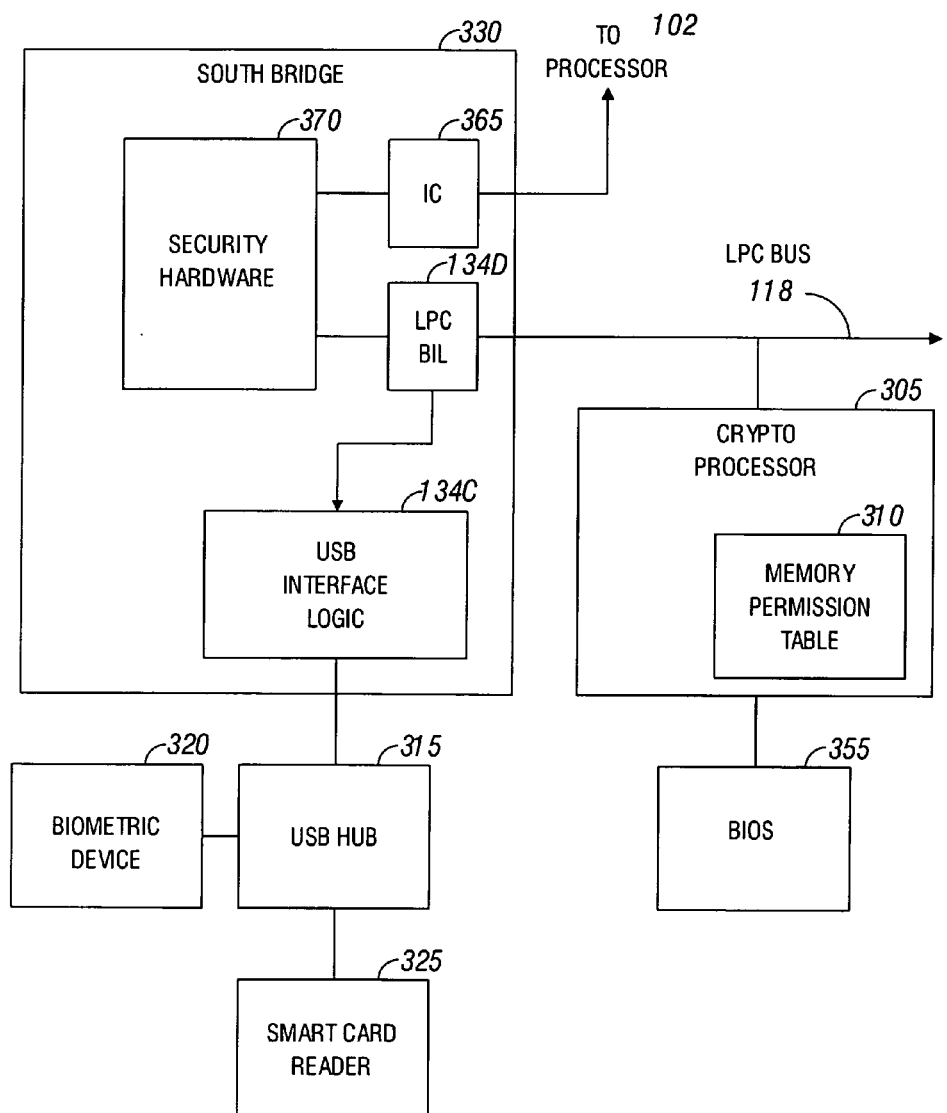
FIG. 4 illustrates a block diagram of an embodiment of a computer system including security hardware in the south bridge as well as a crypto-processor, according to one aspect of the present invention.

FIG. 4 illustrates a block diagram of an embodiment of a portion of an improved version of computer system 100 including security hardware 370 in a south bridge 330, as well as a crypto-processor 305, according to one aspect of the present invention. The south bridge 330 includes the security hardware 370, an interrupt controller (IC) 365, USB interface logic 134C, and the LPC bus interface logic (LPC BIL) 134D. The IC 365 is coupled to the processor 102. The USB interface logic 134C is coupled to an optional USB hub 315. The LPC bus 118 is coupled to the south bridge 330 through the LPC BIL 134D. The crypto-processor 305 is also coupled to the LPC bus 118. A memory permission table 310 within the Crypto-processor 305 provides address mappings and/or memory range permission information. The memory permission table 310 may be comprised in a non-volatile memory. A BIOS 355, i.e. some memory, preferably read-only memory or flash memory, is coupled to the crypto-processor 305.

The security hardware 370 in the south bridge 330 may be operable to provide an SMI interrupt request to the IC 365 for the processor 102. The security hardware 370 may also interact with the crypto-processor 305. Access to the BIOS 355 is routed through the crypto-processor 305. The crypto-processor 305 is configured to accept and transfer access requests to the BIOS 355. The crypto-processor 305 therefore may understand the address mappings of the BIOS 305. According to one aspect of the present invention, the security hardware 370 allows the computer system 100 to become an embodiment of the secure execution box 260 shown in FIG. 3. It is noted that the IC 365 may be included in the processor instead of the south bridge 330. The IC 365 is also contemplated as a separate unit or associated with another component of the computer system 100. It is also noted that the operations of the LPC bus 118 may correspond to the prior art Low Pin Count Interface Specification Revision 1.0 of Sep. 29, 1997. It is further noted that the USB interface logic 134C may couple to the LPC BIL 134D is any of a variety of ways, as is well known in the art for coupling different bus interface logics in a bridge.

Figure 5A:
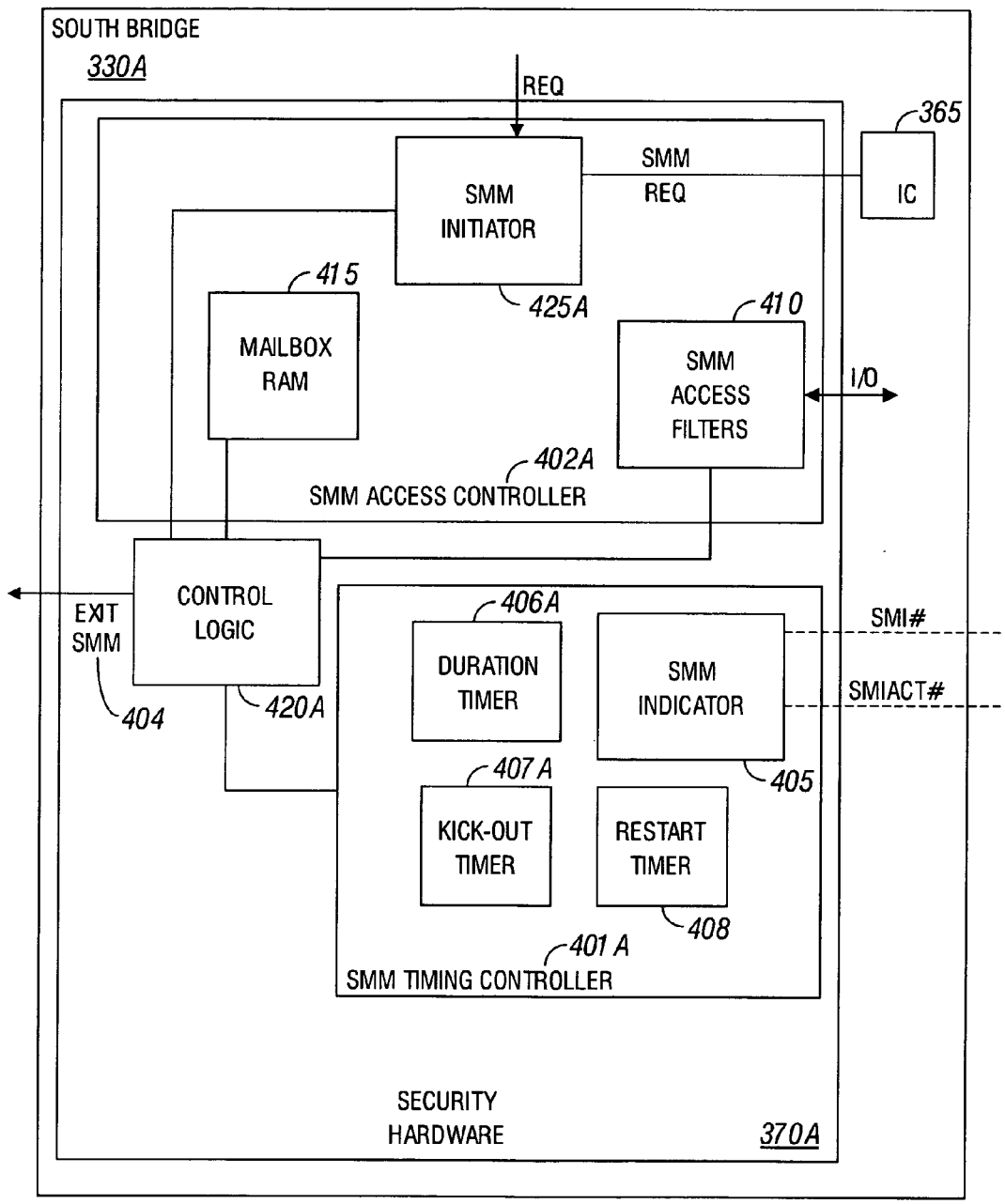
FIGS. 5A and 5B illustrate block diagrams of embodiments of a south bridge including security hardware for controlling SMM, according to various aspect of the present invention.
Figure 5B:
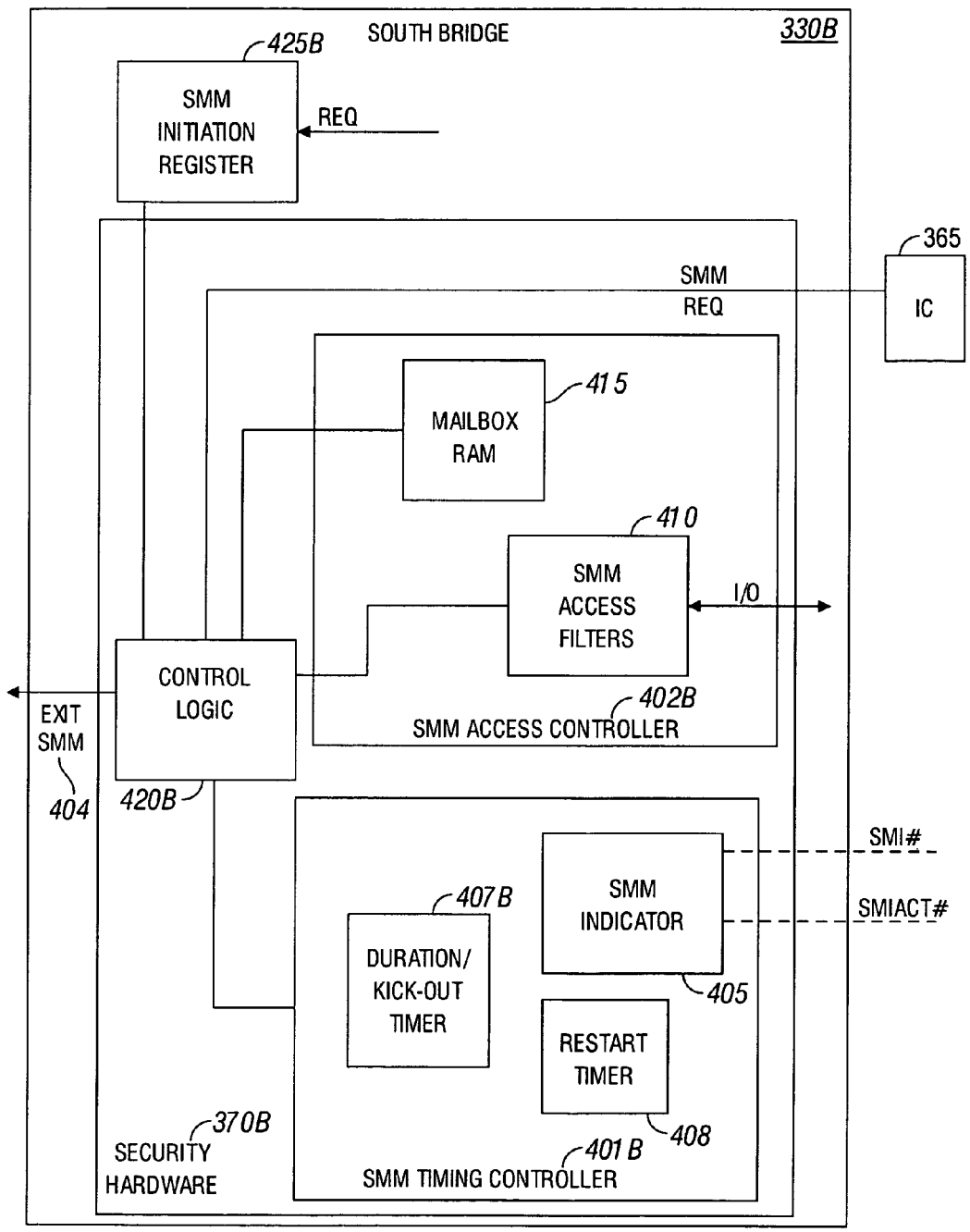

FIGS. 5A and 5B illustrate block diagrams of embodiments of the south bridge 330, including the security hardware 370, according to various aspects of the present invention. In FIG. 5A, the south bridge 330A includes the security hardware 370A and IC 365. The security hardware 370A includes sub-devices such as an SMM access controller 402A and control logic 420A. The sub-devices may be referred to as security hardware or secure assets of the computer system 100. The SMM access controller 402A includes SMM access filters 410, mailbox RAM 415, and an SMM initiator 425A.

As shown in FIG. 5A, the control logic 420 is coupled to control operation of the SMM access controller 402A and the SMM initiator 425A. Input and output (I/O) to the security hardware 370A pass through the SMM access filters 410 and are routed through the control logic 420A.

The SMM timing controller 401A includes the duration timer 406A, which measures how long the computer system 100 is in SMM. The kick-out timer 407A, also included in the SMM timing controller 401A, counts down from a predetermined value while the computer system 100 is in SMM. The control logic 420A is configured to assert a control signal (EXIT SMM 404) for the processor to exit SMM, such as in response to the expiration of the kick-out timer 407A. The restart timer 408, included in the SMM timing controller 401A, starts counting down from a predetermined value after the kick-out timer 407A reaches zero. The SMM indicator 405, also included in the SMM timing controller 401A, is operable to monitor the status of one or more signals in the computer system, such as the SMI# (System Management Interrupt) signal and/or the SMIACT# (SMI ACTive) signal to determine if the computer system is in SMM. The SMM access controller 402A includes the SMM access filters 410, which are configured to accept input requests for the sub-devices within the security hardware 370A. When the computer system 100 is in SMM, the SMM access filters are configured to pass access requests (e.g. reads and writes) to the control logic 420A and/or the target sub-device. When the computer system 100 is not in SMM, the SMM access filters are configured to respond to all access requests with a predetermined value, such as all '1's. The SMM access controller 402A also includes the mailbox RAM 415. In one embodiment, the mailbox RAM 415 includes two banks of RAM, such as 512 bytes each, for passing parameters into and out of the secure execution box 260. Parameters passed to or from the sub-devices included within the security hardware 370 are exchanged at the mailbox RAM 415. One bank of RAM 415, an inbox, is write-only to most of all of the computer system in most operating modes. Thus, parameters to be passed to the sub-devices included within the security hardware 370 may be written into the inbox. During selected operating modes, such as SMM, both read and write accesses are allowed to the inbox. Another bank of RAM 415, an outbox, is read-only to most of all of the computer system in most operating modes. Thus, parameters to be received from the sub-devices included within the security hardware 370 may be read from the outbox. During selected operating modes, preferably secure modes, such as SMM, both read and write accesses are allowed to the outbox.

The SMM initiator 425A may advantageously provide for a convenient way to request that the computer system 100 enter SMM. A signal may be provided to the SMM initiator 425A over the request (REQ) line. The signal should provide an indication of the jump location in SMM memory. The SMM initiator 425A is configured to make a request for SMM over the SMM request (SMM REQ) line, for example, by submitting an SMI# to the interrupt controller 365. The SMM initiator 425A is also configured to notify the control logic 420A that the request for SMM has been received and passed to the interrupt controller 365.

In FIG. 5B, the south bridge 330B includes the security hardware 370B. The IC 365 is shown external to the south bridge 330B. The security hardware 370B includes an SMM access controller 402B and control logic 420B. The SMM access controller 402B includes SMM access filters 410 and mailbox RAM 415. An SMM initiation register 425B is shown external to the south bridge 330B.

As shown in FIG. 5B, the control logic 420B is coupled to control operation of the SMM access controller 402B. Input and output (I/O) signals to the security hardware 370B pass through the SMM access filters 410 and are routed through the control logic 420B. The control logic 420B is also coupled to receive an indication of a request for SMM from the SMM initiation register 425B. The SMM access controller 402B includes the SMM access filters 410, which are configured to accept input requests for the sub-devices within the security hardware 370B. When the computer system 100 is in SMM, the SMM access filters are configured to pass access requests (e.g. reads and writes) to the control logic 420B and/or the target sub-device. When the computer system 100 is not in SMM, the SMM access filters may be configured to respond to all access requests with a predetermined value, such as all '1's. The SMM access controller 402B also includes the mailbox RAM 415, described above with respect to FIG. 5A.

The SMM initiation register 425B may advantageously provide for a convenient way to request that the computer system 100 enter SMM. A signal may be provided to the SMM initiation register 425B over the request (REQ) line. The signal should provide an indication of the jump location in SMM memory. The SMM initiation register 425B is configured to provide the indication to the control logic 420B. The control logic 420B is configured to make a request for SMM over the SMM request (SMM REQ) line, for example, by submitting an SMI# to the interrupt controller 365.

It is noted that in the embodiment illustrated in FIG. 5A, the SMM initiator 425A includes internal logic for handling the SMM request. In the embodiment illustrated in FIG. 5B, the SMM initiation register 425B relies on the control logic 420B to handle the SMM request. It is also noted that the SMM initiator 425A is part of the security hardware 370A, while the SMM initiation register 425B is not part of the security hardware 370B.

Figure 6:
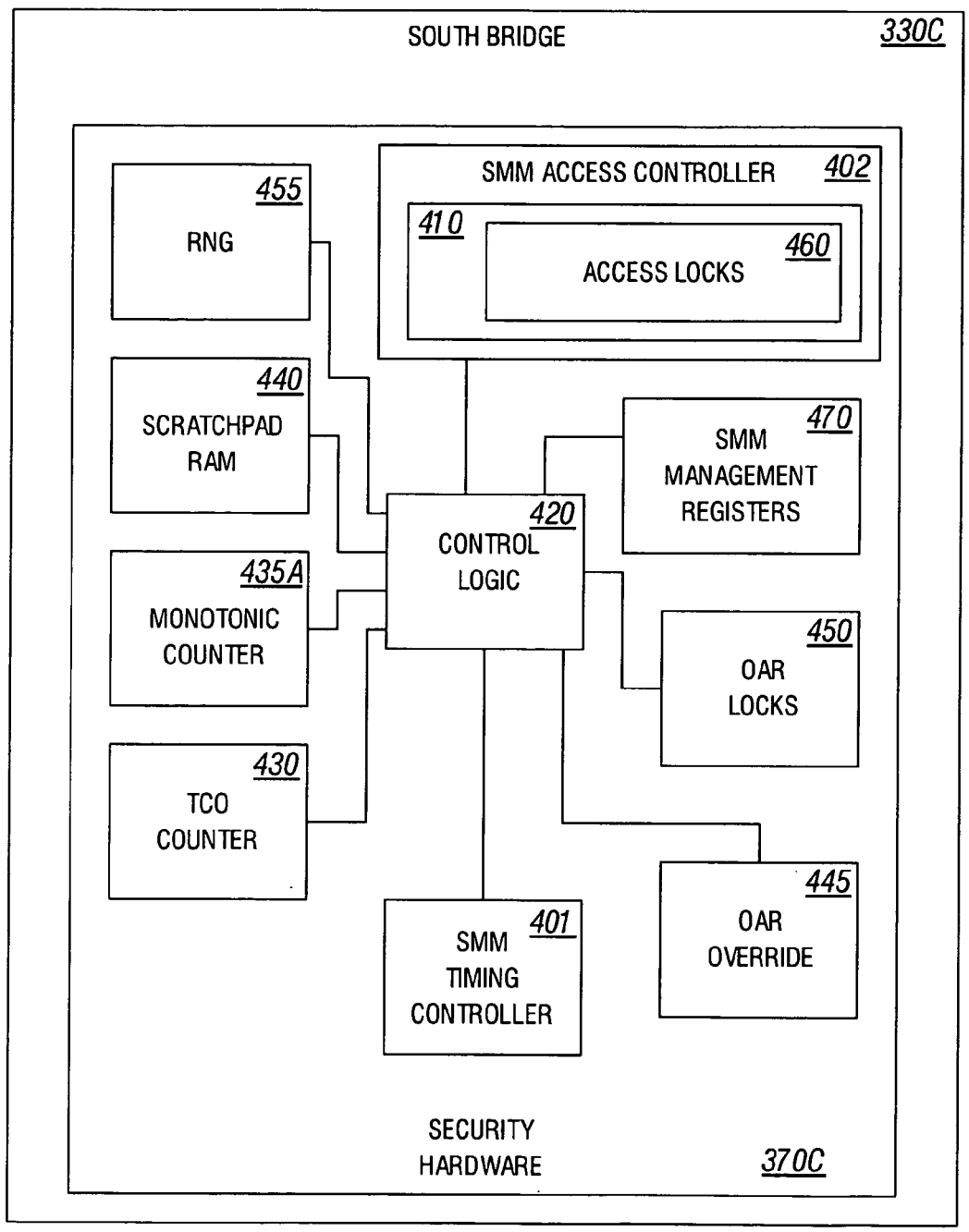
FIG. 6 illustrates a block diagram of an embodiment of a south bridge including security hardware for secure SMM operations, according to one aspect of the present invention.

FIG. 6 illustrates a block diagram of an embodiment of the south bridge 330C including security hardware 370C, according to one aspect of the present invention. As shown, the security hardware 370C includes sub-devices, such as the SMM access controller 402, the control logic 420, a TCO counter 430, the scratchpad RAM 440, a random number generator 455, secure system (or SMM) management registers 470, OAR—(Open At Reset) locks 450, and an OAR override register 445. The SMM access controller 402 includes one or more access locks 460 within the SMM access filters 410. Some aspects of embodiments of the SMM timing controller 401, the SMM access controller 402, and the control logic 420 are described herein with respect to FIGS. 5A and 5B, above.

Figure 10A:
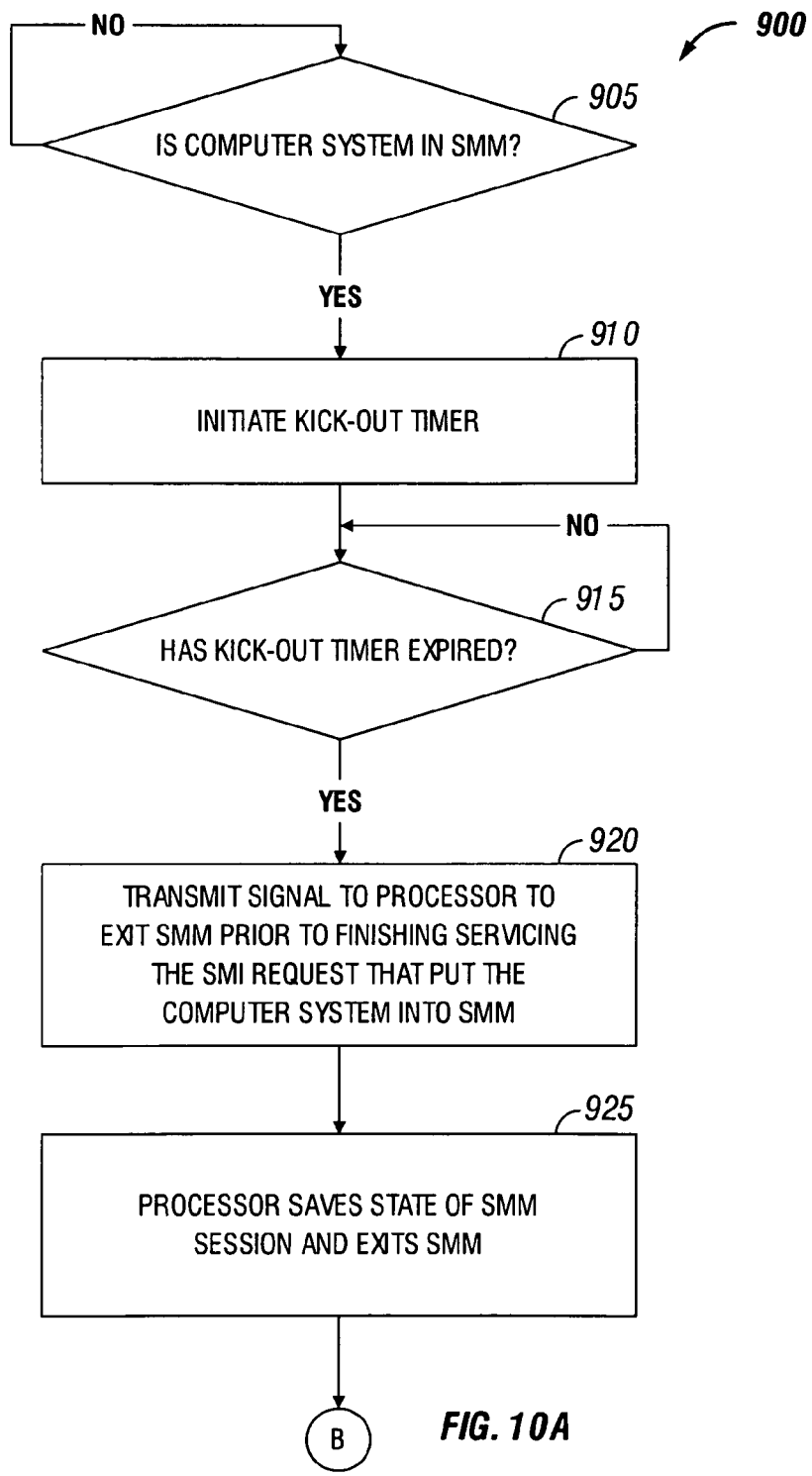
Figure 10B:
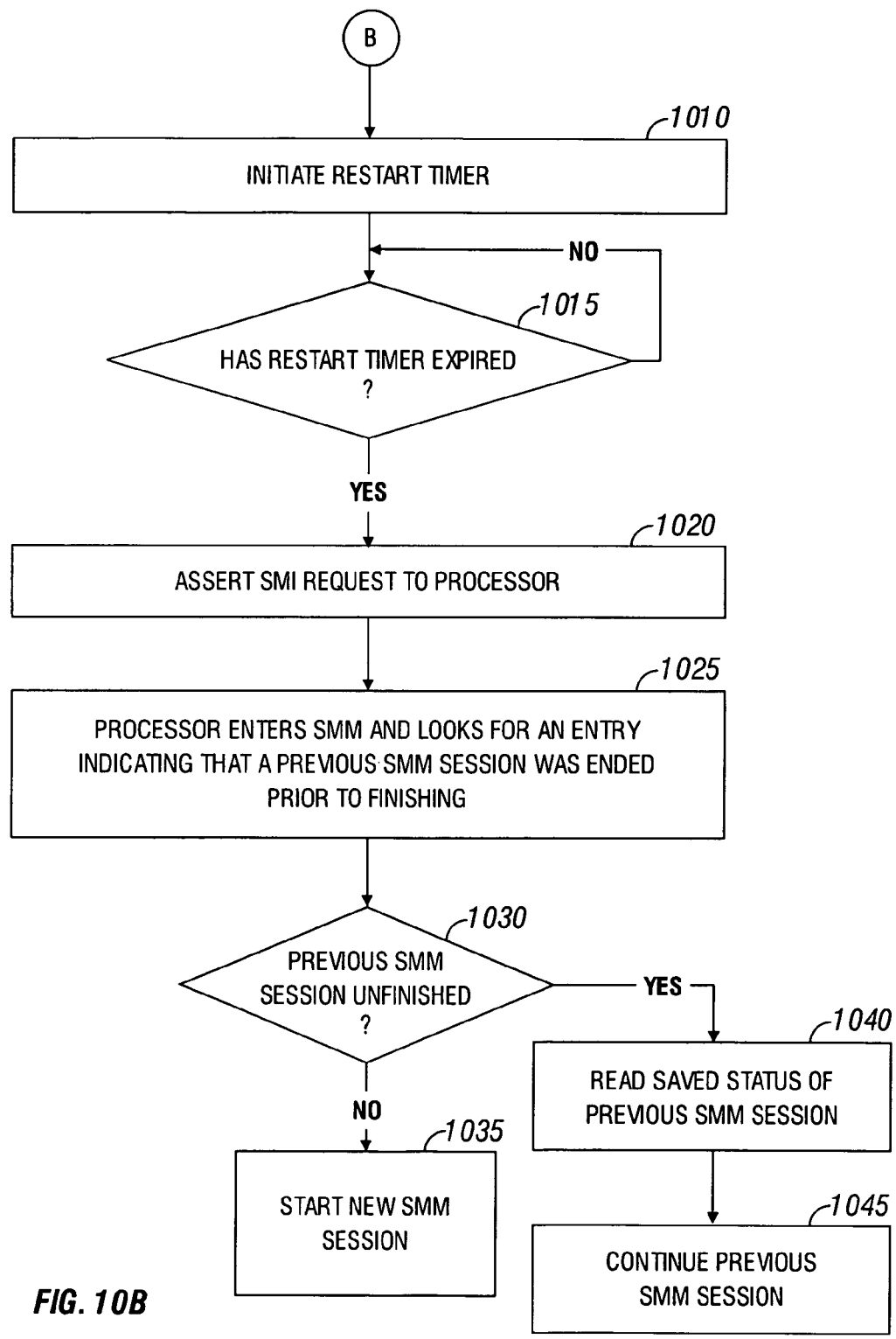

The embodiment of the SMM access controller 402 illustrated in FIG. 6 includes the one or more access locks 460 within the SMM access filters 410. The access locks 460 provide a means of preventing (or locking) and allowing (or unlocking) access to one or more of the devices within the security hardware 370C. Various embodiments for the one or more access locks 460 are shown in FIGS. 10A–10C and described with reference thereto.

In one embodiment, the access locks 460 are open at reset (OAR), allowing the BIOS software access to the security hardware 370. The BIOS software then closes the access locks 460 prior to calling the boot sector code, shown in block 154 in FIG. 2A. In various embodiments, the access locks 460 may be opened by software or hardware to allow for access to the security hardware 370. For example, the access locks 460 may be opened by a signal from the IC 365 or the processor 102 or the control logic 420. The access locks 460 may be opened in response to an SMI# or in response to the processor 102 entering SMM. Additional information on the access locks 460 may be obtained from one or more of the methods 900A–900C described below with respect to FIGS. 9A–9C.

The TCO counter (or timer) 430 may include a programmable timer, such as a count-down timer, that is used to detect a lock-up of the computer system 100. Lock-up may be defined as a condition of the computer system 100 where one or more subsystems or components do not respond to input signals for more than a predetermined period of time. The input signals may include internal signals from inside the computer system 100 or signals from outside the computer system 100, such as from a user input device (e.g. keyboard, mouse, trackball, biometric device, etc.). It is also noted that the lock-ups may be software or hardware in nature. According to various aspects of the present invention, the TCO counter 430 may be programmed and read from inside SMM. The TCO counter 430 is preferably programmed with value less than a default duration for the kick-out timer 407. In one embodiment, the TCO timer 430 generates an SMI# upon a first expiration of the TCO timer 430, and the TCO timer 430 generates a reset signal for the computer system upon a second, subsequent expiration of the TCO timer 430.

In one embodiment, the TCO timer 430 may be accessed by the computer system 100 or software running in the computer system 100 for the computer system 100 to recover from lock-ups when the computer system is not in SMM. In another embodiment, the TCO timer 430 may be accessed by the computer system 100 both in and out of SMM.

The scratchpad RAM 440 includes one or more blocks of memory that are available only while the computer system 100 is in certain operating modes, such as SMM. It is also contemplated that other sub-devices of the security hardware 370 may use the scratchpad RAM 440 as a private memory. One embodiment of the scratchpad RAM 440 includes 1 kB of memory, although other amounts of memory are also contemplated. In one embodiment, the scratchpad RAM is open at reset to all or most of the computer system 100, while in another embodiment, the scratchpad RAM is inaccessible while the computer system is booting.

The random number generator (RNG) 455 is configured to provide a random number with a number of bits within a predetermined range. In one embodiment, a new random number with from 1 to 32 bits in length is provided in response to a request for a random number. It is noted that restricting access to the RNG, such as only in SMM, may advantageously force software to access the RNG through a standard API (application programming interface), allowing for increased security and easing hardware design constraints.

The OAR locks 450 may include a plurality of memory units (e.g. registers), which include associated programming bit (or lock bits) that lock the memory (or memories) used to store BIOS information or other data, for example, BIOS ROM 355 and SMM ROM 550 in FIGS. 7A and 7B below. Each memory unit may have, by way of example, three lock bits associated with it. In one embodiment, four 8-bit registers may store the lock bits for each 512 kB ROM-page, one register for every two 64-kB segment. With sixteen blocks of four registers, a maximum of 8 MB of ROM may be locked. Addressing may be as follows:

| 64-kB segment | Register | ADDRESS |
| --- | --- | --- |
| 0, 1 | Register 0 | FFBx,E000h |
| 2, 3 | Register 1 | FFBx,E001h |
| 4, 5 | Register 2 | FFBx,E002h |
| 6, 7 | Register 3 | FFBx,E003h |

Each physical ROM chip may include four identification pins (ID), known as strapping pins. The strapping pins may be used to construct sixteen spaces of 64 kB each. The 'x' in the address may represent the decode of the strapping pins, or the inverse.

The lock registers from the OAR locks 450 may include:

| Register\Bits | 7 | OAR Lock 6:4 | 3 | OAR Lock 2:0 |
| --- | --- | --- | --- | --- |
| Register 0 | Reserved | Segment 1 | Reserved | Segment 0 |
| Register 1 | Reserved | Segment 3 | Reserved | Segment 2 |
| Register 2 | Reserved | Segment 5 | Reserved | Segment 4 |
| Register 3 | Reserved | Segment 7 | Reserved | Segment 6 |

In one embodiment, one bit controls write access, one bit controls read access, and one bit prevents the other two bits from being changed. In one embodiment, once the locking bit is set (also described as the state being locked down), the write access bit and read access bit cannot be reprogrammed until the memory receives a reset signal. The layout of each register may include:

| Bit | 7 | 6 | 5 | 4 | 3 | 2 | 1 | 0 |
| --- | --- | --- | --- | --- | --- | --- | --- | --- |
| Value | Rsvrd | Lock 2 | Lock 1 | Lock 0 | Rsvrd | Lock 2 | Lock 1 | Lock 0 |

With a decode of the three lock bits including:

| Decode | Read Lock Data 2 | Lock-Down Data 1 | Write Lock Data 0 | Resulting block state |
| --- | --- | --- | --- | --- |
| 0 × 00 | 0 | 0 | 0 | Full access |
| 0 × 01 | 0 | 0 | 1 | Write locked (default state) |
| 0 × 02 | 0 | 1 | 0 | Lock open (full access locked down) |
| 0 × 03 | 0 | 1 | 1 | Write locked down |
| 0 × 04 | 1 | 0 | 0 | Read locked |
| 0 × 05 | 1 | 0 | 1 | Read and write locked |
| 0 × 06 | 1 | 1 | 0 | Read locked down |
| 0 × 07 | 1 | 1 | 1 | Read and write locked down |

The embodiment of the security hardware 370C illustrated in FIG. 6 also includes the OAR override register 445. The OAR override register 445 provides a mechanism for allowing (or unlocking) and preventing (or locking) access to one or more of the devices within the security hardware 370C. The OAR override register 445 also provides a mechanism to override the access locks 460. In one embodiment, the OAR override register 445 includes a first indicator that the access locks 460 are to be ignored, with access to the security hardware locked by the access locks 460 either always available or never available, as implemented. The OAR override register 445 may also include a second indicator that the status of the first indicator may be changed, or not. If the second indicator shows that the first indicator may not be changed, then the device including the OAR override register 445 preferably needs reset for the second indicator to be changed. In other words, the second indicator is preferably OAR, similar to one embodiment of the access locks 460.

Methods that include using the access locks 460 and/or the OAR override indicators are described below with respect to FIGS. 9A–9F. Various embodiments for the one or more access locks 460 are shown in FIGS. 10A–10C and described with reference thereto, and an embodiment of the OAR override register 445 is shown in FIG. 10D and described with reference thereto.

In one embodiment, the access locks 460 are open at reset (OAR), allowing the BIOS software access to the security hardware 370. The BIOS software then closes the access locks 460 prior to calling the boot sector code, shown in block 154 in FIG. 2A. In various embodiments, the access locks 460 may be opened by software or hardware to allow for access to the security hardware 370. For example, the access locks 460 may be opened by a signal from the IC 365 or the processor 102 or the control logic 420. The access locks 460 may be opened in response to an SMI# or in response to the processor 102 entering SMM. Additional information on the access locks 460 may be obtained from one or more of the methods 900A–900C described below with respect to FIGS. 9A–9C.

It is noted that in one embodiment, all of the security hardware 370 (and the SMM initiation register 425B are inside the RTC battery well 125. In other embodiments, selected sub-devices of the security hardware 370 are excluded from the RTC battery well 125. In one embodiment, only a portion of the scratchpad RAM 440 is inside the RTC battery well 125 with the remaining portion outside the RTC battery well 125. For example, in one embodiment, the mailbox RAM 415 is outside the RTC battery well 125.

Figure 7A:
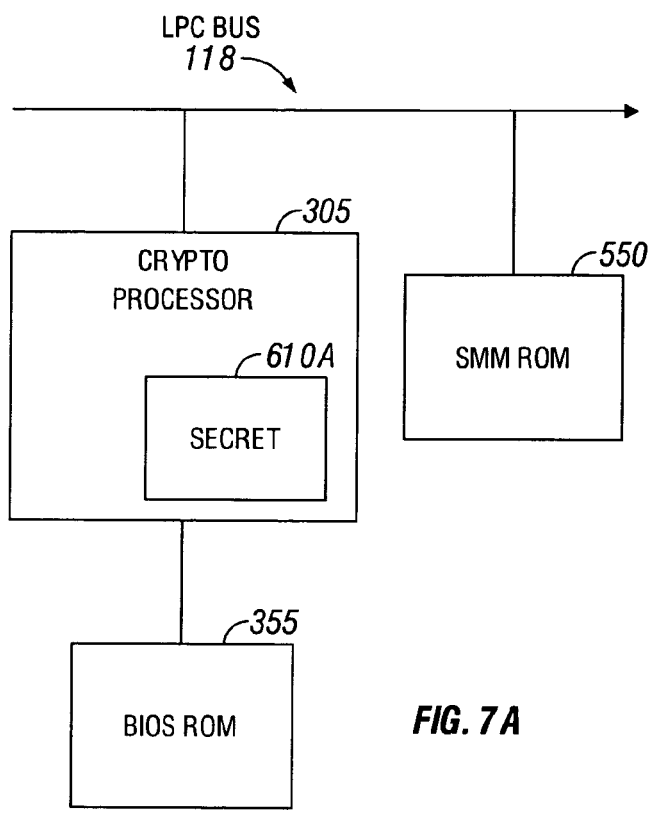
FIGS. 7A and 7B illustrate embodiments of secure memory, according to various aspects of the present invention.
Figure 7B:
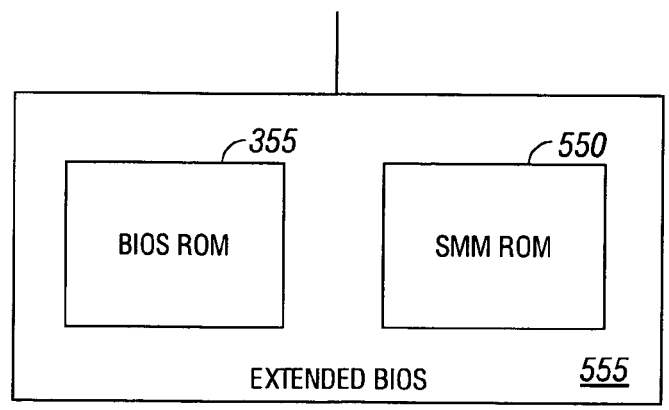
Figure 7C:
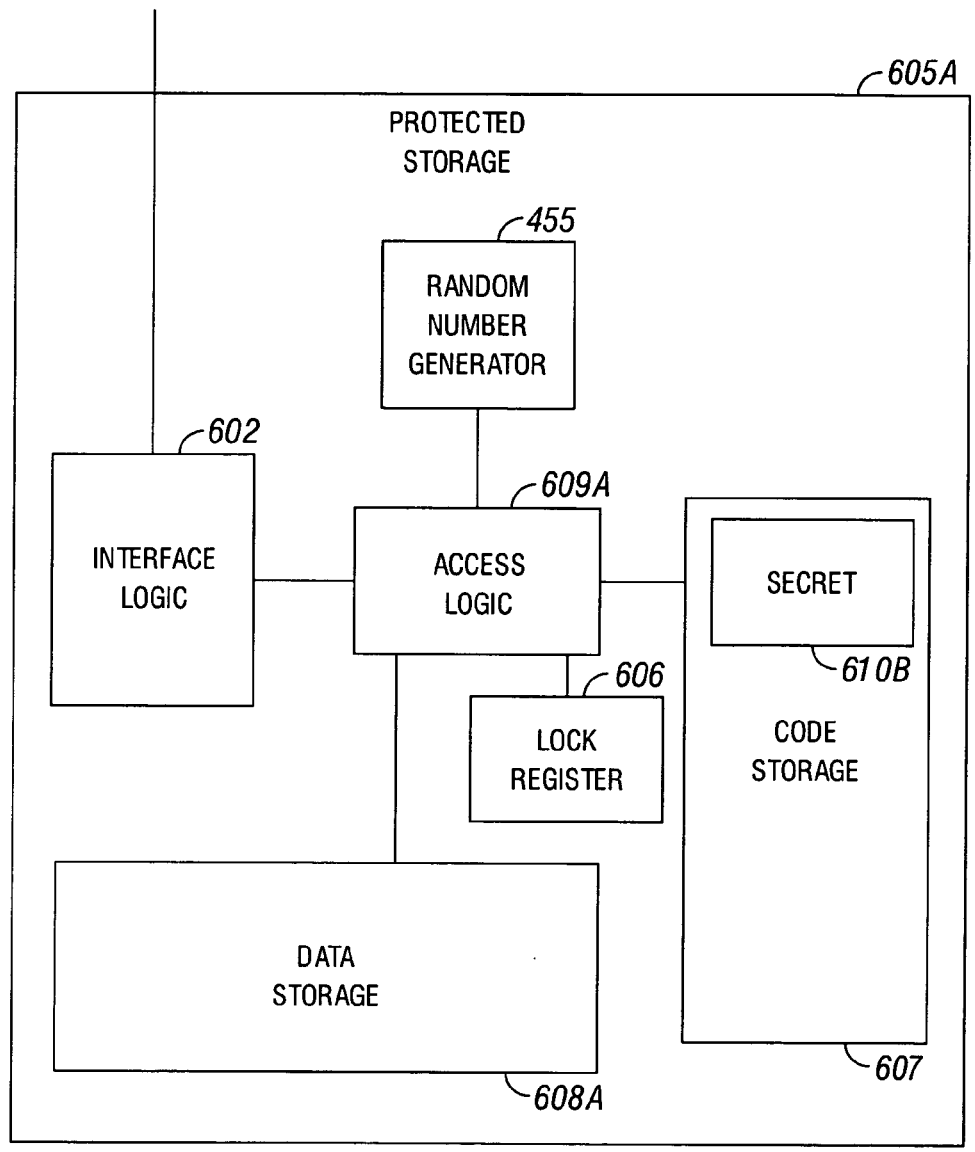
Figure 7D:
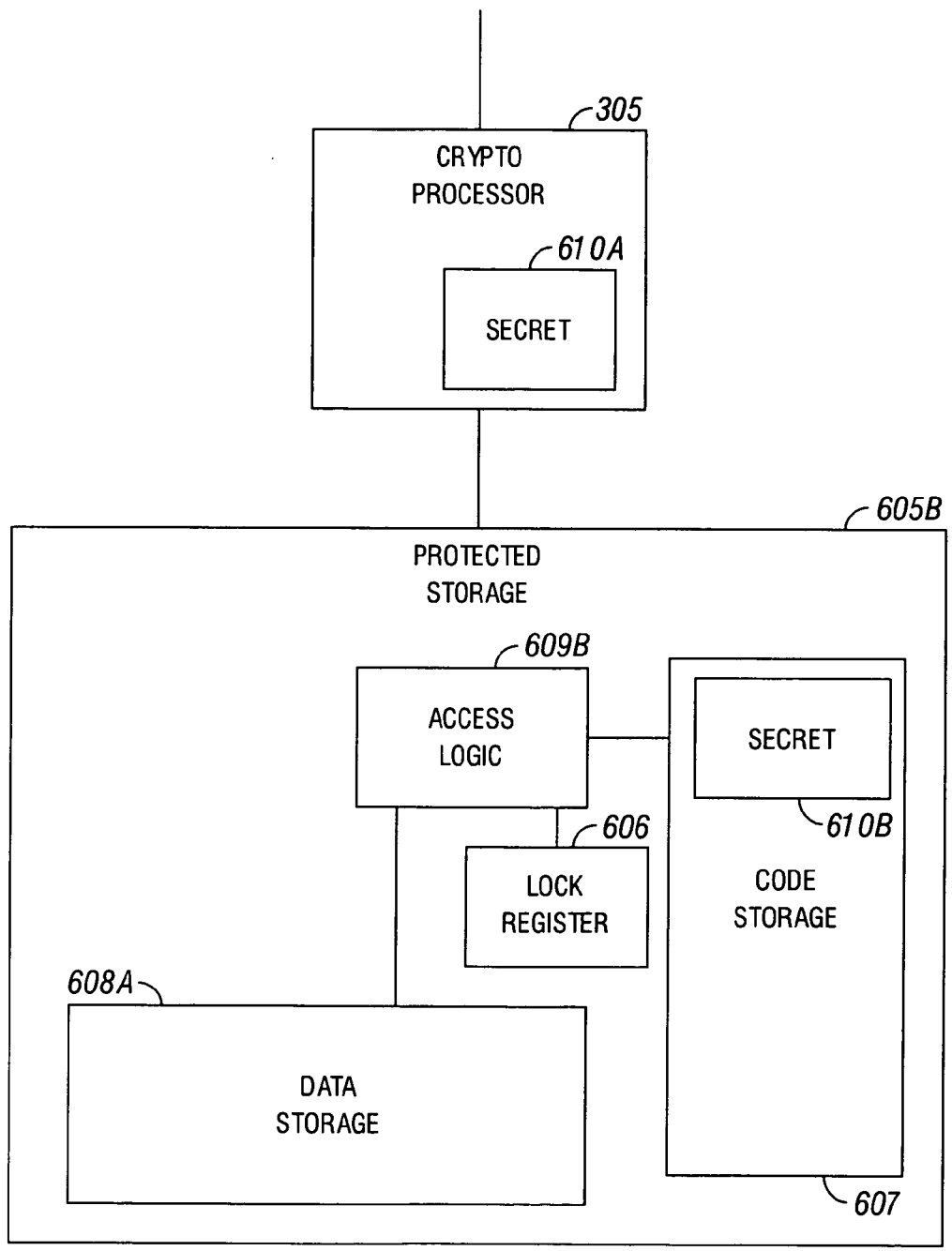

FIGS. 7A and 7B illustrate embodiments of extended BIOS security, according to various aspects of the present invention. In FIG. 7A, the BIOS ROM 355 and the SMM ROM 550 are coupled to the LPC bus 118. As shown, a crypto processor 305, including a secret 610A, is coupled between the BIOS ROM 355 and the LPC bus 118. In FIG. 7B, an extended BIOS ROM 555 is shown coupled to the LPC bus 118. The extended BIOS ROM 555 includes the BIOS ROM 355 and the SMM ROM 550.

BIOS ROM 355 memory space in the computer system 100 may include anywhere from 128 kB to 4 MB, divided into 64 kB segments. An additional one or more 4 MB of SMM ROM 550 memory space may be addressed via a paging mechanism, for example, where the second page of ROM memory space is within separate chips and selected by an additional set of identification select (IDSEL) pins. Each segment of the BIOS ROM 355 memory space and the SMM ROM 550 memory space may be lockable, and open at reset. In one embodiment, the access protection mechanism (i.e. the lock) is not implemented in the BIOS ROM 355 or SMM ROM 550, but, for example, in the south bridge 330C in the security hardware 370C, as previously described with respect to FIG. 6.

In one embodiment, the BIOS ROM 355 includes 4 MB of memory space. Read access to the BIOS ROM 355 memory space may be unrestricted at any time. Write locks on the BIOS ROM 355 memory space may be OAR and cover the memory space from FFFF,FFFFh to FFC0,0000h, in 32-bit address space on the LPC bus 145.

In one embodiment, the crypto processor 305 is a specialized processor that includes specialized cryptographic hardware. In another embodiment, the crypto processor 305 includes a general-purpose processor programmed with cryptographic firmware or software. In still another embodiment, the crypto processor 305 includes a general-purpose processor modified with specialized cryptographic hardware.

Other embodiments are also contemplated. For example, the BIOS ROM 355 may be coupled to the LPC bus 118, and the crypto processor 305 may be coupled between the SMM ROM 550 and the LPC bus 118. Also, the crypto processor 305 may be coupled between the extended BIOS ROM 555 and the LPC bus 118.

Figure 8A:
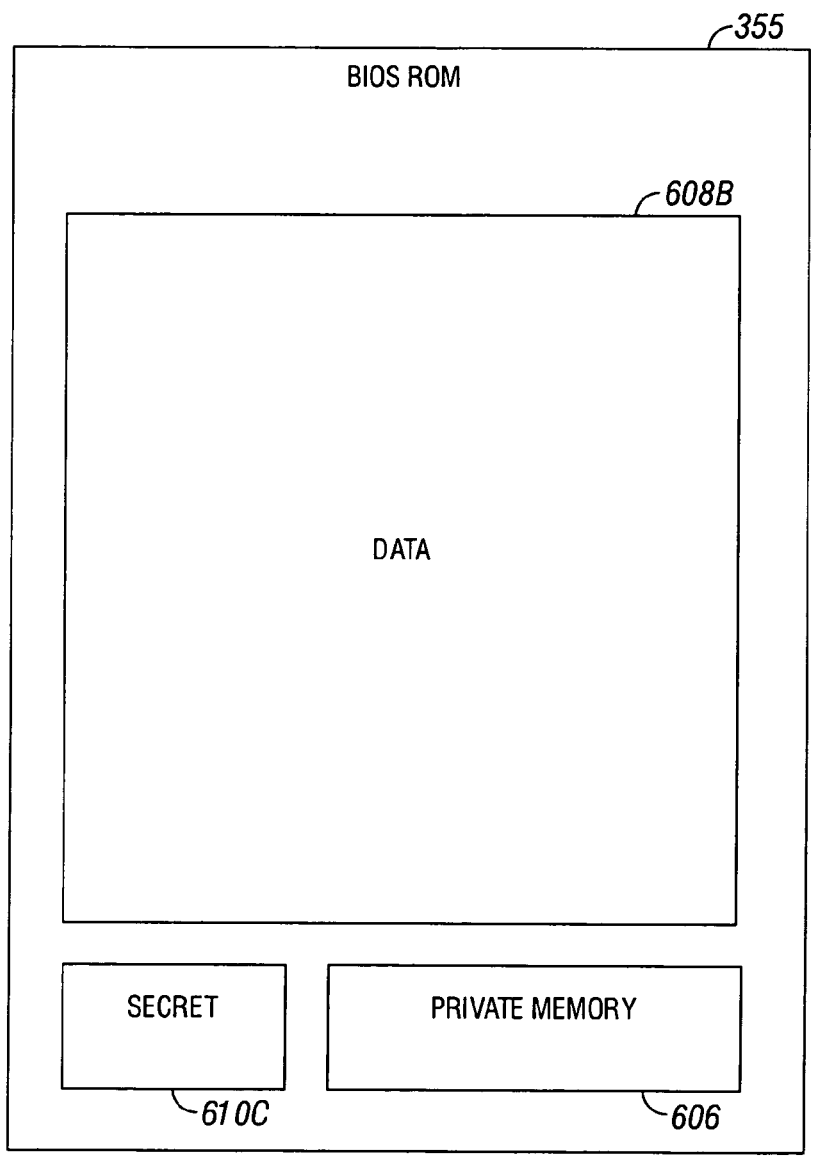
FIGS. 8A and 8B illustrate block diagrams of embodiments of a BIOS ROM and an SMM ROM for secure SMM operations, respectively, according to various aspects of the present invention.
Figure 8B:
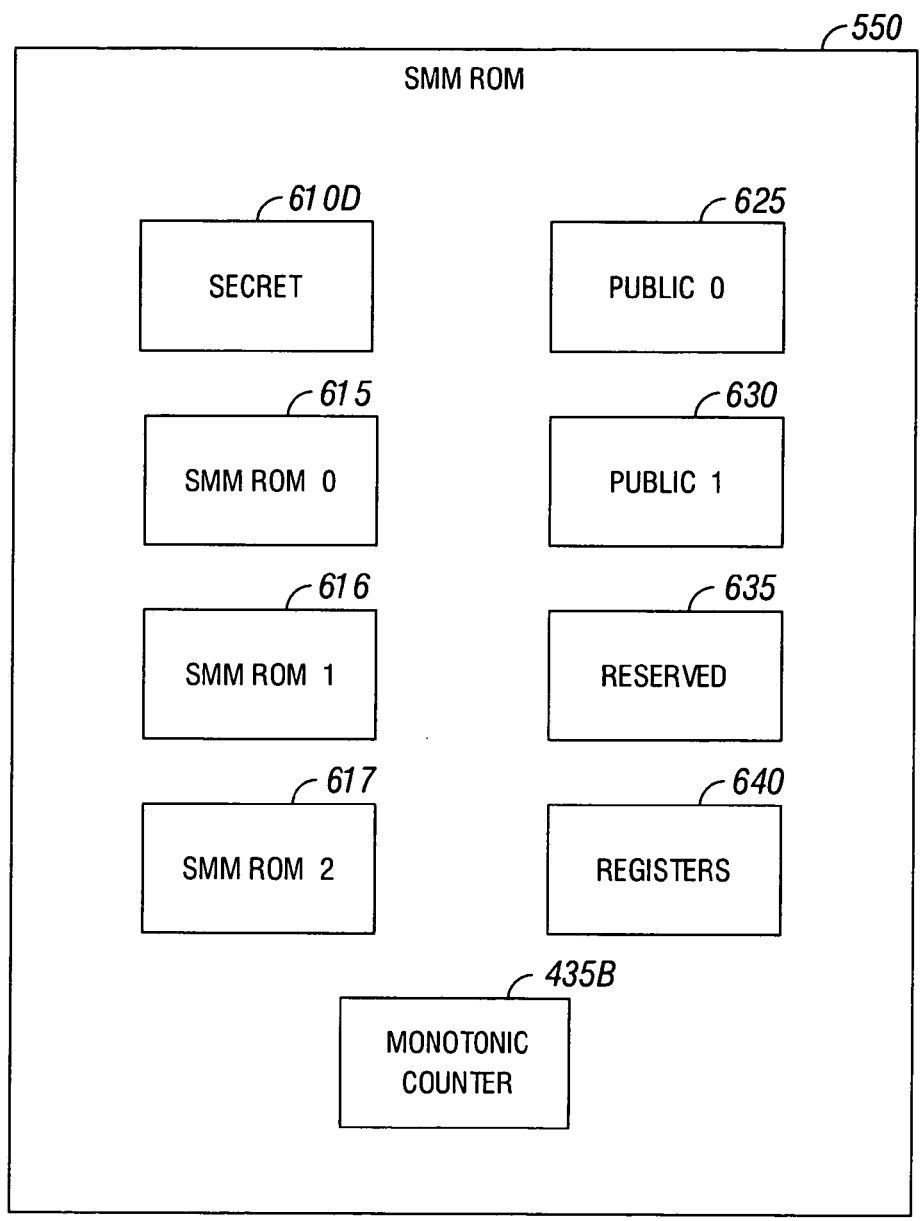

FIGS. 8A and 8B illustrates block diagrams of embodiments of a BIOS ROM 355 and an SMM ROM 550 for secure SMM operations, respectively, according to various aspects of the present invention. As shown in FIG. 8A, the BIOS ROM 355 may include data storage 608B, a secret 610C, and private memory 606.

As shown in FIG. 8B, the SMM ROM 550 may be divided into a plurality of SMM ROM blocks 615–617, a stored secret 610D, a plurality of public ROM blocks 625–630, one or more reserved ROM blocks 635, and one or more registers 640.

The plurality of SMM ROM blocks 615–617 may include an SMM ROM 0 block 615, an SMM ROM 1 block 616, and an SMM ROM 2 block 617. The plurality of public ROM blocks 625–630 may include a public ROM block 0 625 and a public ROM block 1 630. One embodiment of access rights, lock status, and 32-bit address ranges in the LPC bus 118 space are given here in table form.

| ROM BLOCK | READ ACCESS | WRITE LOCK | ADDRESS RANGE |
|---|---|---|---|
| SMM ROM 0 615 | SMM Only | Write Once | FFBx,1FFFh: FFBx,0000h |
| SMM ROM 1 616 | SMM Only | Never Erase | FFBx,3FFFh: FFBx,2000h |
| SMM ROM 2 617 | SMM Only | None | FFBx,5FFFh: FFBx,4000h |

-continued

| ROM BLOCK | READ ACCESS | WRITE LOCK | ADDRESS RANGE |
|---|---|---|---|
| Public 0 625 | Unrestricted | Write Once In SMM | FFBx,9FFFh: FFBx,8000h |
| Public 1 630 | Unrestricted | Never Erase, Write in SMM | FFBx,BFFFh: FFBx,A000h |
| Reserved 635 | N/A | N/A | FFBx,DFFFh: FFBx,C000h |
| Registers 640 | N/A | N/A | FFBx,FFFFh: FFBx,E000h |

The 'x' in the address ranges given in the table may denote the strapping pin decode or their inverse. In one embodiment, the ROM blocks 615–617 and 625–630 in the table are each 64 kB in size. In one embodiment, the computer system may support up to 8 MB of extended BIOS ROM 555 storage, divided into sixteen pages of 512 kB each. In another embodiment, the memory address range from FFBx, FFFFh down to FFBx,0000h includes the plurality of SMM ROM blocks 615–617, the plurality of public ROM blocks 625–630, and the one or more registers 640. The one or more reserved ROM blocks 635 may be used for future expansion. The one or more registers 640 may store additional data, as needed.

Figure 9A:
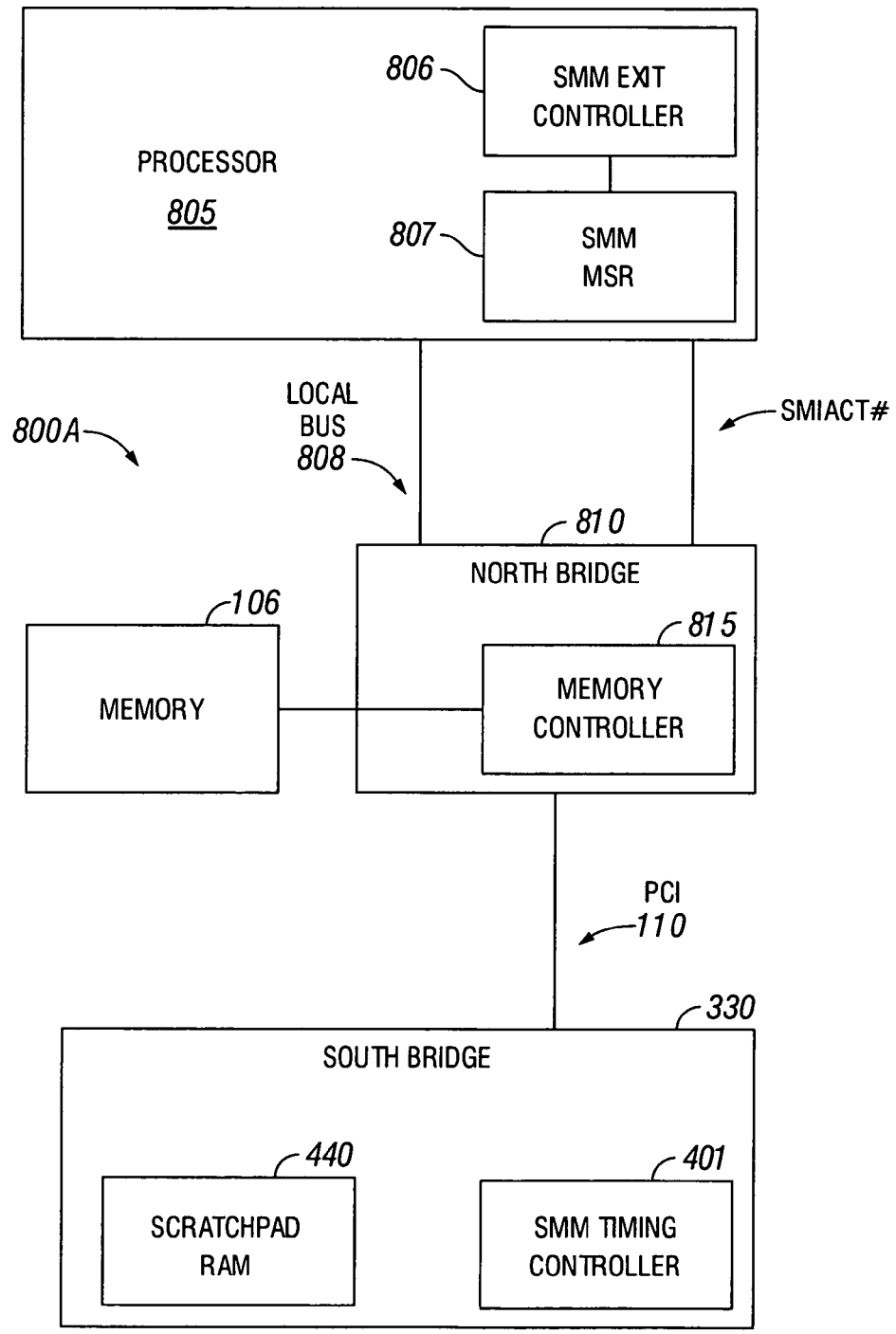
Figure 9B:
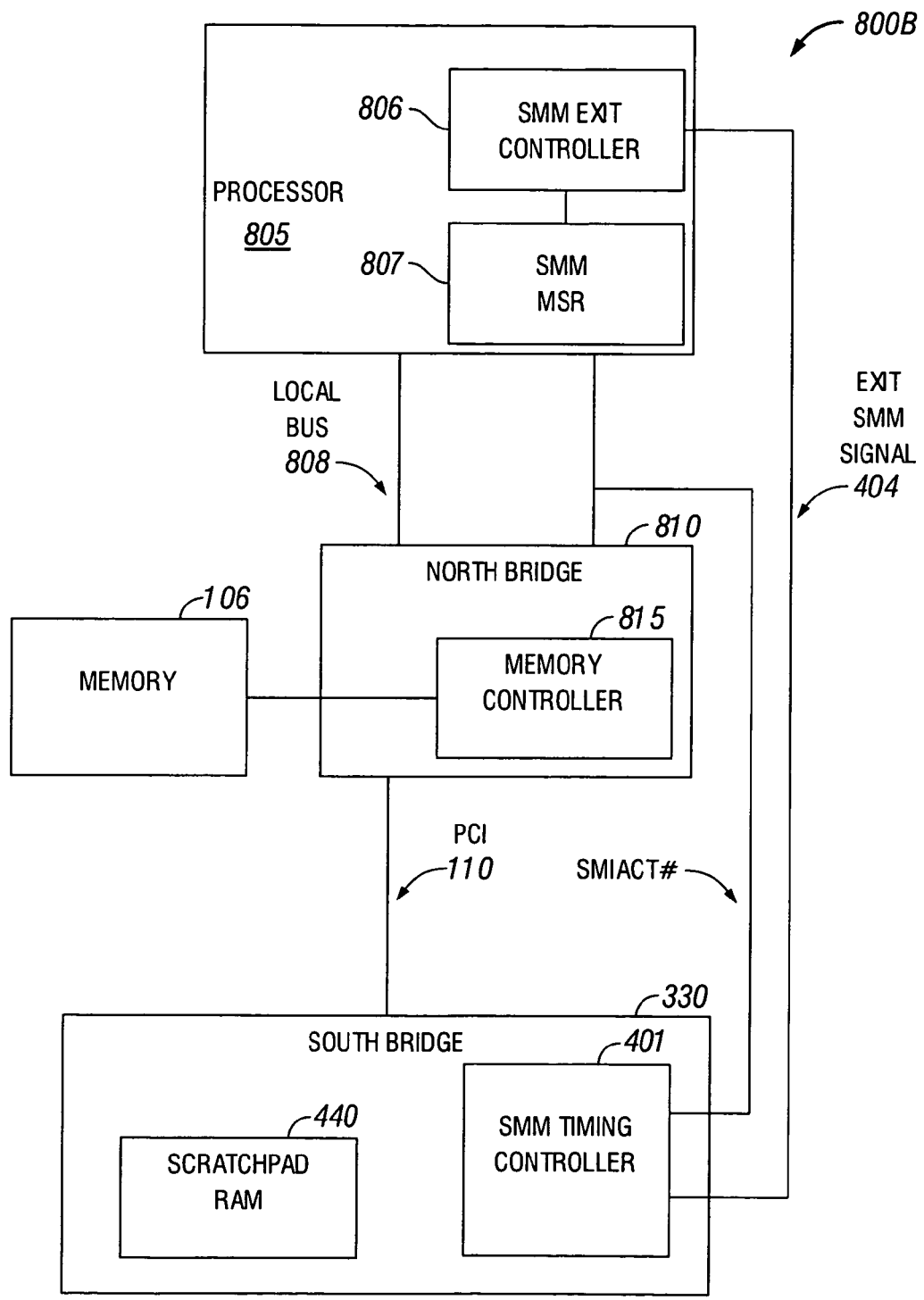

FIGS. A–9G illustrate flowcharts of embodiments of methods 900A–900G that attempt to access the security hardware 370, which may be locked, according to various aspects of the present invention. FIG. 9A shows a method 900A of locking the security hardware 370 as a part of the boot (or cold reboot) process. FIG. 9B shows a method 900B of unlocking and later locking the security hardware 370 as a part of a reboot (or warm boot) process. FIG. 9C shows a method 900C of checking for rights to lock or unlock the security hardware 370 and checking a bit to disable changing the rights. FIG. 9D shows a method 900D of attempting to use the security hardware 370 while the computer system 100 is not in SMM. FIG. 9E shows a method 900E of checking and/or setting the lock on the OAR access locks 460 and checking the bit to disable changing the lock. FIG. 9F shows a method 900F of unlocking and later locking the security hardware 370 while the computer system 100 is in SMM. FIG. 9G shows a method 900G of checking for rights to unlock and later lock the security hardware 370 while the computer system 100 is in SMM.

Figure 2A:
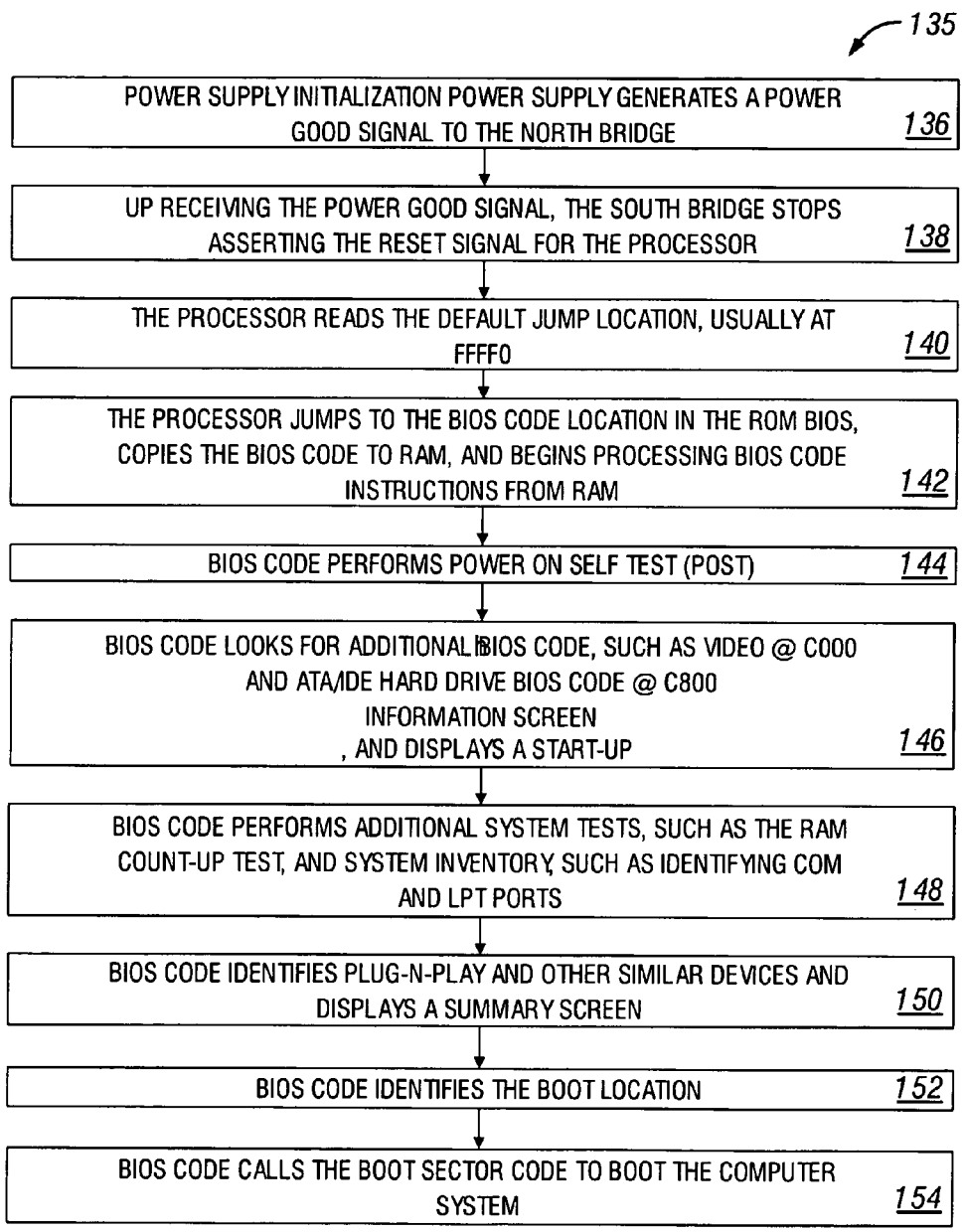
FIGS. 2A and 2B illustrate flowcharts of prior art methods for operating a computer system using code stored in ROM.
Figure 2B:
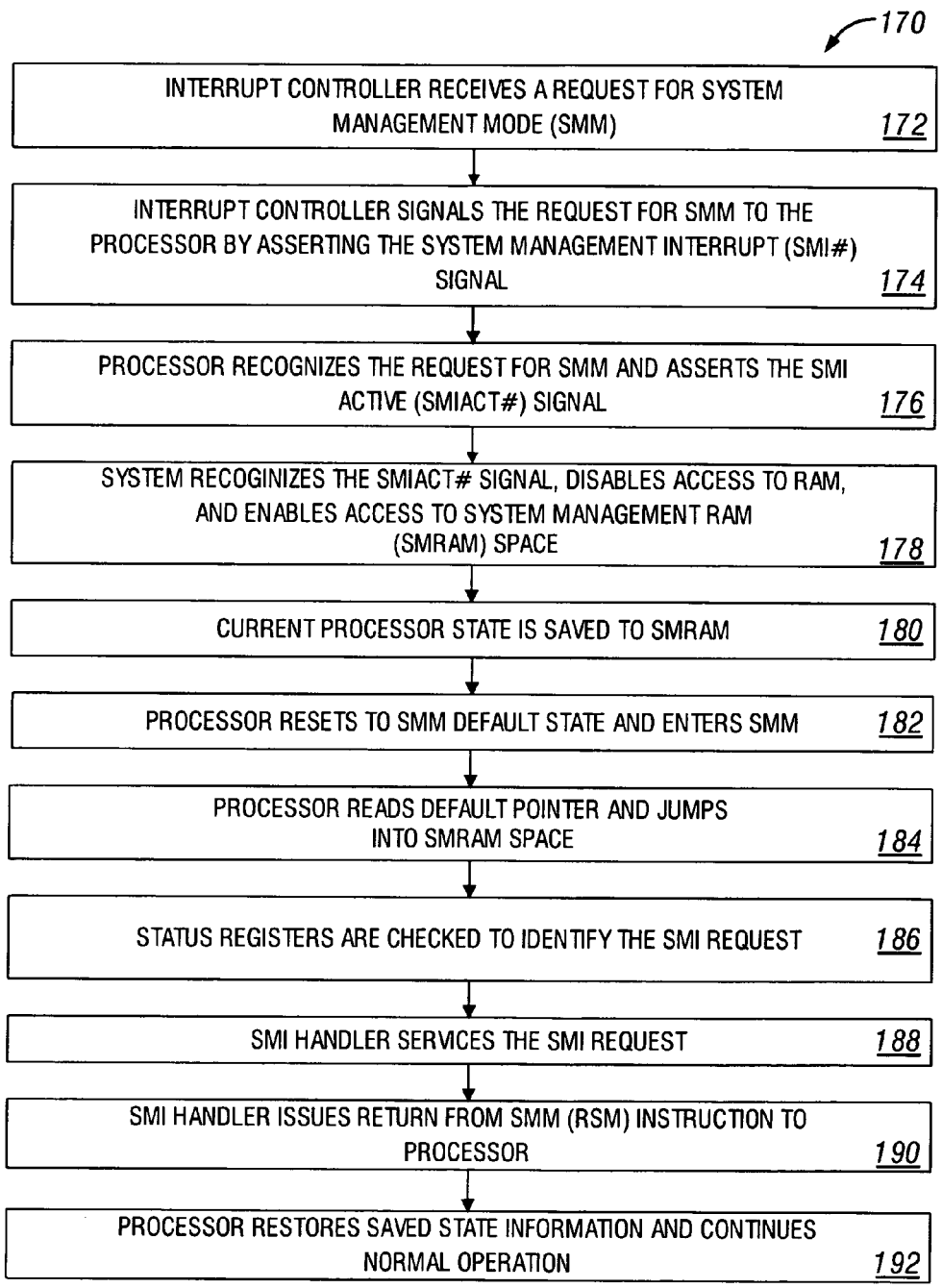

Referring now to FIG. 2A, the method 900A includes the processor executing the BIOS code instructions from SMM space in the RAM memory, in block 920. The BIOS code, executed by the processor, performs a power-on self test (POST), in block 925. The method 900A includes accessing the security hardware 370, in block 230. The accesses to the computer hardware 370 may initiate an unlocking of the security hardware 370, if the security hardware 370 is not open-at-reset. The accesses to the security hardware 370 may be by the BIOS code or other device or subsystem in the computer system 100, or from outside the computer system 100, if allowed. The method 900A may optionally include entering a BIOS management mode, in block 932. The BIOS management mode could allow for, for example, remote booting instructions, remote or secure permission to continue the boot sequence, other remote operations or remote hardware accesses or set-ups, or choosing between or among boot choices, such as hardware configurations and/or operating systems or other software choices.

The BIOS code next looks for additional BIOS code, such as from a video controller, IDE controller, SCSI controller, etc. and displays a start-up information screen, in block 935. As examples, the video controller BIOS is often found at C000h, while the IDE controller BIOS code is often found at C800h. The BIOS code may perform additional system tests, such as a RAM memory count-up test, and a system inventory, including identifying COM (serial) and LPT (parallel) ports, in block 240. The BIOS code also identifies plug-and-play devices and other similar devices and then displays a summary screen of devices identified, in block 945.

The method includes closing the access locks to the security hardware, in block 950. The BIOS code or another device or agent in the computer system 100 may close the access locks. The BIOS code identifies the boot location, and the corresponding boot sector, in block 955. The boot location may be on a floppy drive, a hard drive, a CDROM, a remote location, etc. The BIOS code next calls the boot sector code at the boot location to boot the computer system, such as with an operating system, in block 960.

Referring now to FIG. 9B, the method 900B includes opening the access locks to the security hardware, in block 915. The processor executes the BIOS code instructions from SMM space in the RAM memory, in block 920. The computer system accesses the security hardware 370 while in SMM, while booting, in block 930. The method 900B may optionally include entering a BIOS management mode, in block 232.

The BIOS code next looks for additional BIOS code, such as from a video controller, IDE controller, SCSI controller, etc. and displays a start-up information screen, in block 935. As examples, the video controller BIOS is often found at C000h, while the IDE controller BIOS code is often found at C800h. The BIOS code also identifies plug-and-play devices and other similar devices and then displays a summary screen of devices identified, in block 945.

The BIOS code closes the access locks to the security hardware, in block 250. The BIOS code identifies the boot location, and the corresponding boot sector, in block 255. The boot location may be on a floppy drive, a hard drive, a CDROM, a remote location, etc. The BIOS code next calls the boot sector code at the boot location to boot the computer system, such as with an operating system, in block 960.

Turning now to FIG. 2C, the method 200C includes deciding whether to set the OAR-lock, in decision block 246. The OAR-lock in decision block 246 may correspond to the first indicator described above with respect to FIG. 6. The OAR-lock in decision block 246 may also correspond to setting the OAR lock override bit 1050 described below with respect to FIG. 10D. If the decision is made to set the OAR-lock, then, according to one embodiment, all access to the security hardware 370 is blocked, in block 247. If the decision is made not to set the OAR-lock, then the method 200C moves to decision block 248. In decision block 248, the method 900C decides whether to set the OAR-lock change bit. The OAR-lock change bit in decision block 248 may correspond to the second indicator described above with respect to FIG. 6. The OAR-lock change bit in decision block 248 may also correspond to setting the change OAR lock override bit 1055 described below with respect to FIG. 10D. If the decision is made to set the OAR-lock change bit, in decision block 248, then, according to one embodiment, the OAR-lock cannot be changed, thereafter, as changes to the OAR-lock are themselves locked out, in block 249.

Turning now to FIG. 2D, the method 200D includes a processor, such as processors 102, 805, etc., operating in a mode that is not SMM, in block 204. In block 206, code being processed by the processor attempts to access any part of the security hardware 370, or other hardware whose access may require a check of an access lock similar to the access locks 460. The method checks, at decision block 207, to see if the security hardware 370 is available. If the security hardware 370 is not available, at decision block 207, then the method 900D exits or returns. If the security hardware 370 is available, at decision block 207, then the method 260D accesses the security hardware 370, at block 230. The method, optionally, closes the access locks to the security hardware, if necessary, at block 950.

Turning now to FIG. 2E, the method 200E includes an embodiment of decision block 207 from FIG. 2D. The method 200E includes checking if access to all security hardware is locked out, i.e. forbidden, at decision block 290. If access to all security hardware is locked out, then at decision block 290 the method 900E moves to decision block 292. If access to all security hardware is not locked out, then the method 200E moves to decision block 291. In decision block 291, the method 200E checks if the requested security hardware is locked out (e.g. separately using one or more access locks).

If the requested security hardware is locked out, then the method 260E moves to decision block 292. If the requested security hardware is not locked out, then the method 260E moves directly to block 293. In decision block 292, the method 960E checks if the access lock for the requested security hardware can be changed, e.g., unlocked. If the access lock for the requested security hardware cannot be changed, then in decision block 292 the method 200E aborts the access to the security hardware. If the access lock for the requested security hardware can be changed, then in decision block 292 the method 200E requests authorization, such as from a user, to change the access lock for the requested security hardware, in decision block 293. If the authorization to change the access lock for the requested security hardware is not given, then the method 900E aborts the access to the security hardware. If the authorization to change the access lock for the requested security hardware is not given, then the method 900E moves to block 994 and changes the lock to allow access to the requested security hardware.

It is noted that any authorization method may be used in decision block 993. Any authorization methods known in the art that have security properties in the presence of an observer may be used.

Turning now to FIG. 2F, the method 200F includes the processor loading code instructions into SMM space in the RAM memory, in block 905. For example, loading code instructions into SMM space may occur in response to an SMI#. The access locks to the security hardware are opened in block 915. The opening of the access locks may be through the SMM code instructions or through a hardware mechanism, or both.

The processor processes the code instructions from SMM space in the RAM memory, in block 220. The method 900F includes accessing the security hardware 370, in block 930. As the computer system is in SMM and the access locks have been opened, in block 915, the security hardware is available to most or all of the subsystems of the computer system 100, as desired.

The method 900F includes closing the access locks to the security hardware 370, in block 950. The processor reloads the previous state and continues operating, in block 965. It is noted that the processing of the SMM code instructions, in block 220, may continue while the actions described in block 930 occurs. Preferably, the actions described in block 950 occur after the processing of the SMM code instructions, in block 220, has ceased.

Turning now to FIG. 9G, the method 900G includes the processor loading code instructions into SMM space in the RAM memory, in block 905. For example, the loading of code instructions into SMM space may occur in response to an SMI#. The method 900G next checks if the security hardware is available, in decision block 907. If the security hardware is not available, then in decision block 907 the method 900G aborts the access to the security hardware. If the security hardware is available, then the method 900G continues with block 220.

The processor executes the code instructions from SMM space in the RAM memory, in block 220. The method 900F includes accessing the security hardware 370, in block 930. As the computer system is in SMM and the access locks are open, as determined in decision block 207, the security hardware is available to most or all of the subsystems of the computer system 100, as desired.

The method 900G includes closing the access locks to the security hardware 370, in block 950. The processor reloads the previous state and continues operating, in block 965. It is noted that the executing of the SMM code instructions, in block 220, may continue while the actions described in block 930 occurs. Preferably, the actions described in block 950 occur after the processing of the SMM code instructions, in block 220, has ceased.

It is noted that other processes of locking and unlocking the security hardware 370, other than the access locks, may be used. The methods 900A–900G are intended to extend to those other processes.

For the purposes of this disclosure, the computer system is considered to have two operating modes, normal and SMM. There are boot phases that are not in SMM, but they are, by definition, as trusted as SMM, and therefore considered equivalent to SMM herein. The boot code configures and arranges how SMM will work. SMM derives its trustworthiness from the trustworthiness of the boot code. It is contemplated that the standard boot sequence could be varied. Variations include a transition to a setup environment where the user may have the opportunity to input parameters. The input parameters may, for example, modify the BIOS code. Most setup environments return to reset before loading the operating system and operating in normal mode. This is a form of maintenance mode that is an alternative to loading the operating system and is not part of the normal mode. As contemplated, the access locks would not be set in this mode. It would be part of the boot process and as trusted as SMM, although security measures could be used if remote accesses are possible inside the setup environment.

FIGS. 10A, 10B, and 10C illustrate block diagrams of embodiments 460A, 460B, and 460C of the access locks 460 shown in FIG. 6. In FIG. 10D, a block diagram of an embodiment of the OAR override register 455, from FIG. 6, is shown. In the embodiment 460A shown in FIG. 10A, the one or more access locks 460 include a sequester bit register 1005. The bit stored in the sequester bit register 1005 may be set or cleared as a flag. In the embodiment 460B shown in FIG. 10B, the one or more access locks 460 include two or more sequester registers configured to store two or more sequestering bits to lock or unlock all of the devices within the security hardware 370. The additional bits beyond the sequester bit stored in the sequester register 1005 allows for flag bits for locking and unlocking of privileges separately. For example, a write privilege could be locked, while a read privilege could be unlocked. In the embodiment of FIG. 10C, the one or more access locks 460 include one or more sequester registers 1015A–1015N for each device within the security hardware 370C.

Figure 18A:
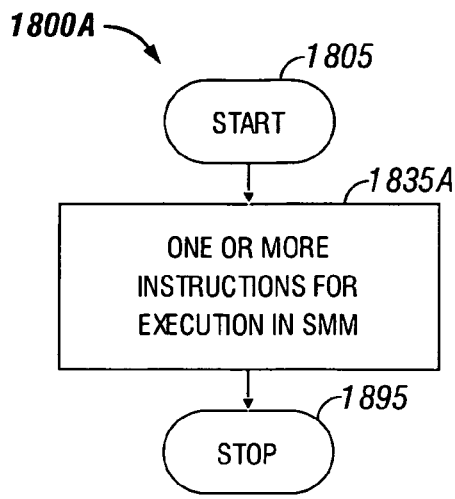

In FIG. 10D, the OAR override 445 includes an OAR-lock override register 1050 that stores at least one OAR-lock override bit, and a change OAR-lock override register 1055 that stores at least one change OAR-lock override bit. According to one embodiment of the present invention, if the OAR-lock override bit is not set, then access to the security hardware 370 is determined by the settings of the access locks 460. If the OAR-lock override bit is set, then the access locks 460 are ignored in favor of the security hardware 370 being either always available or never available, based on the implementation. Preferably, the security hardware is never available when the OAR-lock override bit is set. The setting of the OAR-lock override bit may be changed in SMM (or with authorization) unless the change OAR-lock override bit is set. Preferably, the change OAR-lock override bit is OAR, similar to one embodiment of the access locks 460, and may be set, in various embodiments, with the access locks 460 at boot time, such as in block 950. FIG. 18A illustrates a prior art flowchart of an SMM program 1800A. The prior art SMM program 1800A starts at 1805, includes one or more instructions for execution in SMM, in block 1810A, and ends at 1895 without interruption. In other words, prior art SMM program 1800A is uninterruptible and has no other entry points than the start at 1805. There are also no reasonable exit points, barring processor failure, other than the stop at 1895.

Figure 18B:
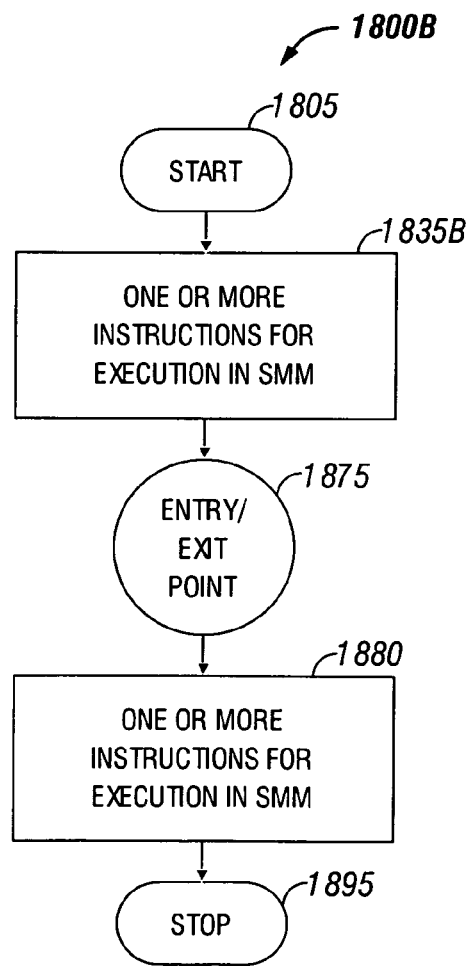

FIG. 18B illustrate a flowchart of an embodiment of operations of an interruptible and re-enterable SMM program 1800B, according to one aspect of the present invention. In contrast to the prior art SMM program 1800A, the interruptible and re-enterable SMM program 1800B includes a start at 1805, one or more instructions for execution in SMM, in block 1810B, an entry/exit point 1815, one or more instructions for execution in SMM, in block 1820, and the stop at 1895.

Figure 18C:
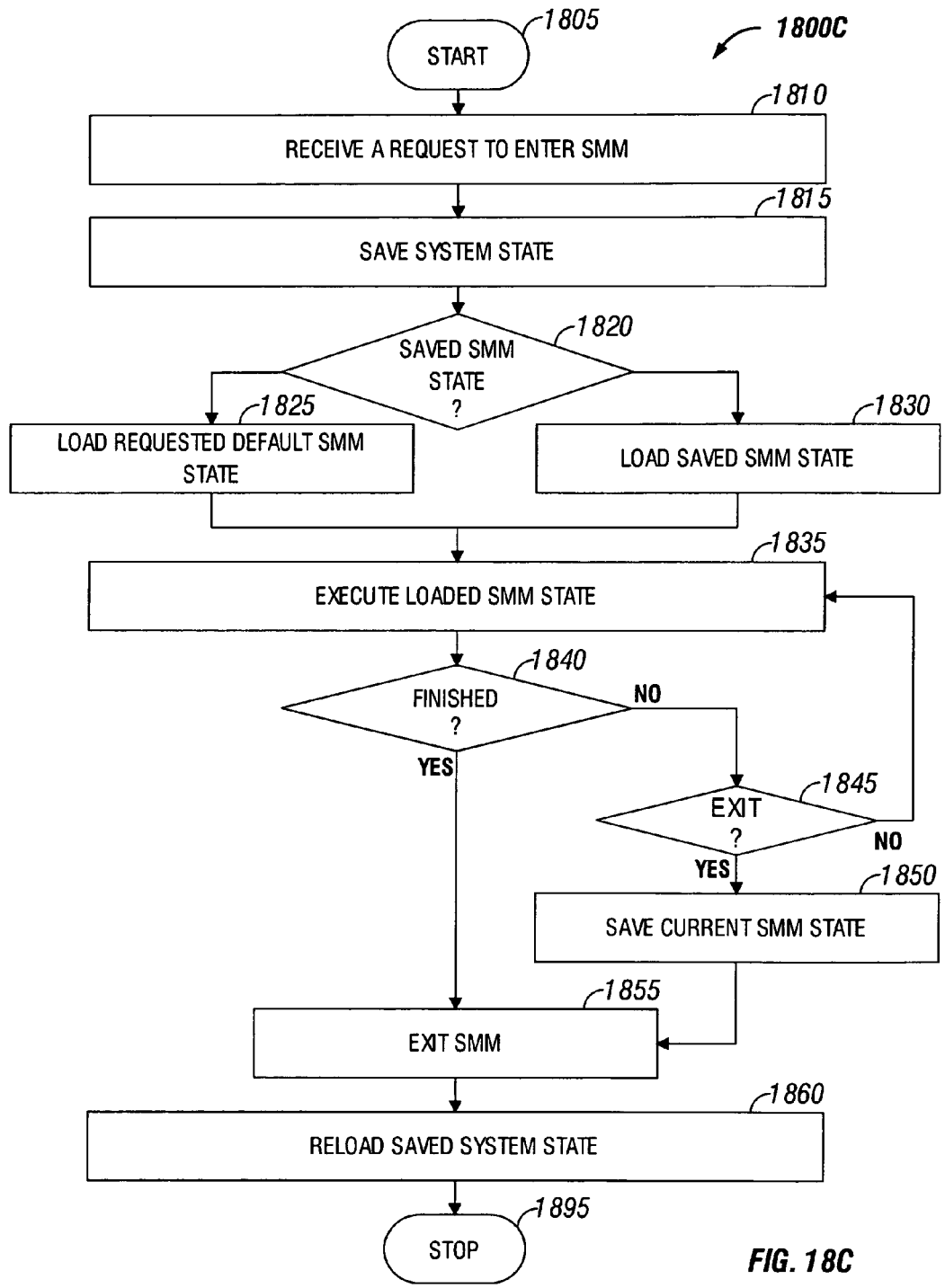

Also in contrast to the prior art SMM program 1800A, FIG. 18C illustrates an embodiment of operation of a computer system running the interruptible and re-enterable SMM program 1800B, according to one aspect of the present invention. The operations 1800C of the computer system includes a start 1805. The operations also include receiving a request to enter SMM, at 1810 and saving the system state at 1815. The method checks, at 1820, for a saved SMM state, as could be found from exiting the SMM program 1800B at 1875. If no saved SMM state is found at 1820, then load the requested default SMM state at 1825. If a saved SMM state is found at 1820, then load the saved SMM state, at 1830.

The method 1800C executes the loaded SMM state, at 1835, either the default state from 1825 or the saved state at 1830. If the SMM processing is finished, at 1840, then the method moves to 1855 and exits SMM. If the SMM processing is not finished, then the method continues execution of the SMM state, if no exit request is received at 1845. If the exit request is received at 1845, then the method saves the current SMM state at 1850 and exits SMM at 1855. The saved system state is reloaded at 1860, and the method ends at the stop 1895.

While only one entry/exit point 1815 is shown in the embodiment of FIG. 18B, other embodiments may include two or more entry/exit points 1815 in an SMM program 1800B or the operations of the method 1800C shown in FIG. 18C. In these embodiments, each entry/exit point 1815 would have one or more instructions for execution in SMM, similar to blocks 1810B and 1820, both before and after the entry/exit point 1815.

For example, in one embodiment, block 1810B includes one instruction for execution in SMM, followed by an entry/exit point 1815A. Entry/exit point 1815A is followed by another single instruction for execution in SMM, in block 1820A. Block 1820A is followed by another entry/exit point 1815B. Entry/exit point 1815B is followed by another single instruction for execution in SMM, in block 1820B. Block 1820B is followed by the stop 1895. While a single instruction in blocks 1810B, 1820A, and 1820B may be small, the concept of regularly spaced Entry/exit points 1815 is illustrated. In other embodiments, two, three or more instructions for execution in SMM may be substituted for the single instructions. In still other embodiments, there may be a variable number of instructions for execution in SMM in blocks 1810B, and 1820. The number of instructions may depend on the execution times for each set of instructions, so that SMM may be interruptible every so often during execution.

It is noted that forced exits from SMM, as are taught herein in one aspect of the present invention, for example, with respect to FIG. 10A, and re-entry into SMM, as is also taught herein in another aspect of the present invention, for example, with respect to FIG. 10B, are but two examples of how interruptible, re-enterable SMM code could be implemented or used. Those of skill in the art of computer programming with full appreciation of this disclosure will appreciate that many programming techniques used with non-SMM code that used interruptible, re-enterable code flow will now be available in SMM code.

Figure 19A:
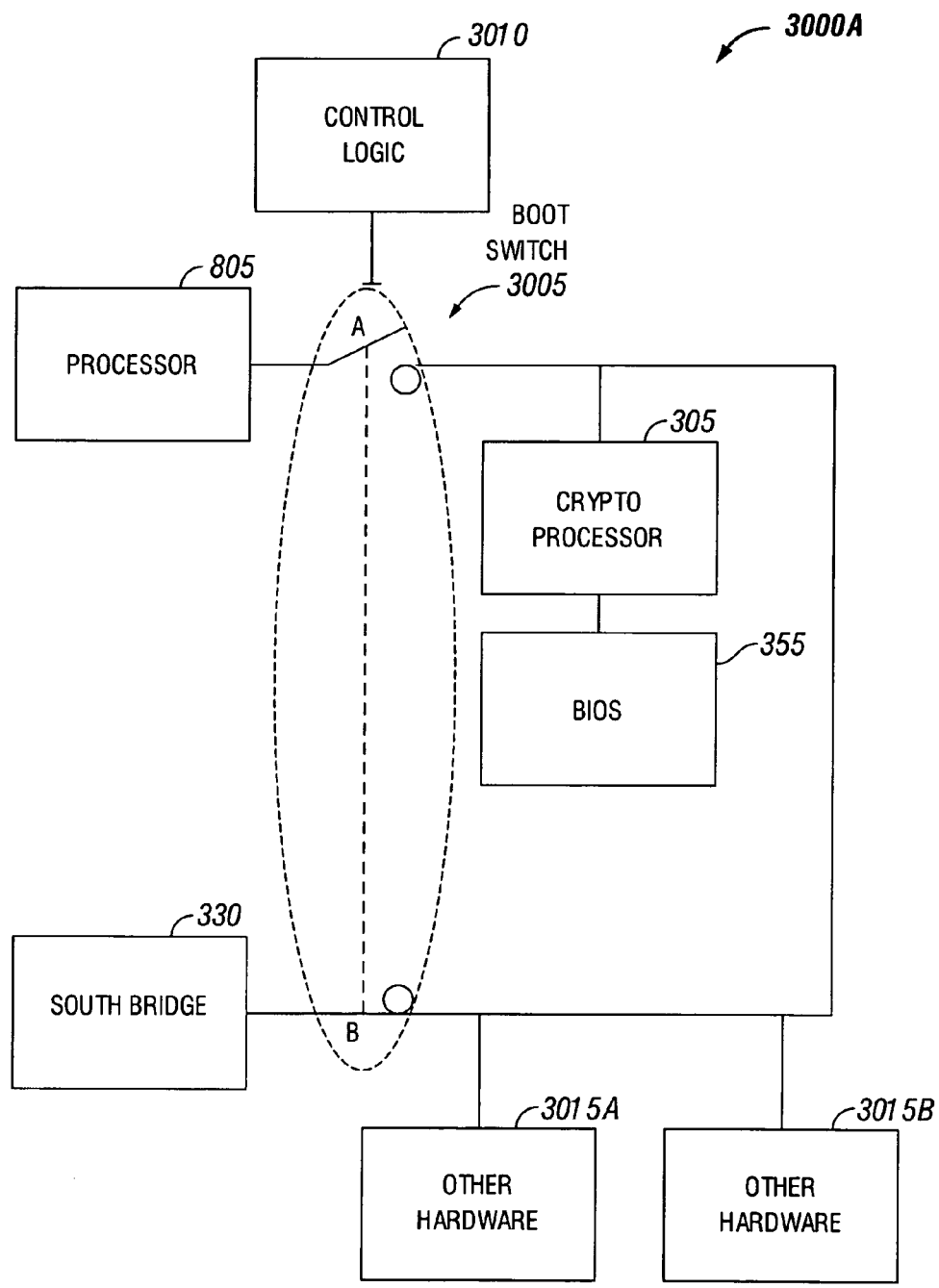
Figure 19B:
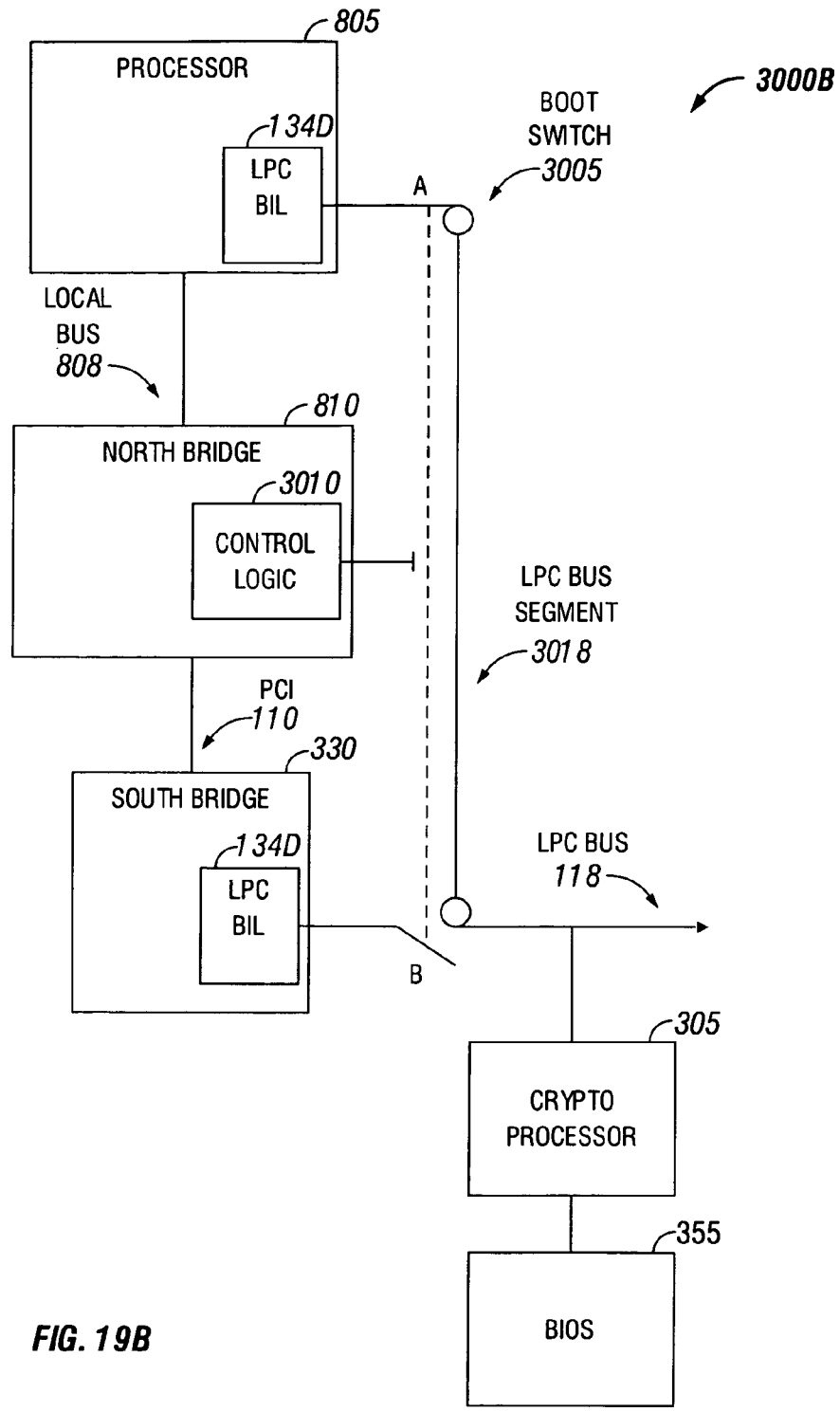
Figure 19C:
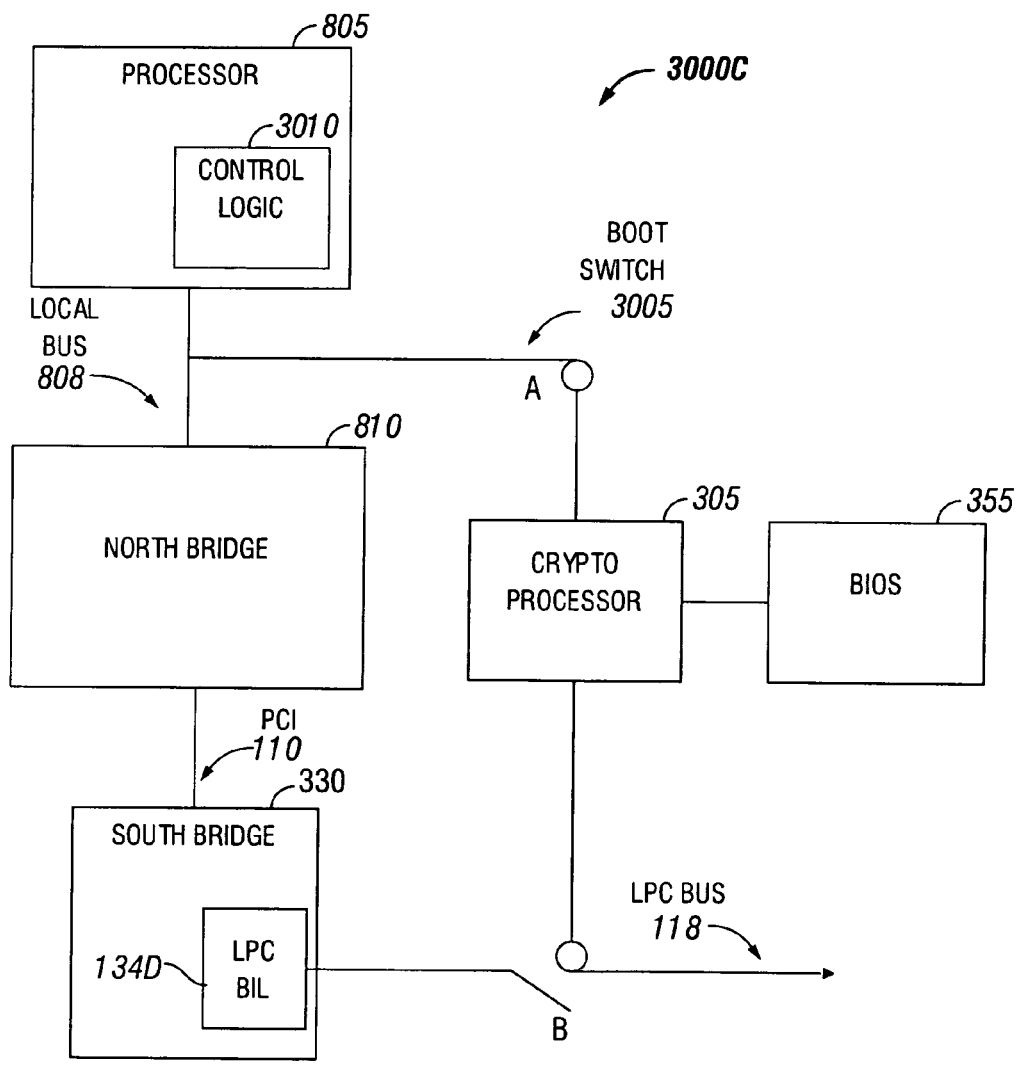

FIGS. 19A, 19B, and 19C illustrate block diagrams of embodiments 3000A, 3000B, and 3000C of computer systems with the BIOS ROM 355 accessible to the processor 805 at boot time and to the south bridge 330 at other times. Common to all three figures are a processor 805, a south bridge 330, control logic 3010, a boot switch 3005, a crypto-processor 305, and BIOS ROM 355. The processor 805 is coupled to the south bridge 330 in a usual fashion at times other than at boot time. At boot time, the control logic 3010 is operable to change the boot switch 3005 such that the processor 805 has access to the BIOS 355 without going through the south bridge 330 in the usual fashion.

In FIG. 19A, embodiment 3000A shows the processor 805 coupled to one part (A) of the boot switch 3005. Part A of the boot switch 3005 is open, as would occur after booting. The control logic 3010 is coupled to the boot switch 3005 to control the operations of the boot switch 3005. The south bridge 330 is coupled to Part B of the boot switch 3005. Part B of the boot switch 3005 is closed, again as would occur after booting. The south bridge 330 is shown coupled to the bus to which the BIOS is coupled, shown as being through the crypto-processor 305. Other hardware 3015A and 3015B are also shown coupled to the bus, which may be an LPC bus 118, or another bus.

In FIG. 19B, embodiment 3000B shows the processor 805 coupled to one part (A) of the boot switch 3005 through an instance of LPC bus interface logic (BIL) 134D. Part A of the boot switch 3005 is closed, as would occur during booting. The processor 805 is coupled to a north bridge 810 through a local bus 808. The north bridge 810 includes the control logic 3010, coupled to the boot switch 3005 to control the operations of the boot switch 3005. The north bridge 808 is further coupled to the south bridge 330 through a PCI bus 110. The south bridge 330 is coupled to Part B of the boot switch 3005 through another instance of LPC BIL 134D. Part B of the boot switch 3005 is open, again as would occur during booting. The south bridge 330 is shown coupled to an LPC bus to which the BIOS 355 is coupled, shown as being through the crypto-processor 305. Other hardware 3015A and 3015B are not shown in this embodiment, but may be present. The connection between Part A of the boot switch 3005 and Part B of the boot switch 3005 is shown as an LPC bus segment 3018.

As illustrated, during the booting process, the processor 805 is operable to use an LPC bus protocol to access the BIOS 355 directly, without going through the north bridge 810 or the south bridge 330. By providing a more direct connection between the processor 805 and the BIOS ROM 355, the computer system 3000B may advantageously boot or reboot faster than using more usual methods of accessing the BIOS ROM 355. After booting, accesses to the BIOS ROM 355 are through the south bridge 330 using the LPC bus 118.

In FIG. 19C, embodiment 3000C shows the processor 805 coupled to one part (A) of the boot switch 3005 through the local bus 808. Part A of the boot switch 3005 is closed, as would occur during booting. The processor 805 is also coupled to the north bridge 810 through the local bus 808. The processor 805 includes the control logic 3010, coupled to the boot switch 3005 to control the operations of the boot switch 3005. The north bridge 808 is further coupled to the south bridge 330 through a PCI bus 110. The south bridge 330 is coupled to the LPC bus 118 an instance of LPC BIL 134D. Part B of the boot switch 3005 is coupled to the LPC bus 118. Part B of the boot switch 3005 is open, again as would occur during booting. The BIOS ROM 355 is coupled through the crypto-processor 305 to the local bus 808 when Part A of the boot switch 3005 is closed and to the LPC bus 118 when Part B of the boot switch 3005 is closed. The crypto-processor 305 may include bus interface logic for the local bus 808 and the LPC bus 118, or the crypto-processor 305 may be configured to translate the bus protocols as necessary to pass bus cycles to the BIOS ROM 355. Other hardware 3015A and 3015B are not shown in this embodiment, but may be present.

As illustrated, during the booting process, the processor 805 is operable to use the local bus protocol to access the BIOS 355 directly, without going through the north bridge 810 or the south bridge 330. By providing a more direct connection between the processor 805 and the BIOS ROM 355, the computer system 3000C may advantageously boot or reboot faster than using more usual methods of accessing the BIOS ROM 355. After booting, accesses to the BIOS ROM 355 are through the south bridge 330 using the LPC bus 118.

It is noted that the control logic 3010 may be signaled to or configured to operate the boot switch 3005 at times other than booting to allow for faster access to the BIOS ROM 355, the crypto-processor 305 (when present), or, for example, other hardware 3015 on the LPC bus.

In various embodiments of the present invention, the security of SMM is assumed. It is noted that one or more so-called "backdoors" may exist that could be exploited to compromise the security of SMM. The issues contemplated include misuse of the hardware debug test (HDT) mode of the processor 805 as well as the ability of the processor 805 to load and replace microcode. Illustrated in FIGS. 20A–D are various embodiments 805A, 805B, 805C, 805D of the processor 805, each of which includes various security protections against one or more backdoor attacks.

Figure 20A:
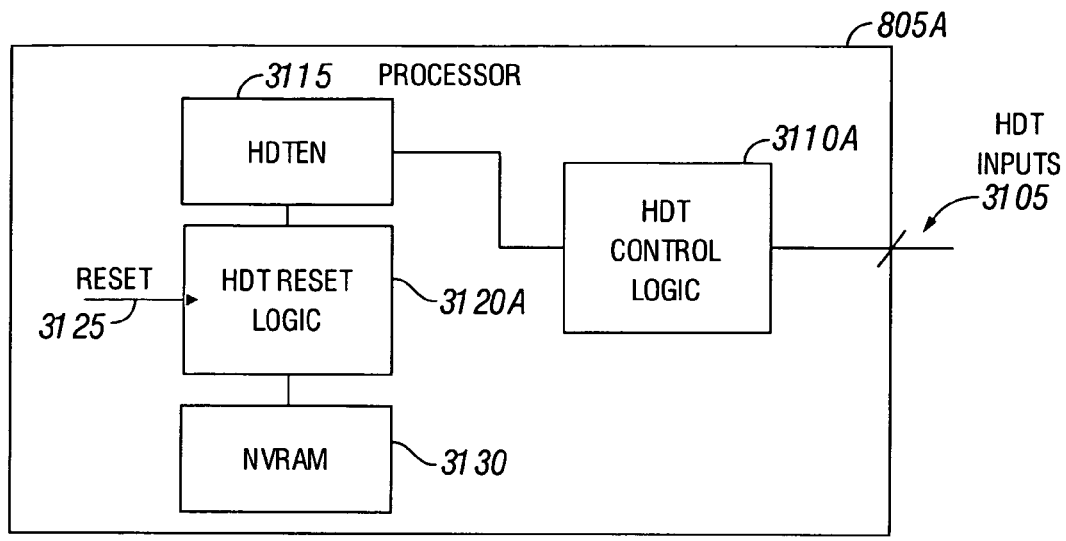

In FIG. 20A, the processor 805A includes HDT control logic 3110A, HDT reset logic 3120A, and one or more registers, including an HDT enable register 3115 and non-volatile random access memory (NVRAM) 3130. As shown, the HDT control logic 3110A is coupled to receive a plurality of input signals through a plurality of HDT pins 3105. The HDT control logic 3110A is further coupled to the HDT enable register 3115. The HDT reset logic 3120A is coupled to receive a RESET signal over a line 3125 and to access (i.e. read and write) the HDT enable register 3115 and the NVRAM 3130.

Figure 20B:
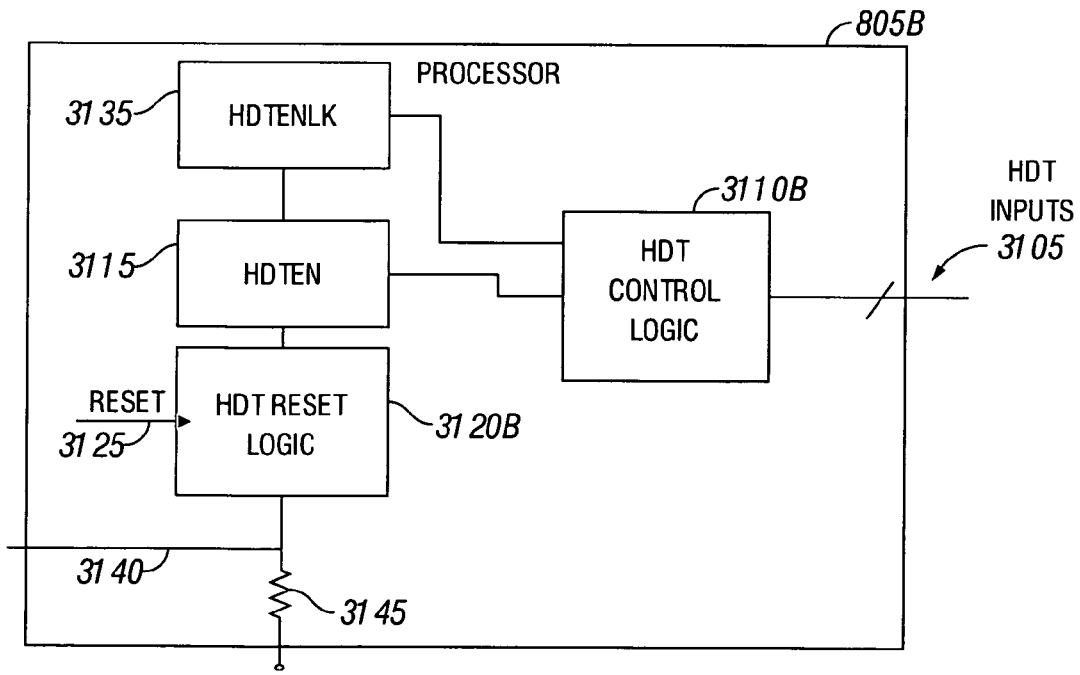

In FIG. 20B, the processor 805B of FIG. 20B includes HDT control logic 3110B, HDT reset logic 3120B, and two registers, including the HDT enable register 3115 and an HDT enable lock register 3135. As shown, the HDT control logic 3110B is coupled to receive a plurality of input signals through the plurality of HDT pins 3105. The HDT control logic 3110B is further coupled to the HDT enable register 3115 and the HDT enable lock register 3135. The HDT reset logic 3120B is coupled to receive the RESET signal over the line 3125 and a signal, such as over a line 3140, through a pull-up (or pull-down) resistor 3145.

Figure 20C:
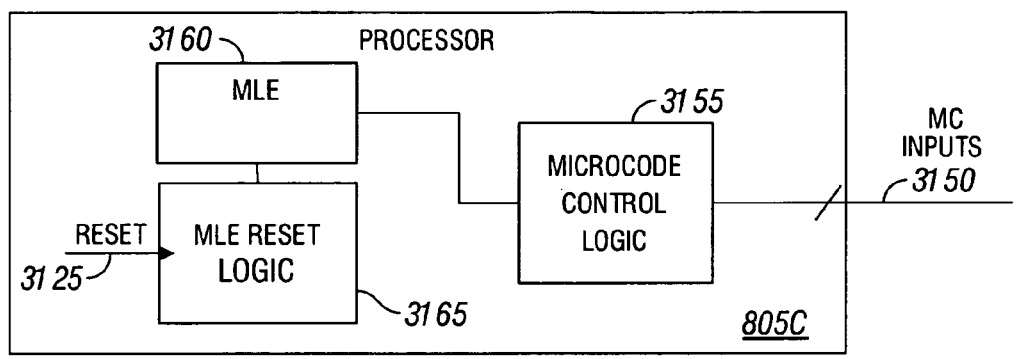

In FIG. 20C, the processor 805C includes microcode control logic 3155, microcode loader enable reset logic 3165, and one or more registers, including a microcode loader enable register 3160. As shown, the microcode control logic 3155 is coupled to receive a plurality of input signals through a plurality of microcode input pins 3150. The microcode control logic 3155 is further coupled to the microcode loader enable register 3160. The microcode loader enable reset logic 3165 is coupled to receive the RESET signal and to access the microcode loader enable register 3160.

Figure 20D:
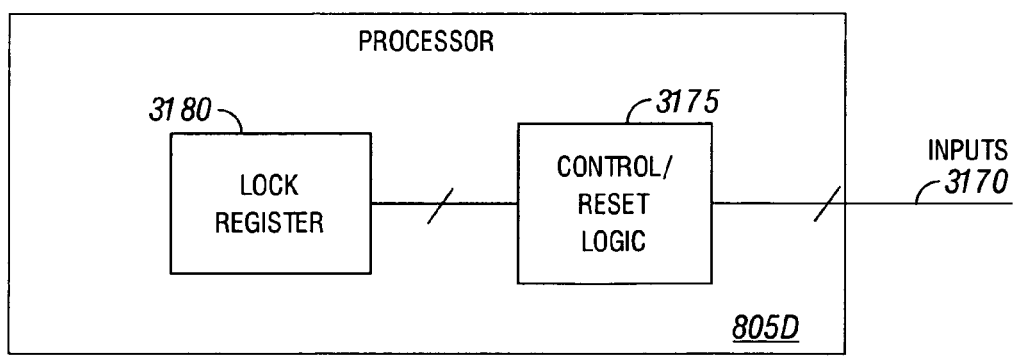

In FIG. 20D, the processor 805D includes HDT control logic 3110 integrated with the microcode control logic 3155, the HDT reset logic 3120, and the MLE reset logic 3165 to form control/reset logic 3175. The HDT enable register 3115 and the microcode loader enable register 3160 are integrated into a multibit lock register 3180. A plurality of inputs 3170 are shown to the control/reset logic 3175. The plurality of inputs 3170 may include the HDT inputs 3105, the microcode inputs 3150, and/or the reset signaling means. Other embodiments (not shown) integrate only the HDT control logic 3110 and the microcode control logic 3155, or just the HDT reset logic 3120 and the MLE reset logic 3165.

According to various embodiments of the present invention, the registers 3115, 3135, and 3160, as well as the NVRAM 3130 include storage space for one or more bits. In one embodiment, each register is configured to store a single bit. It is noted that the enable registers 3115 and 3160 may also be integrated into a single lock register, and the HDT enable lock register 3135 may be used as a microcode enable lock register. It is contemplated that the registers 3115, 3135, 3160, and/or 3180 could be included in the SMM MSRs 807.

In various embodiments, the HDT enable register 3115 is configured to store one or more HDT enable bits signifying whether HDT mode is enabled or disabled. The HDT reset logic 3120 is configured to set the one or more HDT enable bits to a default state upon a reset of the processor 805.

Multiple embodiments for controlling the HDT modes are contemplated, such as those illustrated in FIGS. 20A and 20B. In one embodiment, the HDT mode is enabled as the default on non-production processors 805 used for engineering and testing. The HDT mode may be disabled as the default in standard production processors 805. In another embodiment, illustrated in FIG. 20A, the default state may be stored in and read from the NVRAM 3130. In this embodiment, the default state may be changeable, but in the illustrated embodiment, the default state is set to disabled. In still another embodiment, illustrated in FIG. 20B, the default state is set using a strapping option. The default value is provided to the HDT reset logic 3120B through the pull-up (or pull-down) resistor 3145.

Multiple embodiments for controlling the microcode loader modes are also contemplated, such as those illustrated in FIGS. 20C and 20D. In one embodiment, not illustrated, the microcode update mode is enabled as the default on non-production processors 805 used for engineering and testing. The microcode update mode may be disabled as the default in standard production processors 805. In another embodiment, similar to that illustrated in FIG. 20A, the default state may be stored in and read from the NVRAM 3130. In this embodiment, the default state may be changeable, but in the illustrated embodiment the default state is set to disabled. In still another embodiment, illustrated in FIG. 20B, the default state is using a strapping option. The default value is provided to the MLE reset logic 3165 through the pull-up (or pull-down) resistor 3145.

Figure 21:
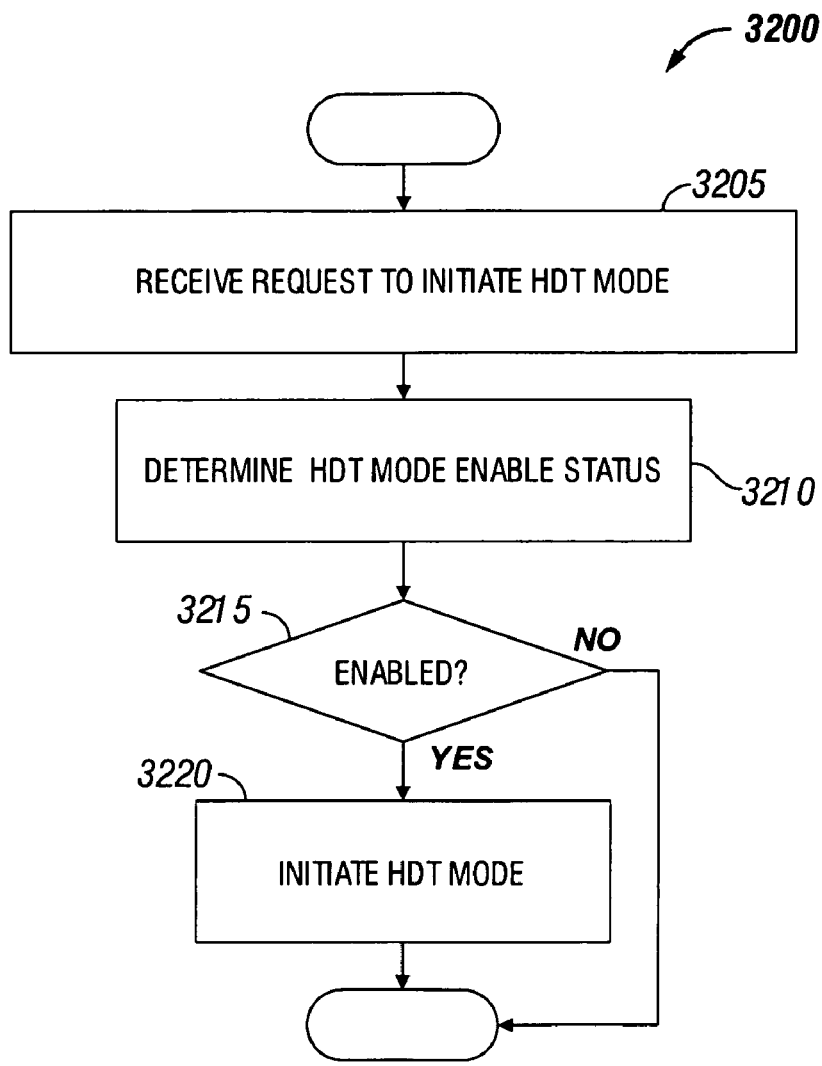

Turning now to FIG. 21, a method 3200 for initiating the HDT mode is shown. In response to receiving a request to enter the HDT mode (step 3205), the HDT control logic 3110 checks the status of the one or more HDT enable bits to see if the HDT mode is enabled or disabled (step 3210). If the HDT mode is enabled (step 3215), then the HDT control logic 3110 initiates the HDT mode (step 3220). If the HDT mode is disabled (step 3215), then the HDT control logic 3110 will not initiate the HDT mode.

Figure 22:
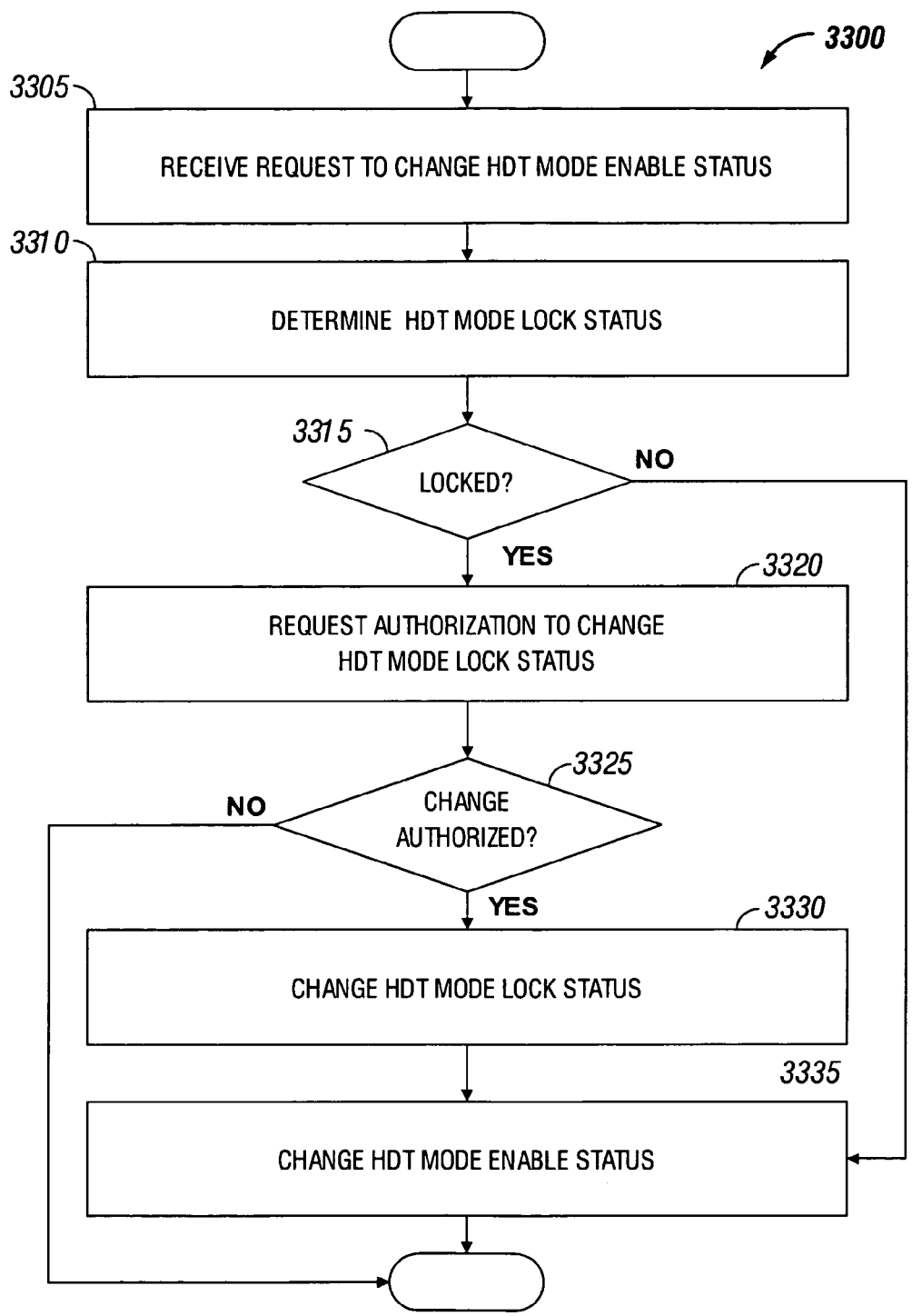

Turning now to FIG. 22, a method 3300 for changing the HDT mode enable status, which includes an HDT mode lock, is shown. In response to receiving a request to enter the HDT mode (step 3305), the HDT control logic 3110 checks the status of the one or more HDT enable lock bits to determine if the HDT lock mode is locked or unlocked (step 3310). If the HDT lock mode is unlocked (step 3315), then the HDT control logic 3110 initiates HDT mode (step 3335). If the HDT lock mode is locked (step 3315), then the HDT control logic 3110 requests authorization to change the HDT lock mode status (step 3320). If the change is authorized (step 3325), then the HDT control logic 3110 changes the HDT mode lock bit to unlocked (step 3330). If the change is not authorized (step 3325), then the HDT control logic 3110 does not change the HDT mode lock bit.

In various embodiments, the HDT enable status may be changed by setting or resetting the one or more HDT enable status bits. For example, the HDT mode may be disabled, but inside SMM, a predetermined input to the HDT control logic 3110 may signal the HDT control logic 3110 to change the HDT mode status to enabled. In the embodiment of FIG. 20A, for example, once signaled, the HDT control logic 3110 would change the status of the HDT enable bit from disabled to enabled.

Referring back to the embodiment of FIG. 20B, for example, in response to receiving a request to change the HDT mode status, the HDT control logic 3110 checks the status of the one or more HDT enable lock bits to see if the HDT lock mode is enabled or disabled. If the HDT lock mode is disabled, then the HDT control logic 3110 may change the HDT mode status. If the HDT lock mode is enabled, then the HDT control logic 3110 will not change the HDT mode status.

It is noted that the method 3300 may alternatively terminate if the microcode update lock status is locked (step 3315), instead of requesting authorization to change the microcode update lock status (step 3320). The method 3300 may also include receiving a request to change the microcode update lock status (not shown) prior to the method 3300 requesting authorization (step 3320).

Figure 23:
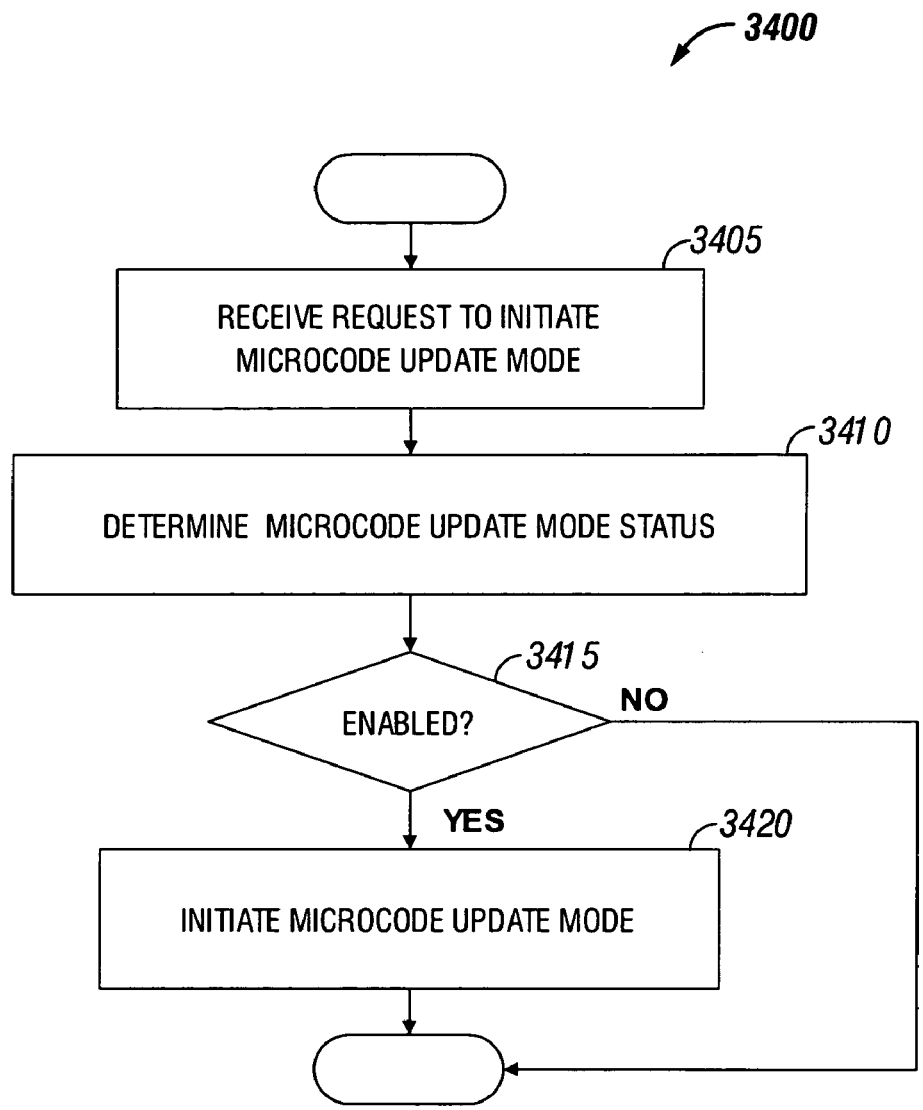

Turning now to FIG. 23, a method 3400 for initiating the microcode loader is shown. In response to receiving a request to initiate the microcode update mode (step 3405), the microcode control logic 3155 checks the status of the one or more microcode enable bits to see if microcode update mode is enabled or disabled (step 3410). If the microcode update mode is enabled (step 3215), then the microcode control logic 3110 initiates the microcode update mode (step 3220). If the microcode update mode is disabled (step 3215), then the microcode control logic 3110 will not initiate the microcode update mode.

Figure 24:
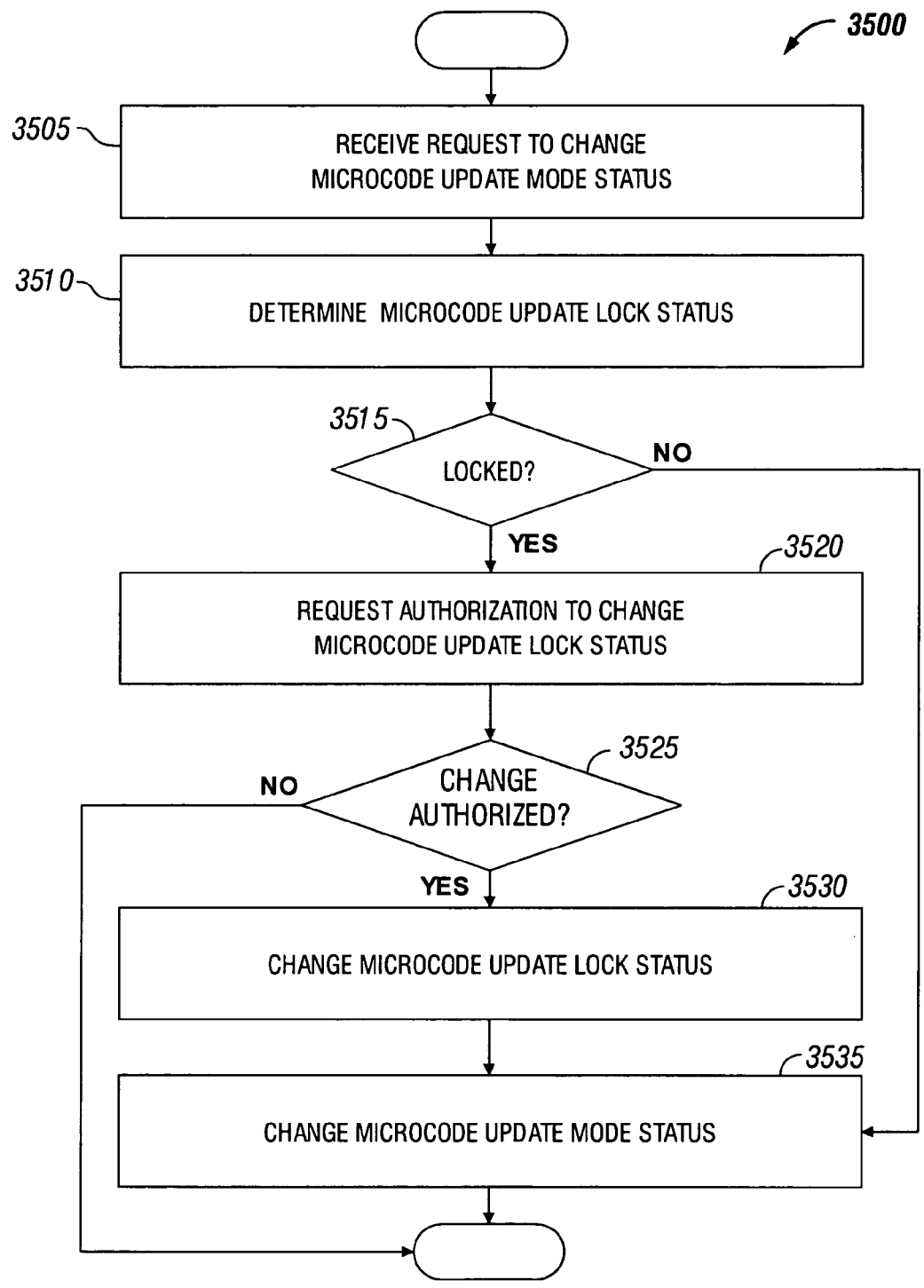
Figure 25A:
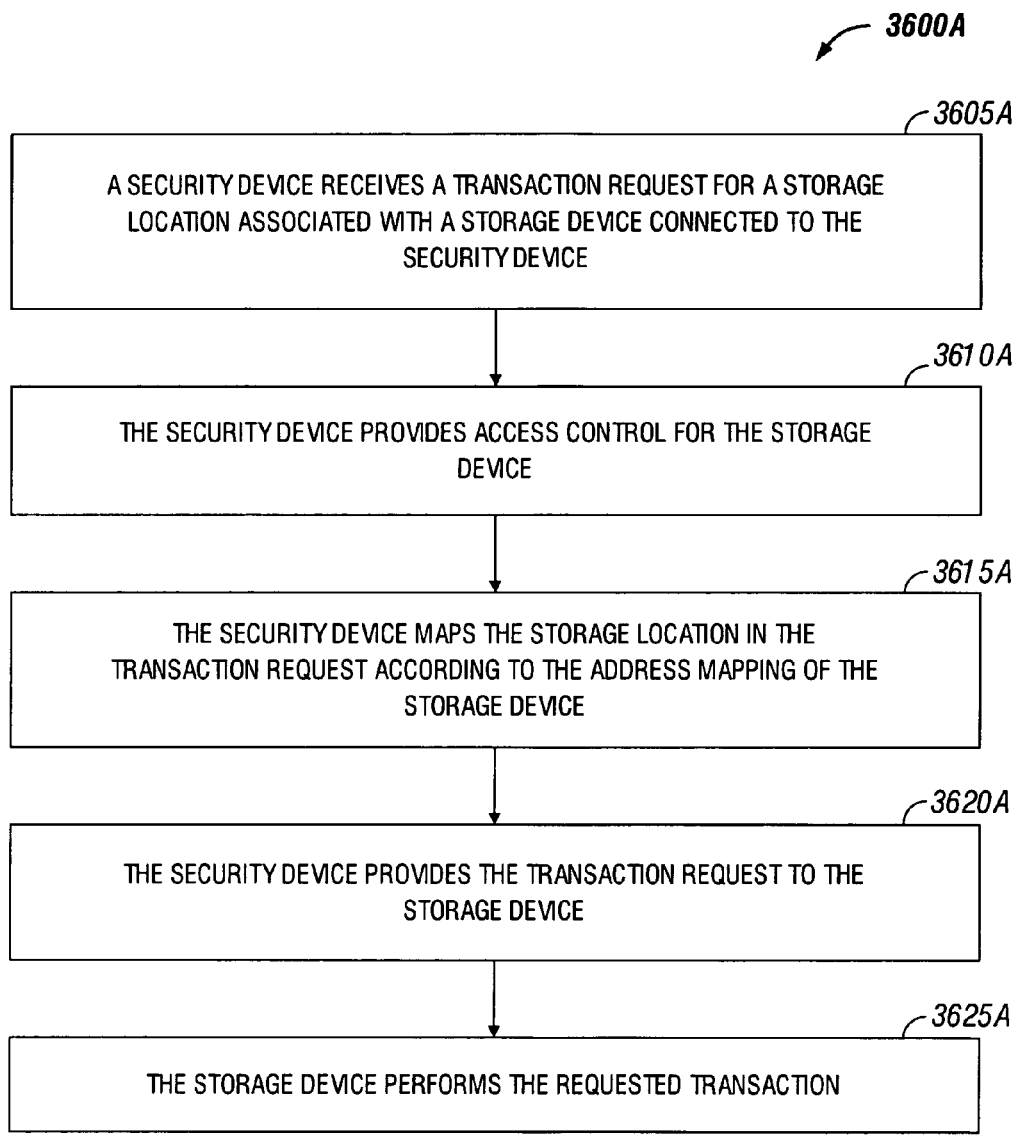
Figure 25B:
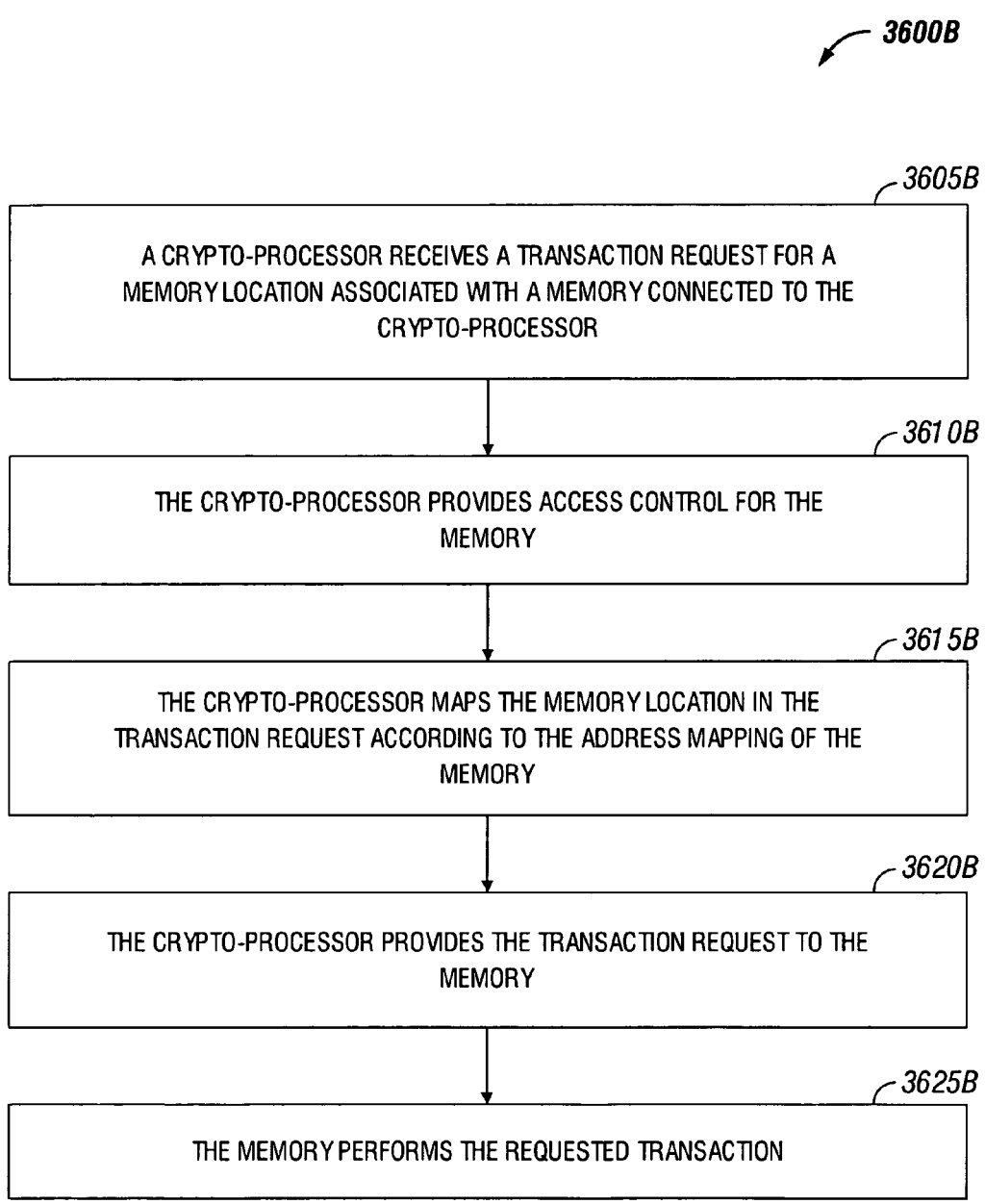
Figure 26:
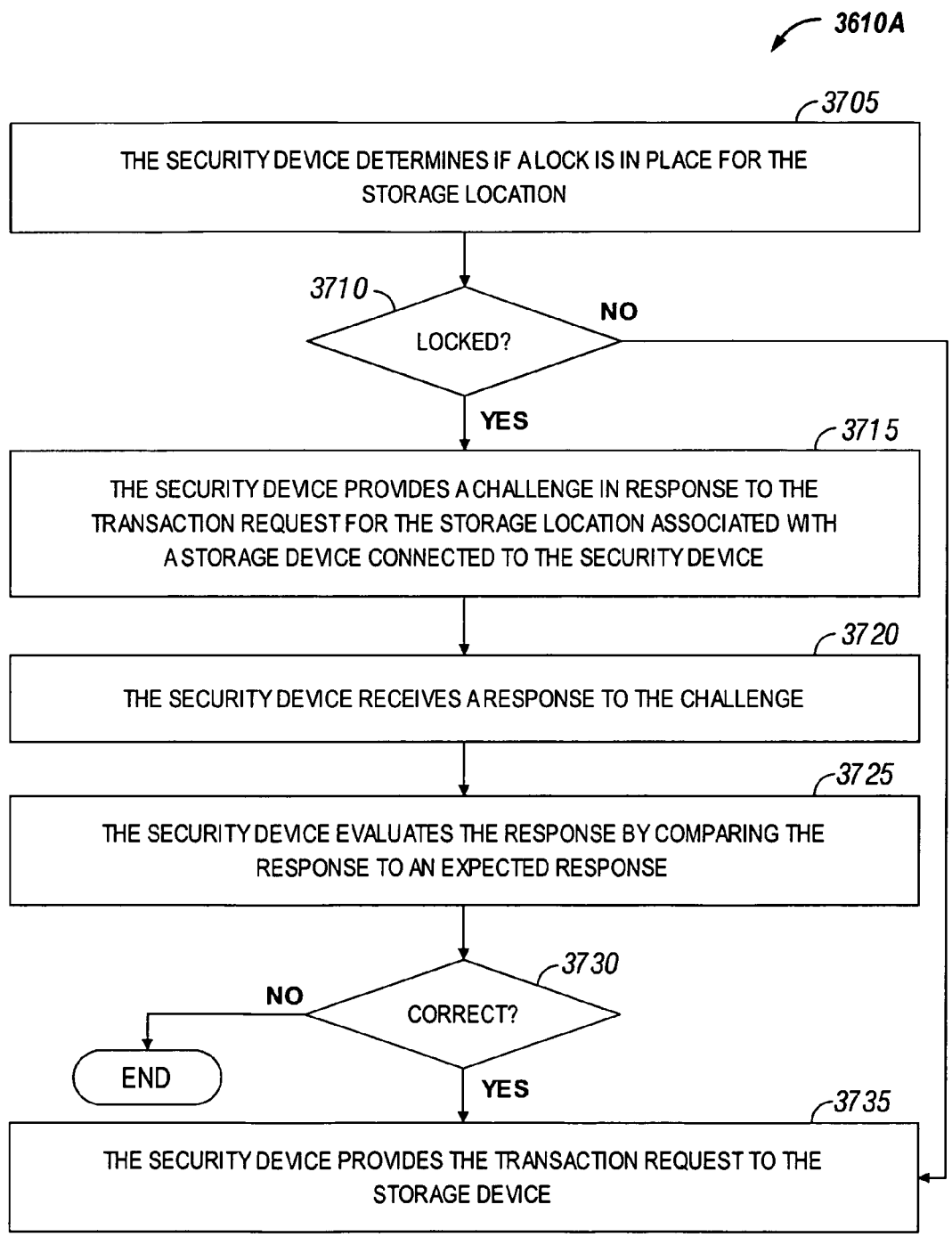
Figure 27:
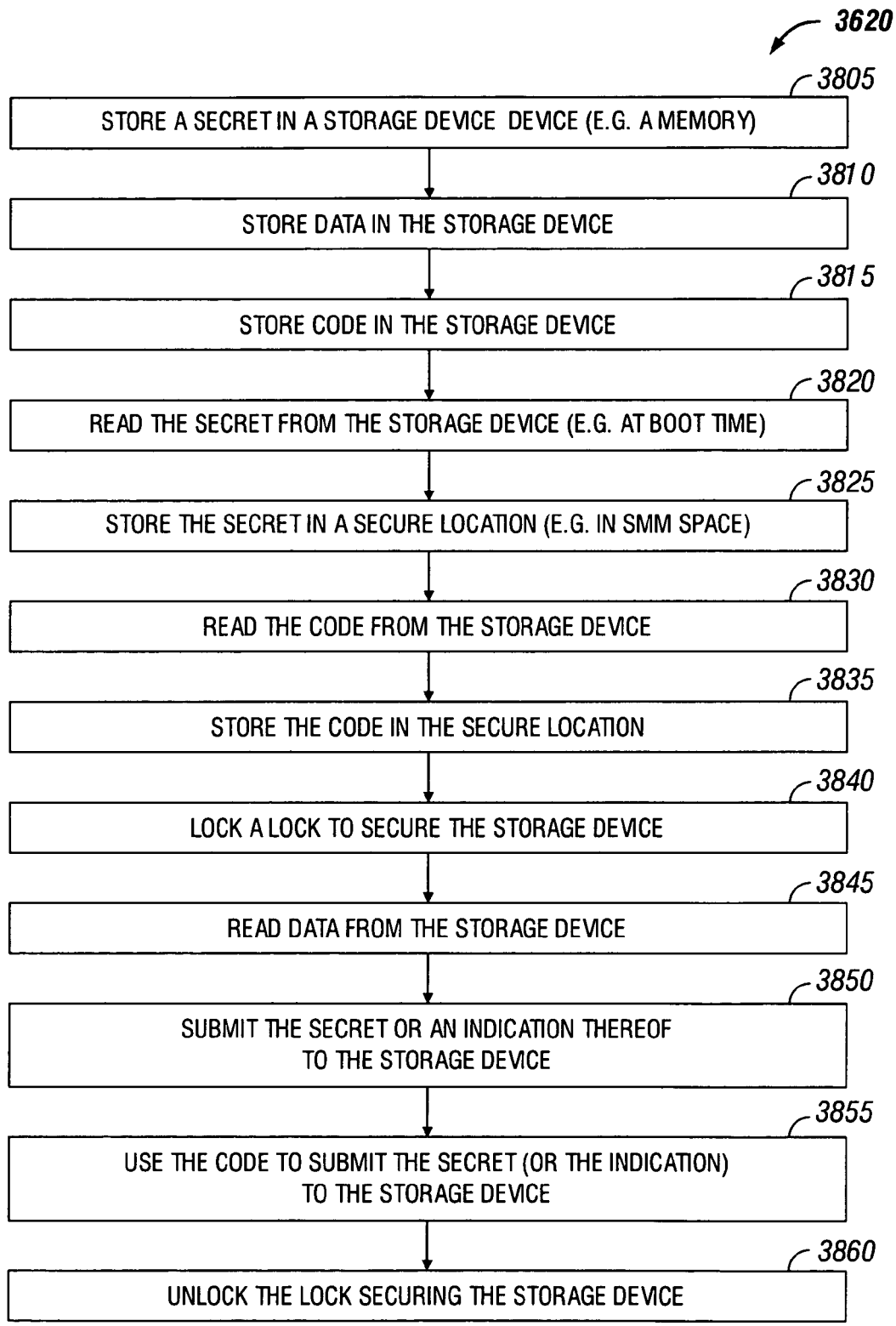
Figure 28:
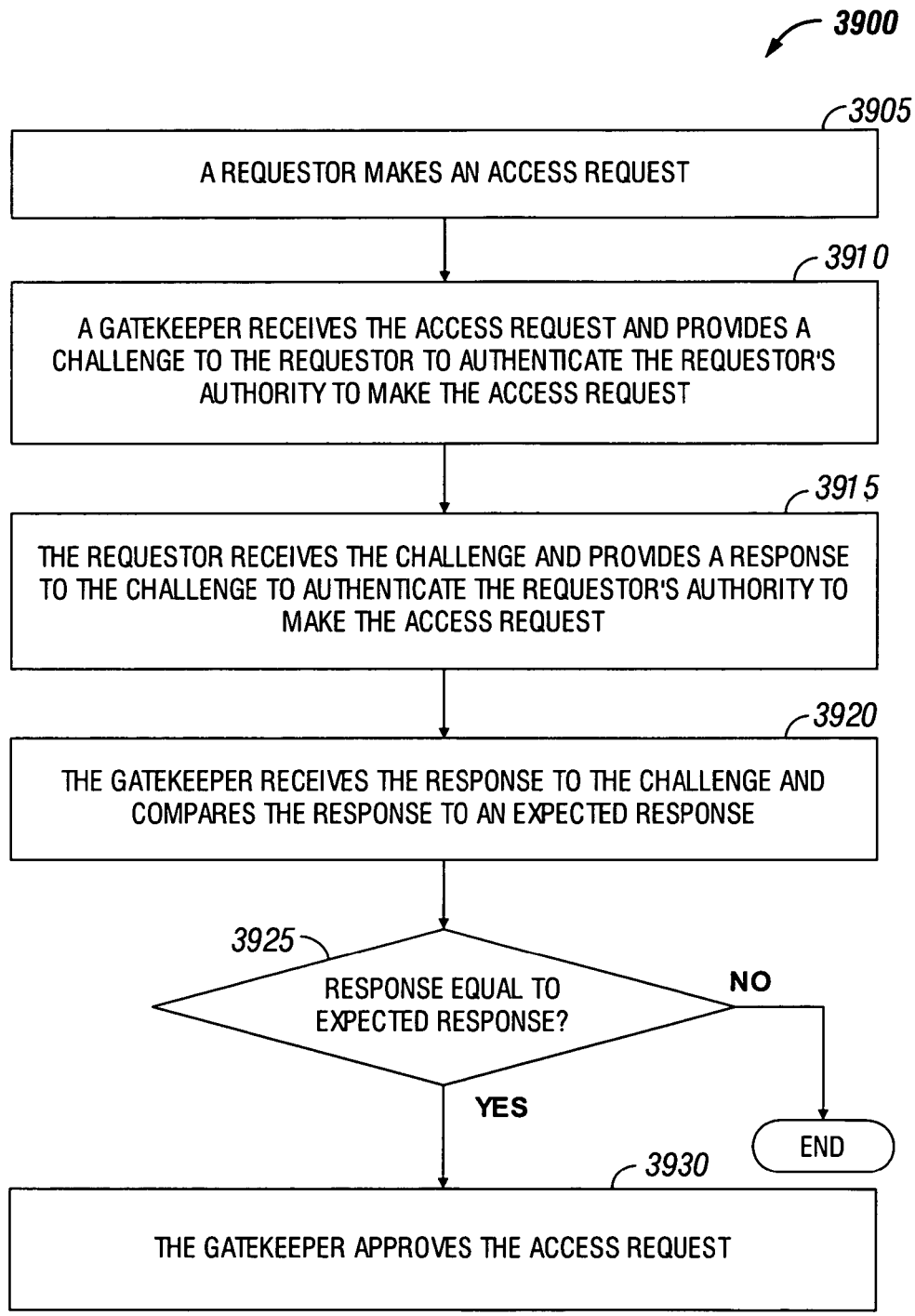
Figure 29A:
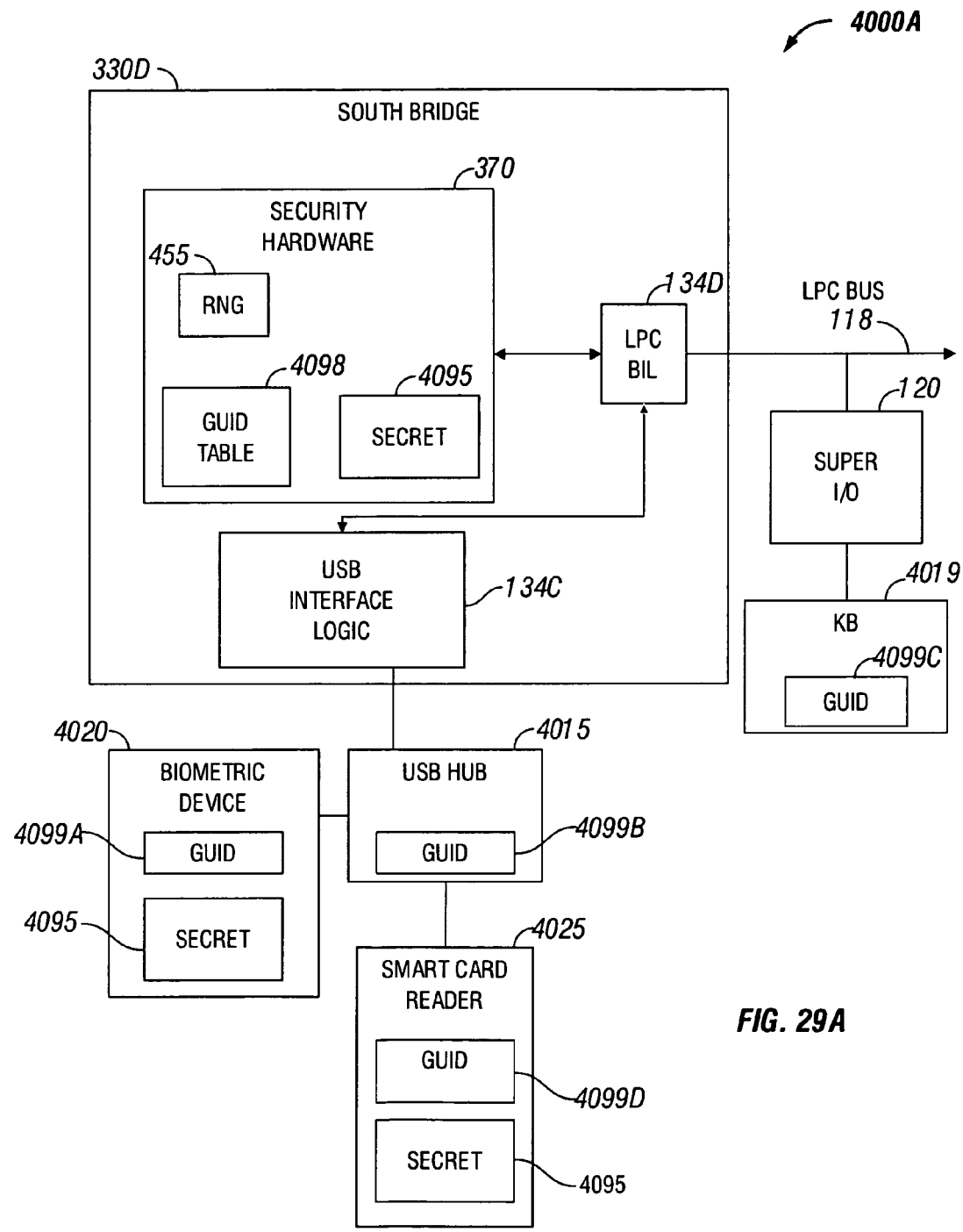
Figure 29B:
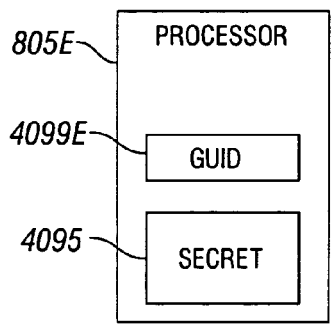
Figure 29C:
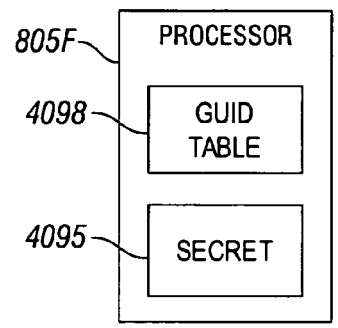
Figure 29D:
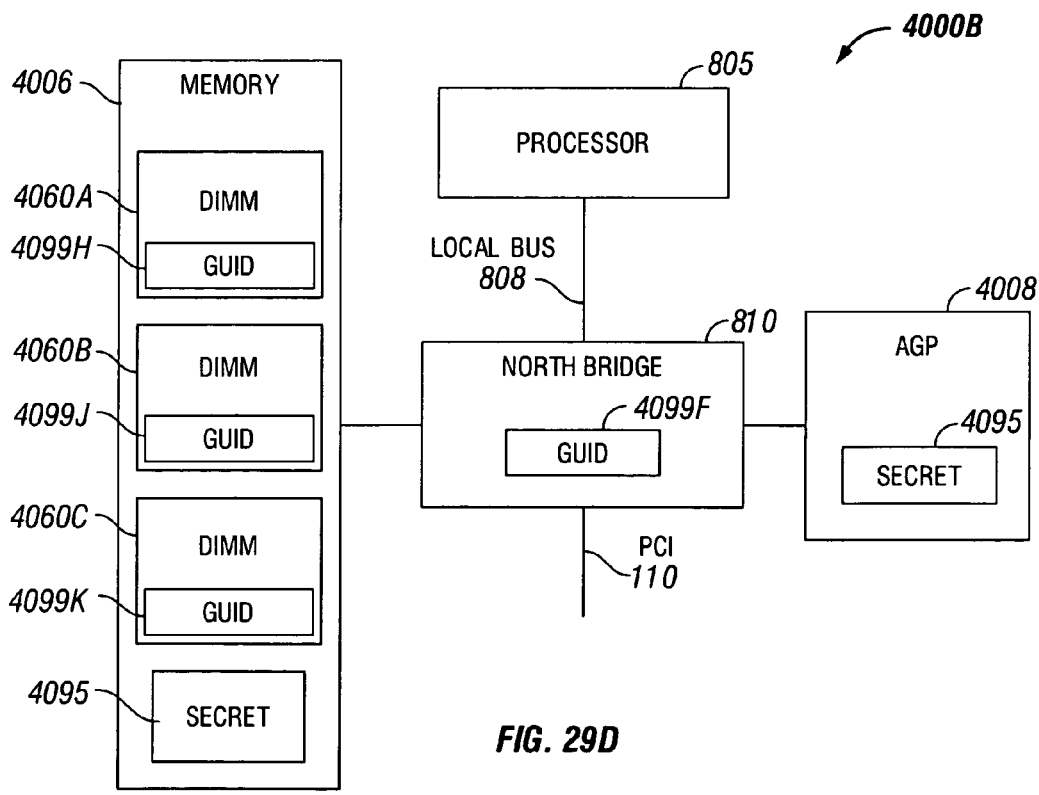
Figure 29E:
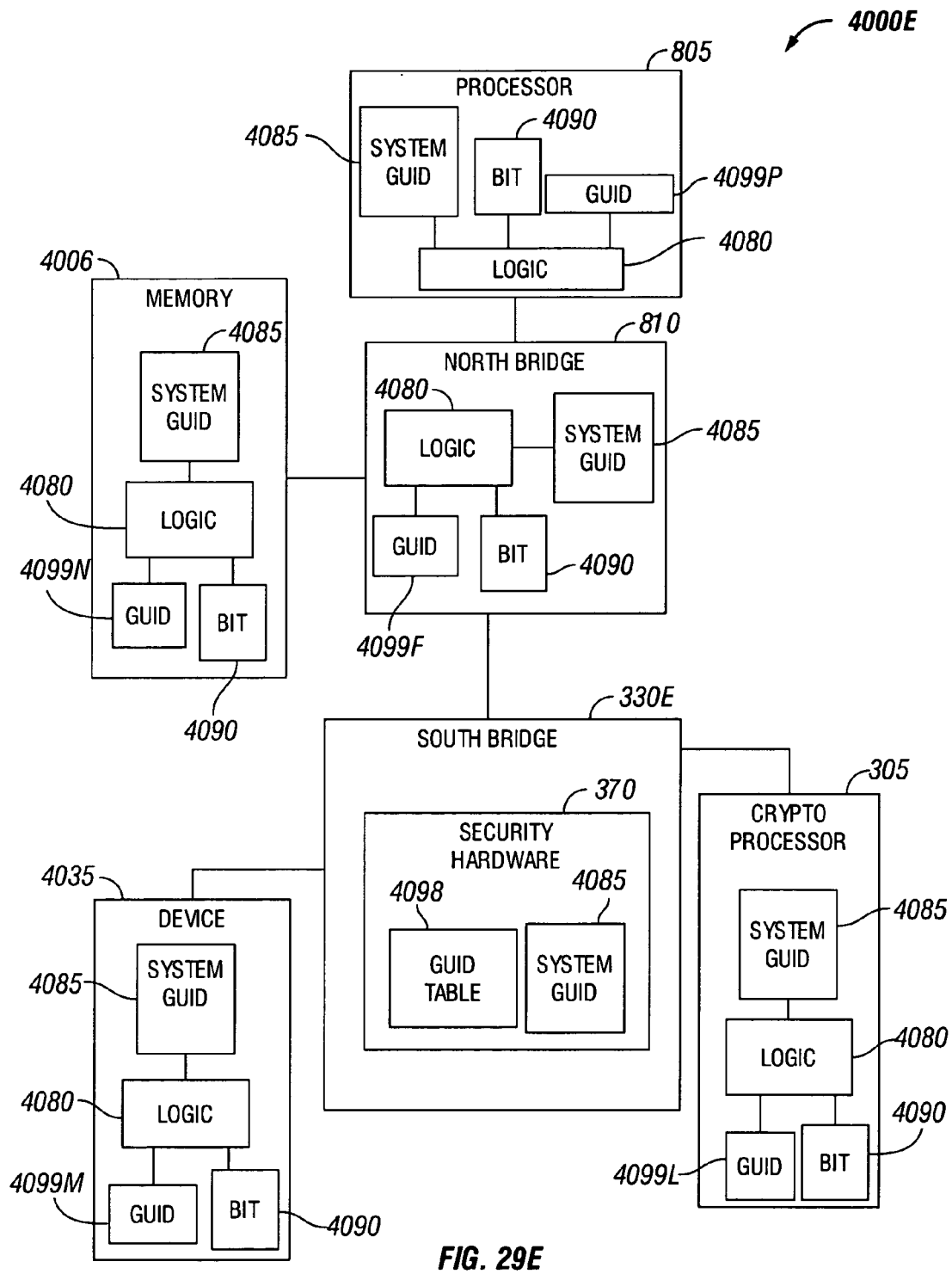
Figure 30A:
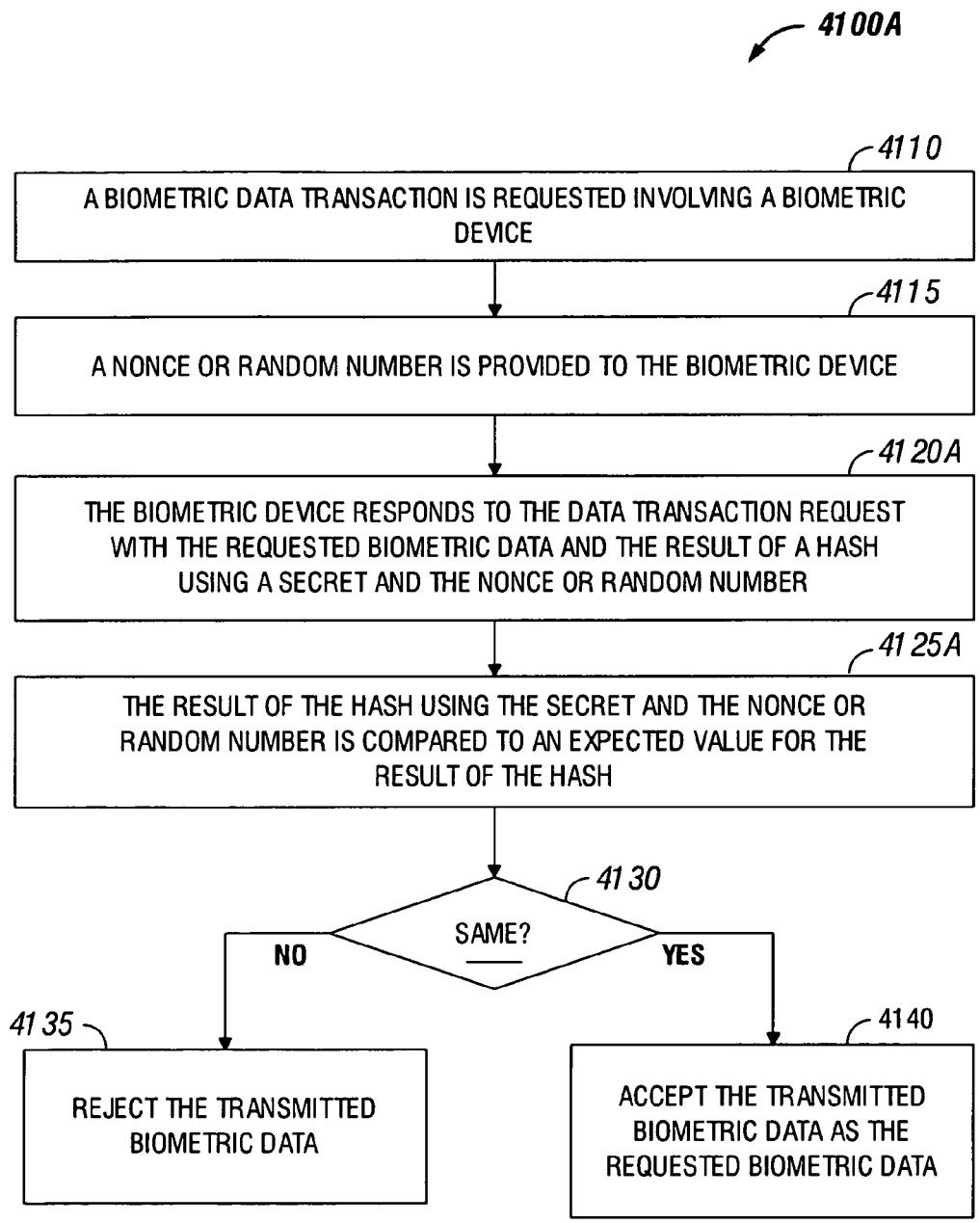
Figure 30B:
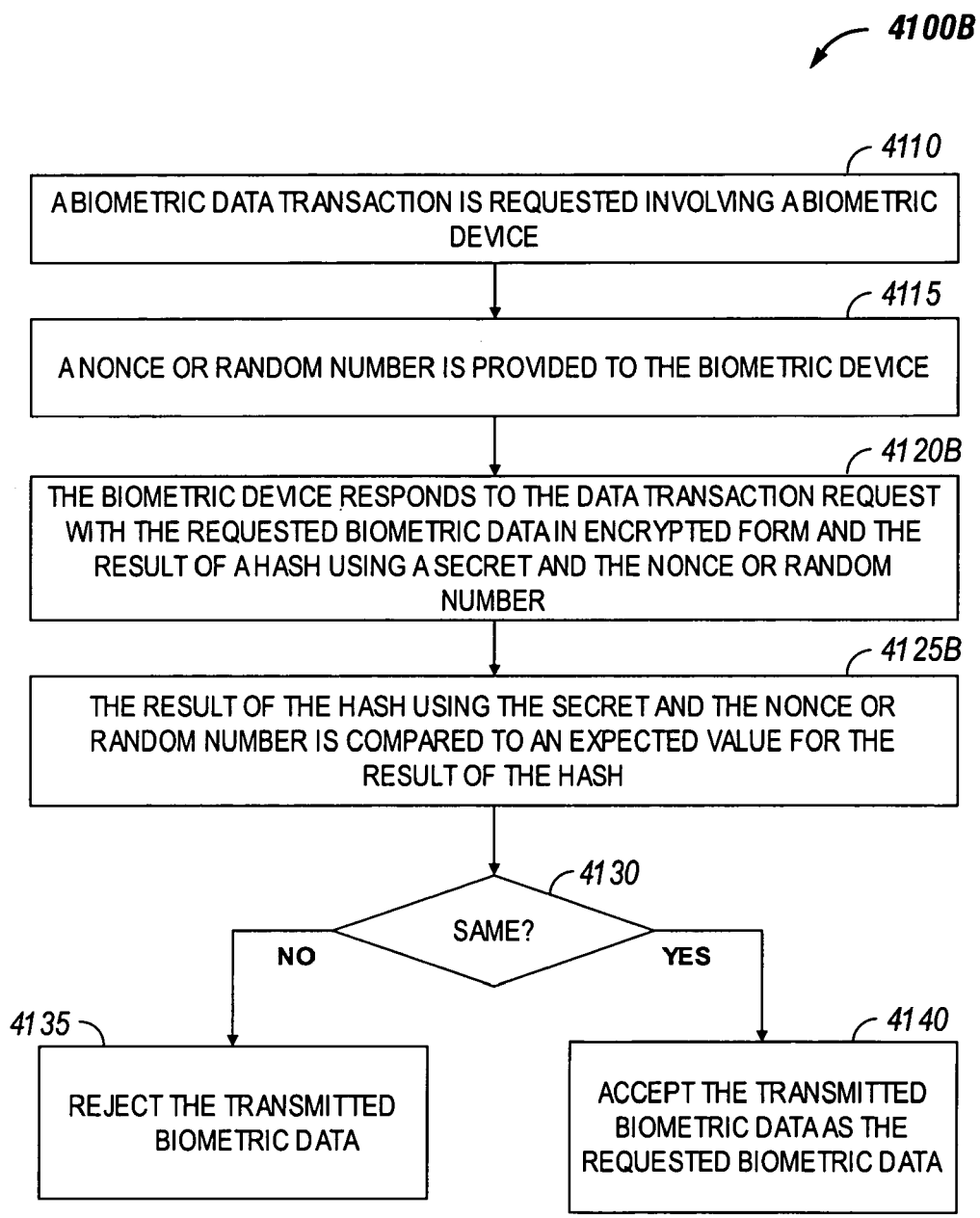
Figure 31:
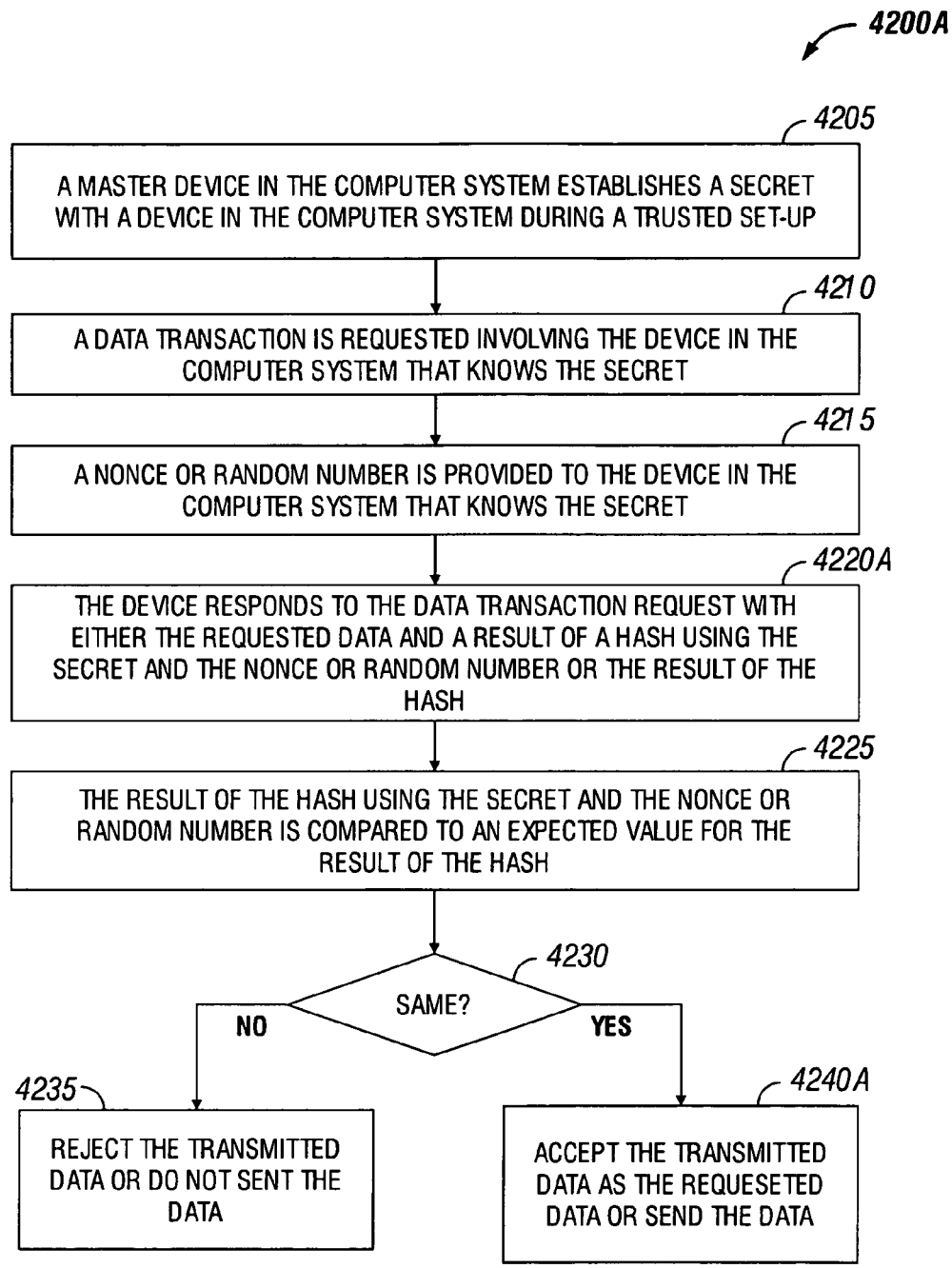
Figure 31B:
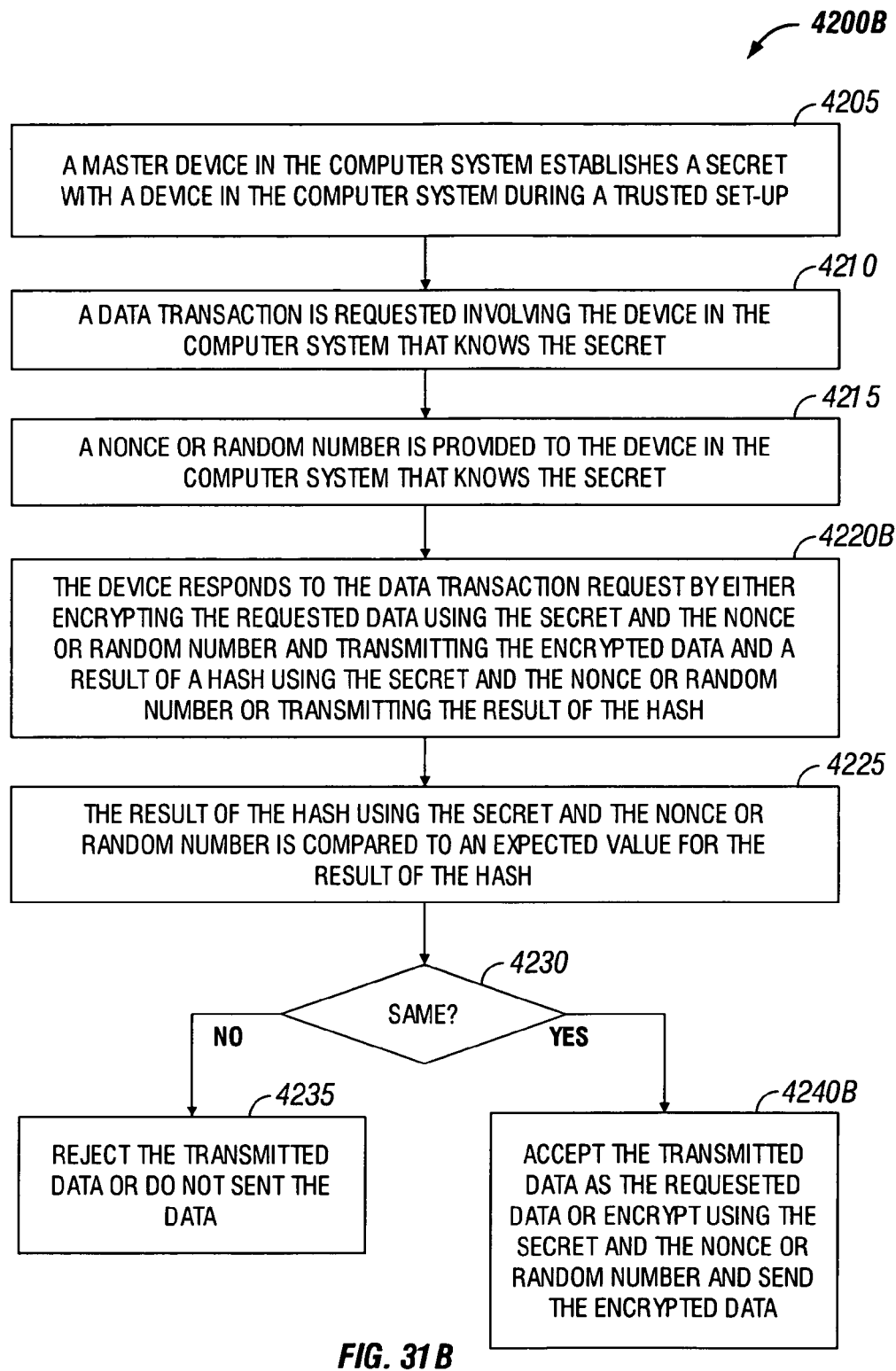
Figure 32A:
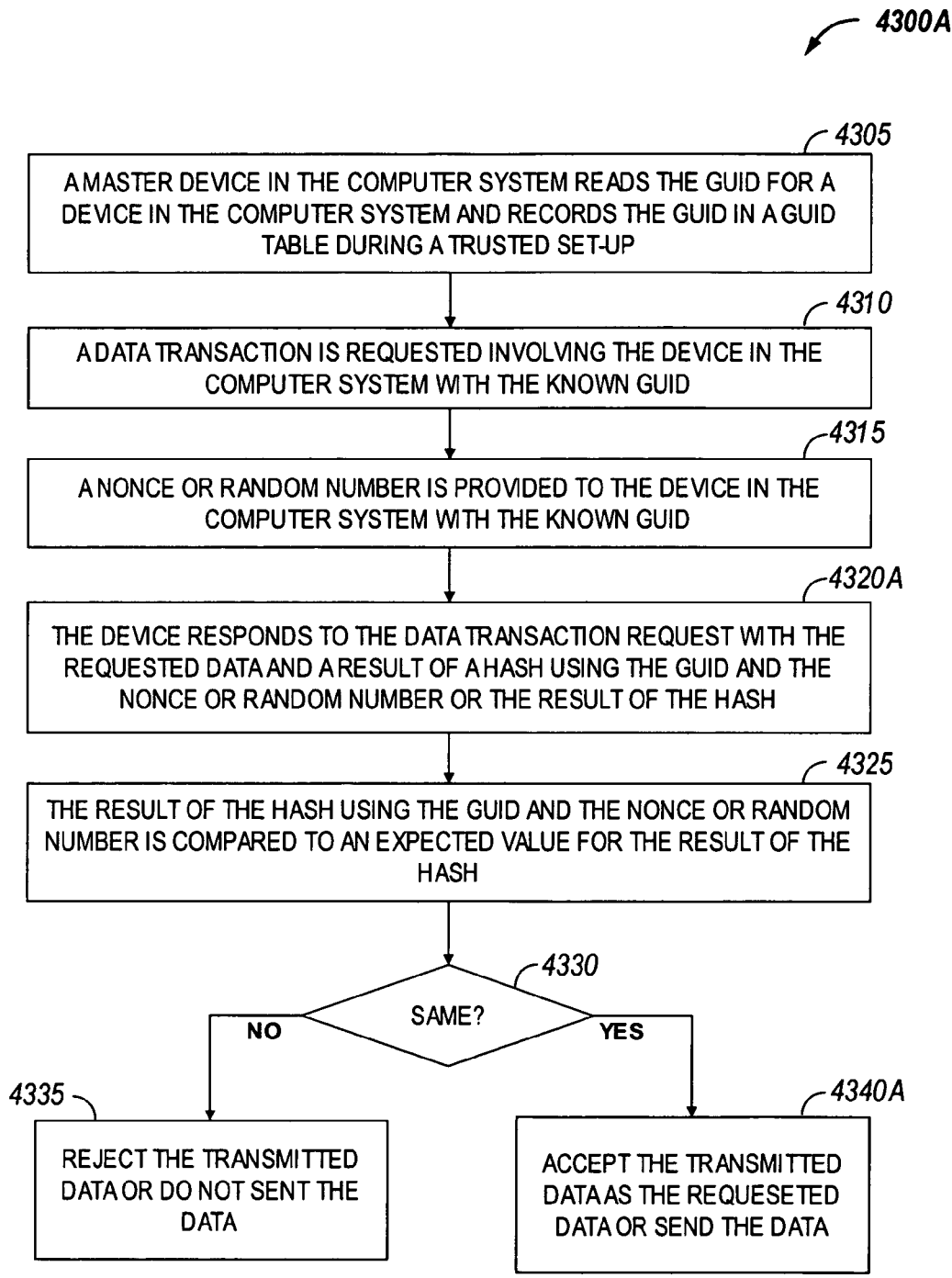
Figure 32B:
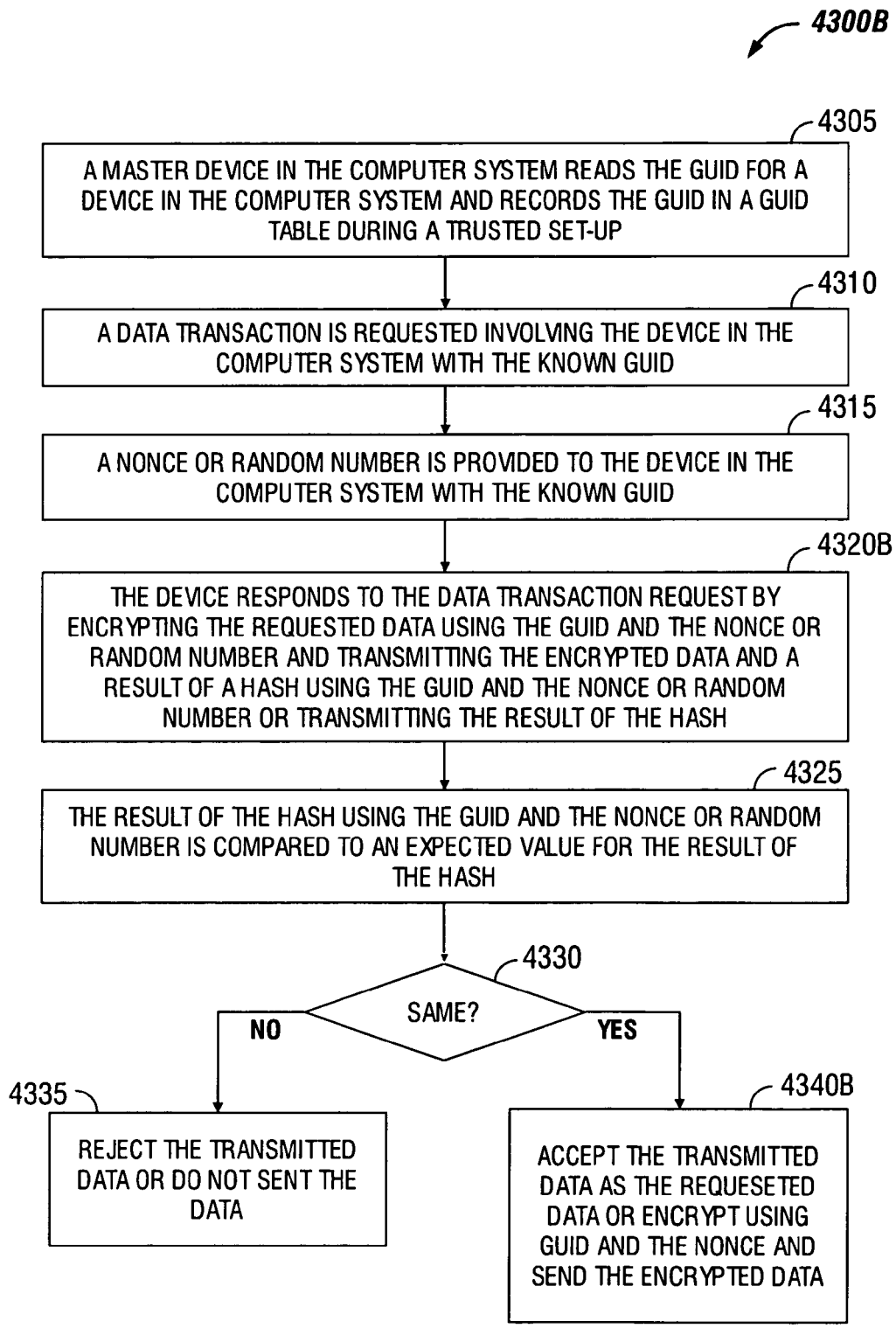
Figure 32C:
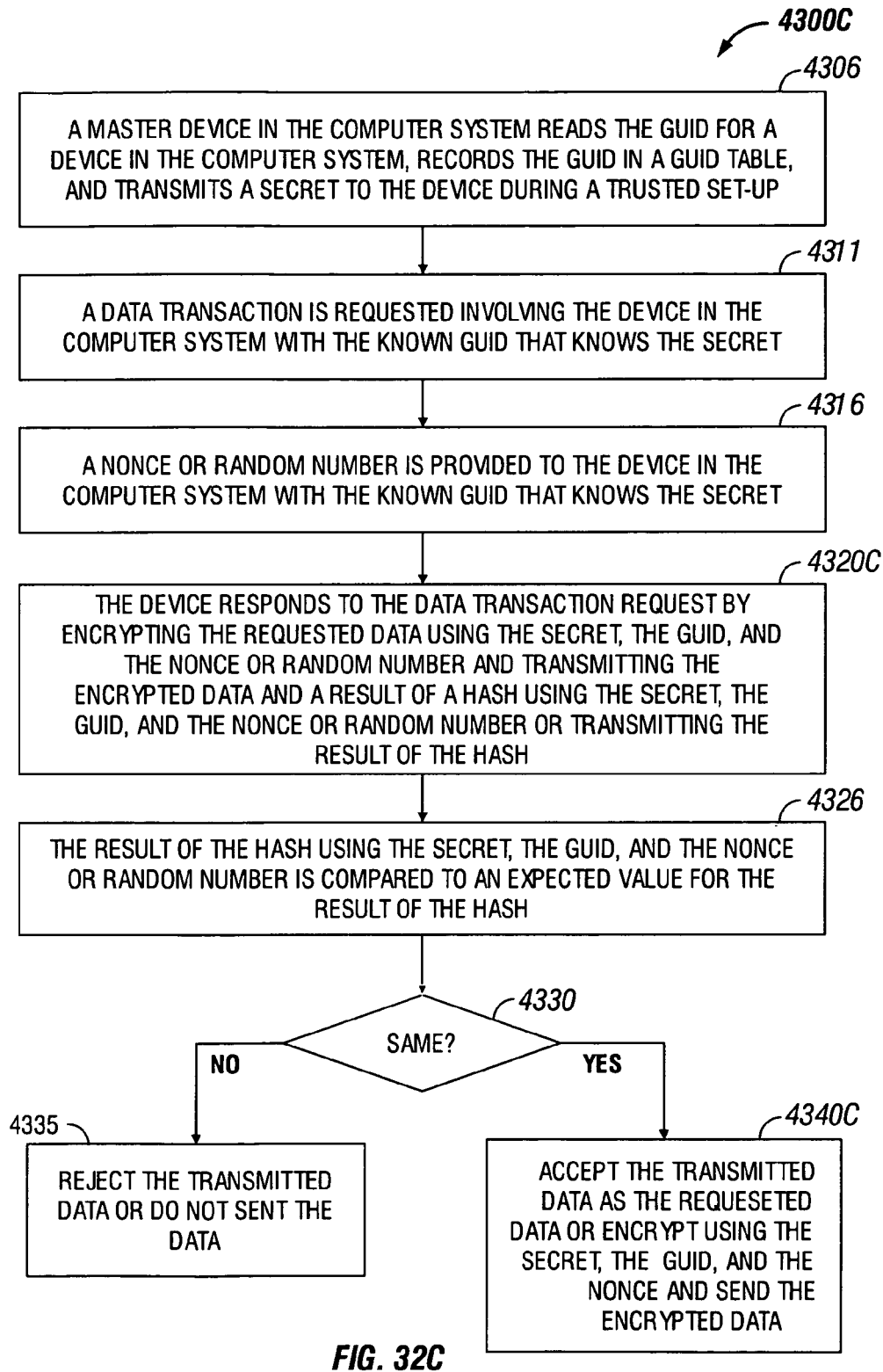
Figure 33:
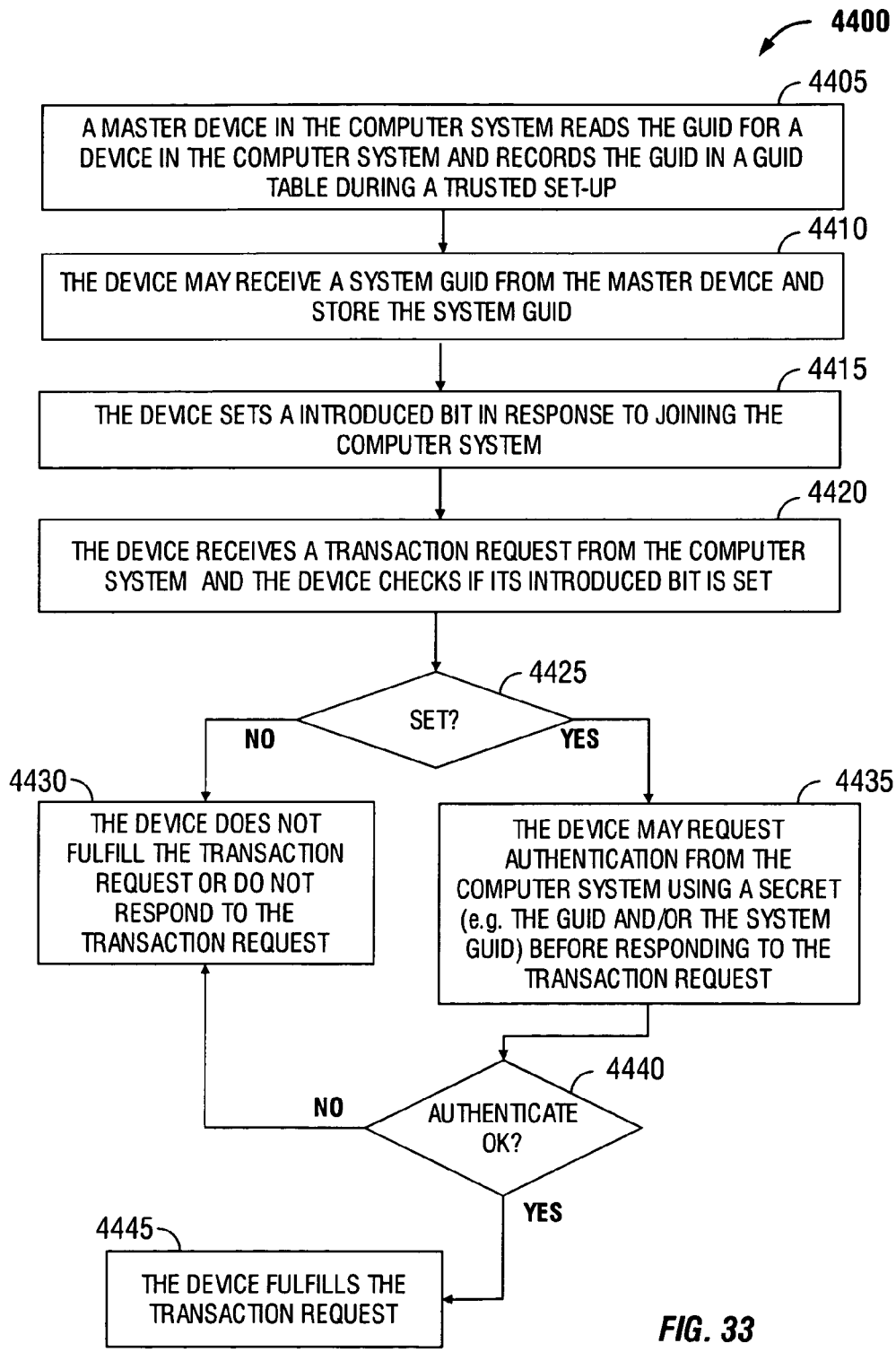
Figure 34:
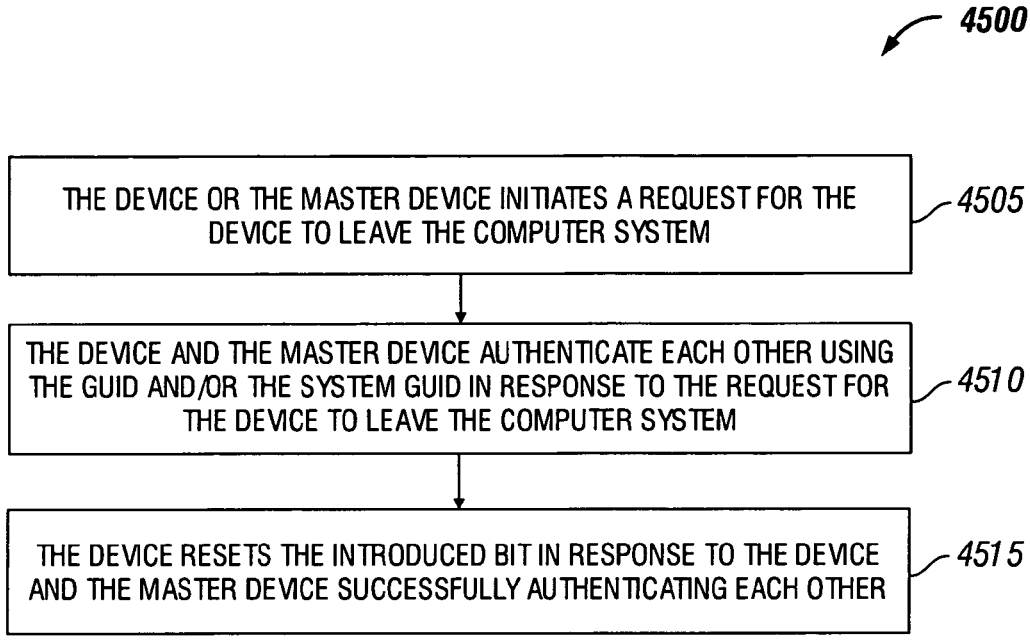
Figure 35:
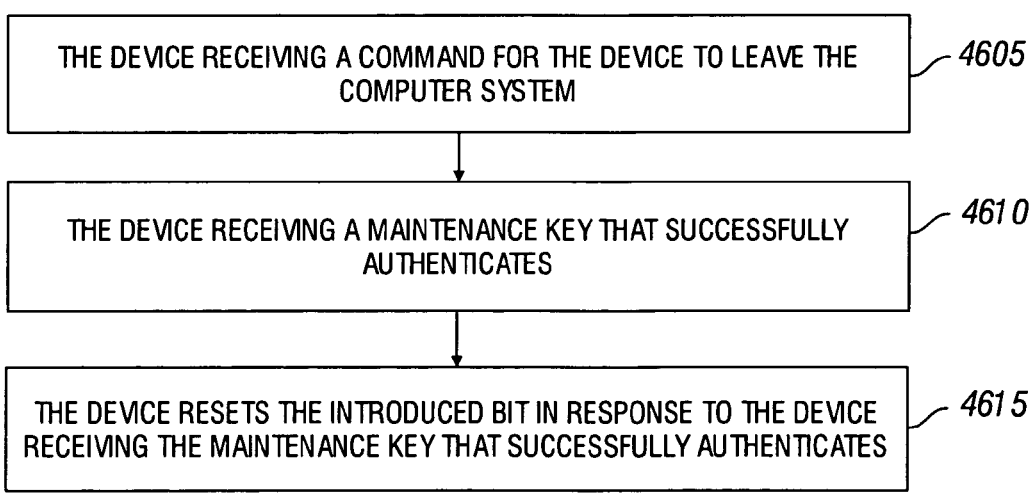
Figure 36:
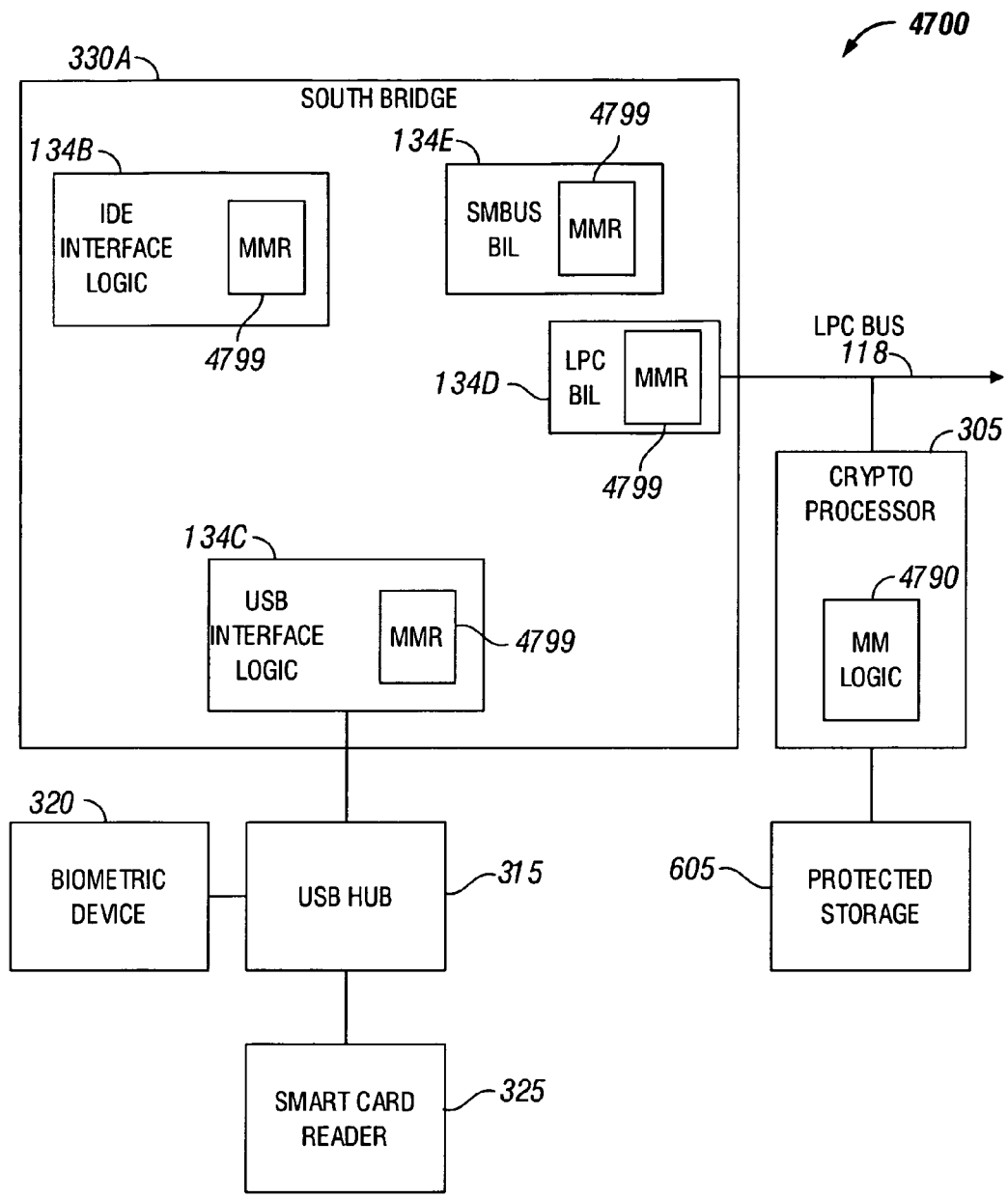
Figure 37:
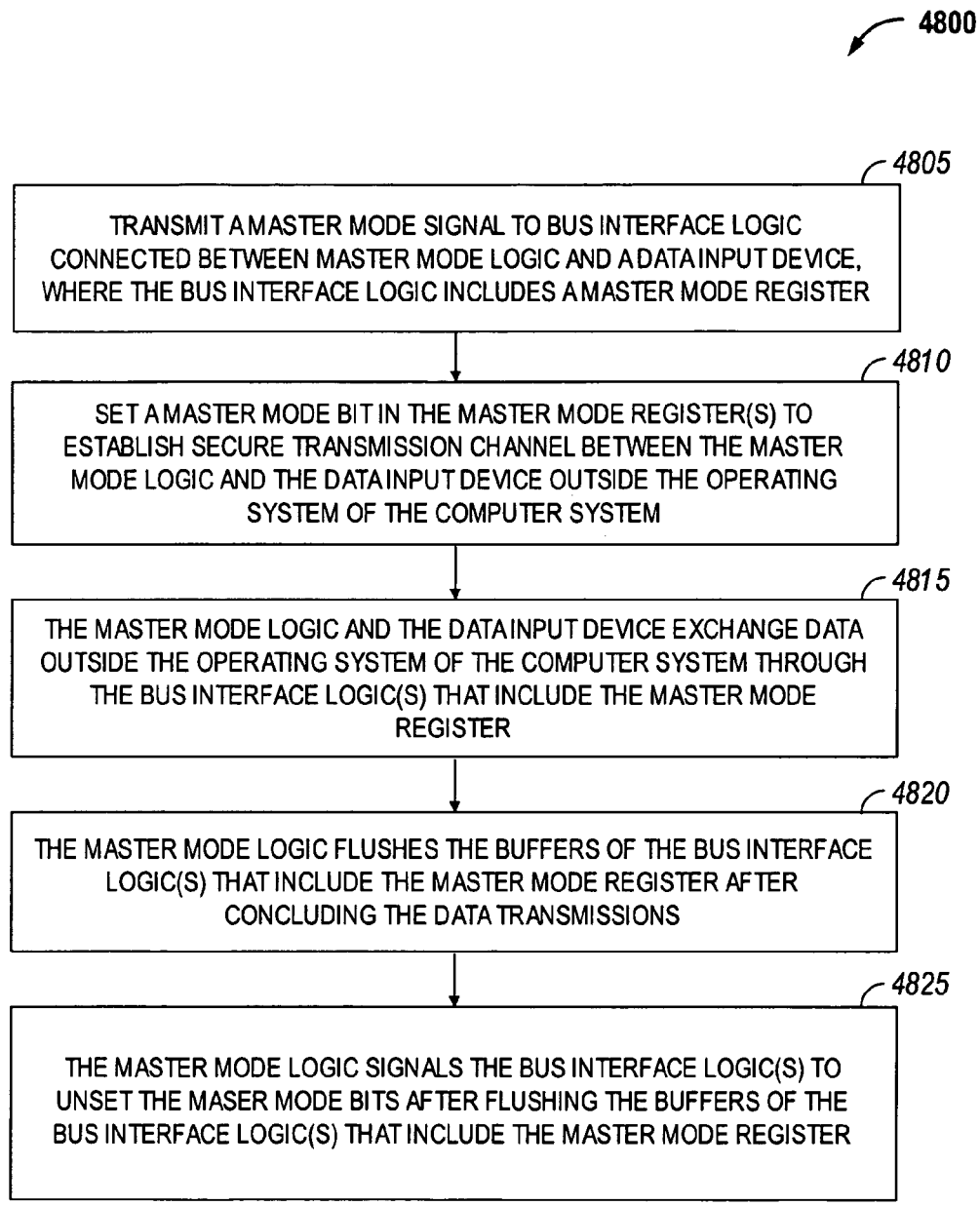
Figure 38A:
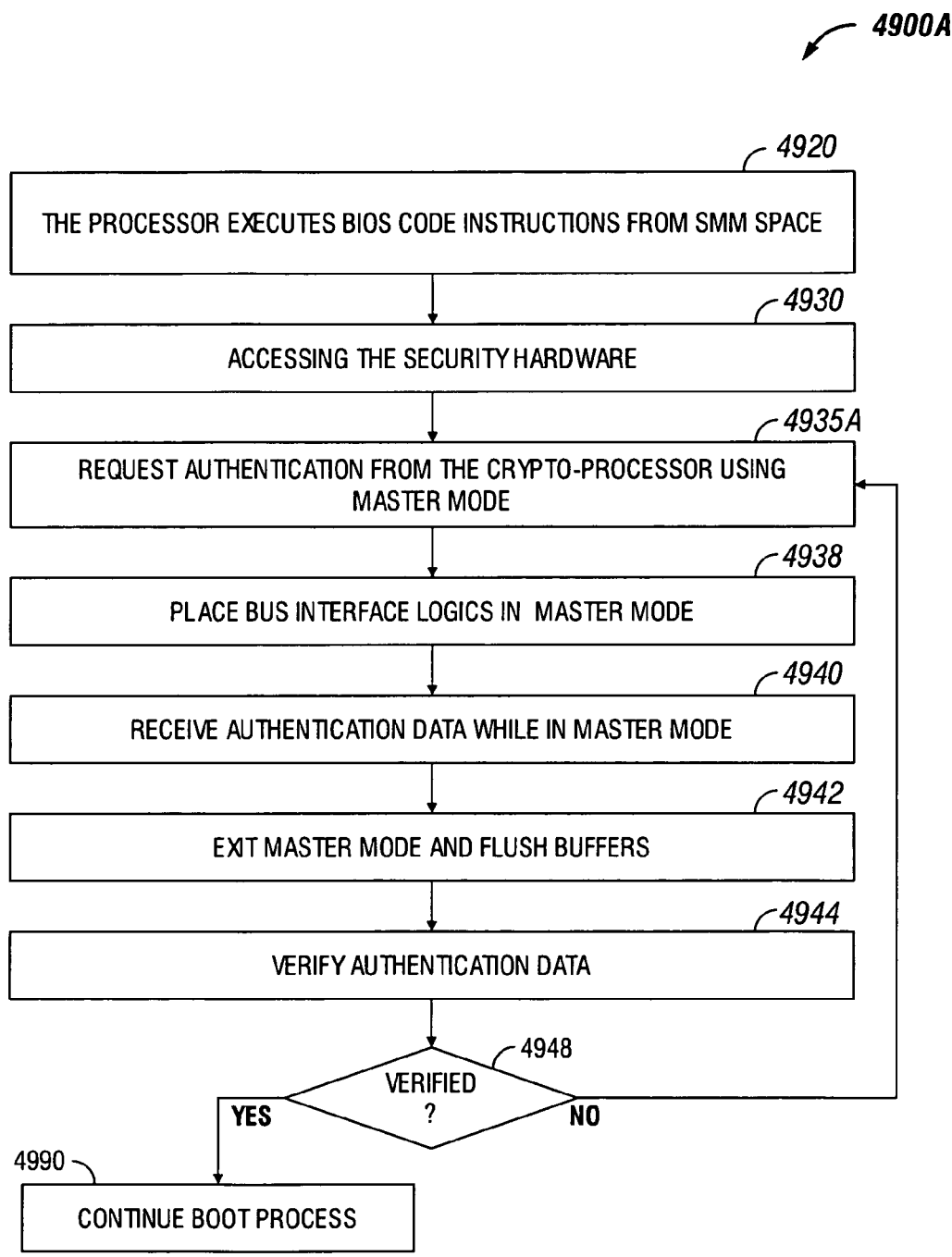
Figure 38B:
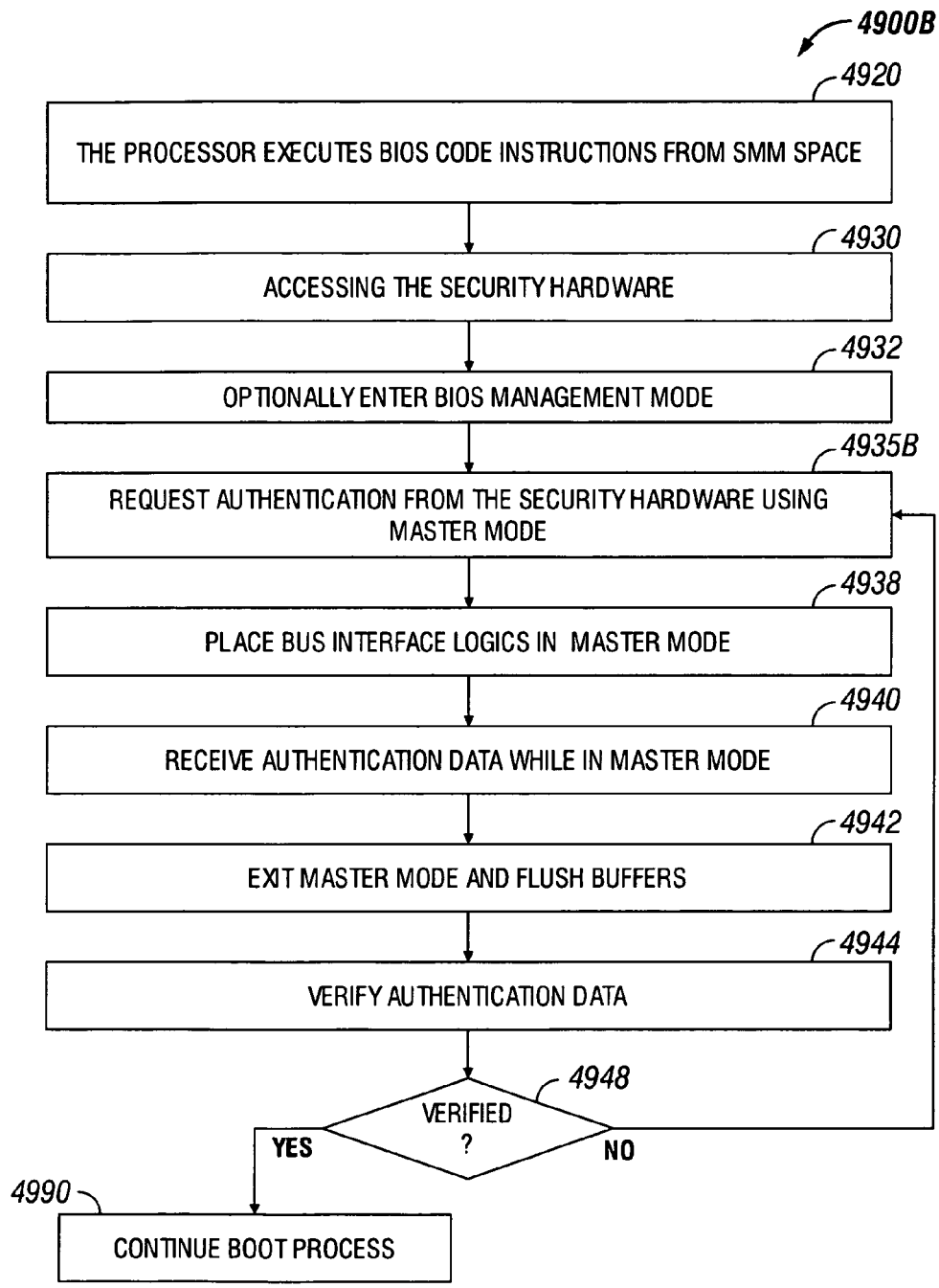
Figure 39A:
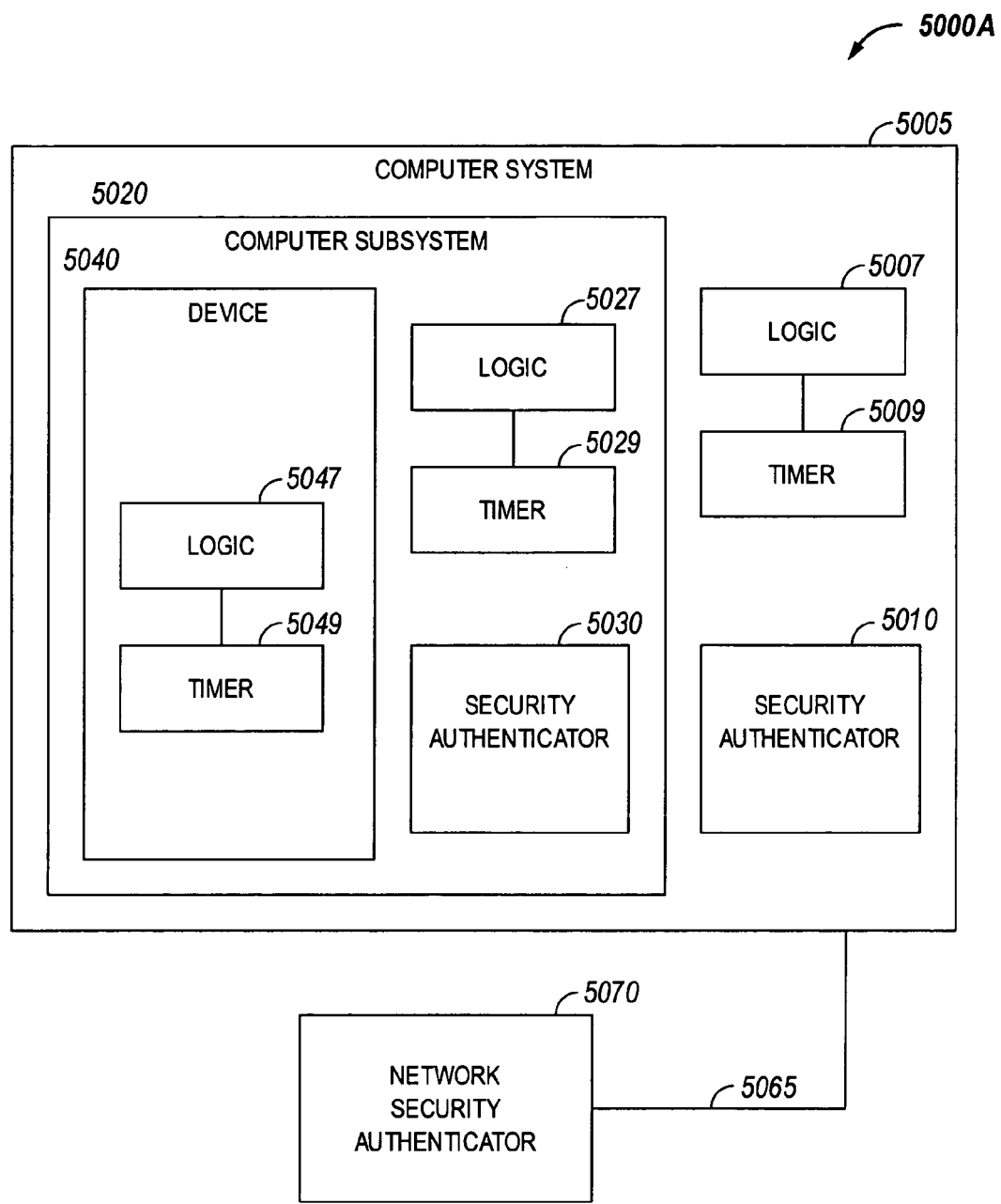
Figure 39B:
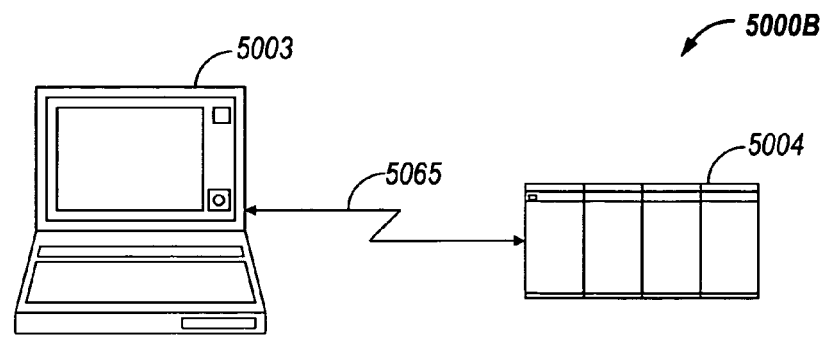
Figure 39C:
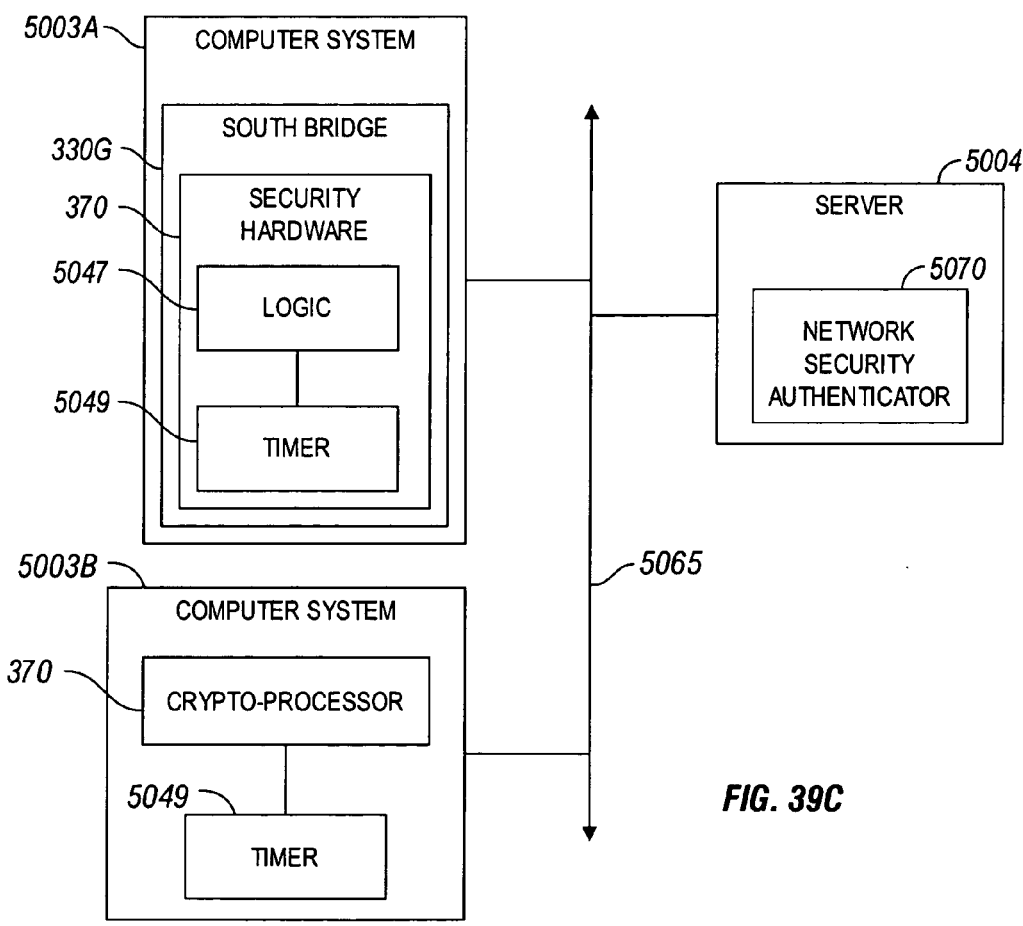
Figure 40A:
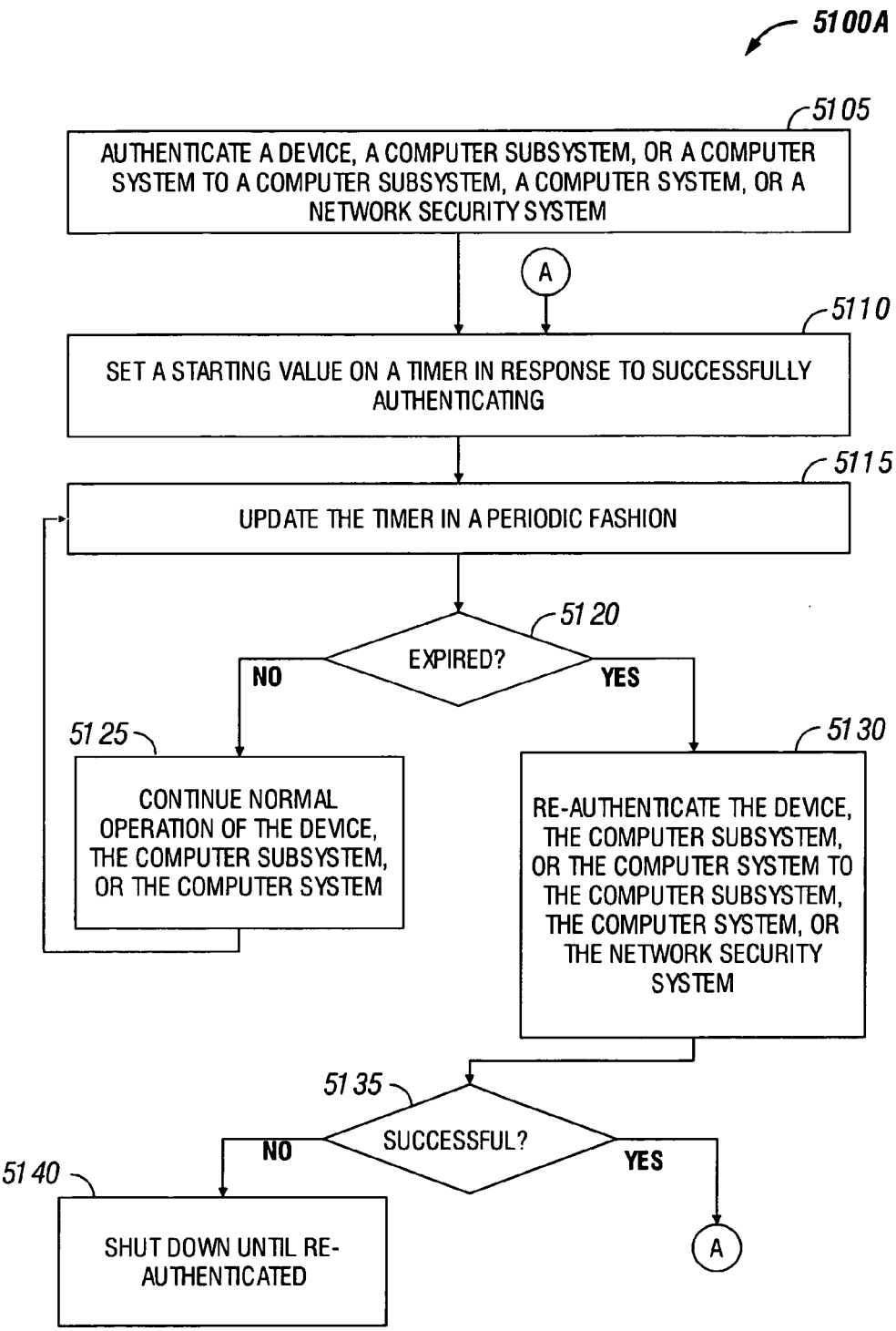
Figure 40B:
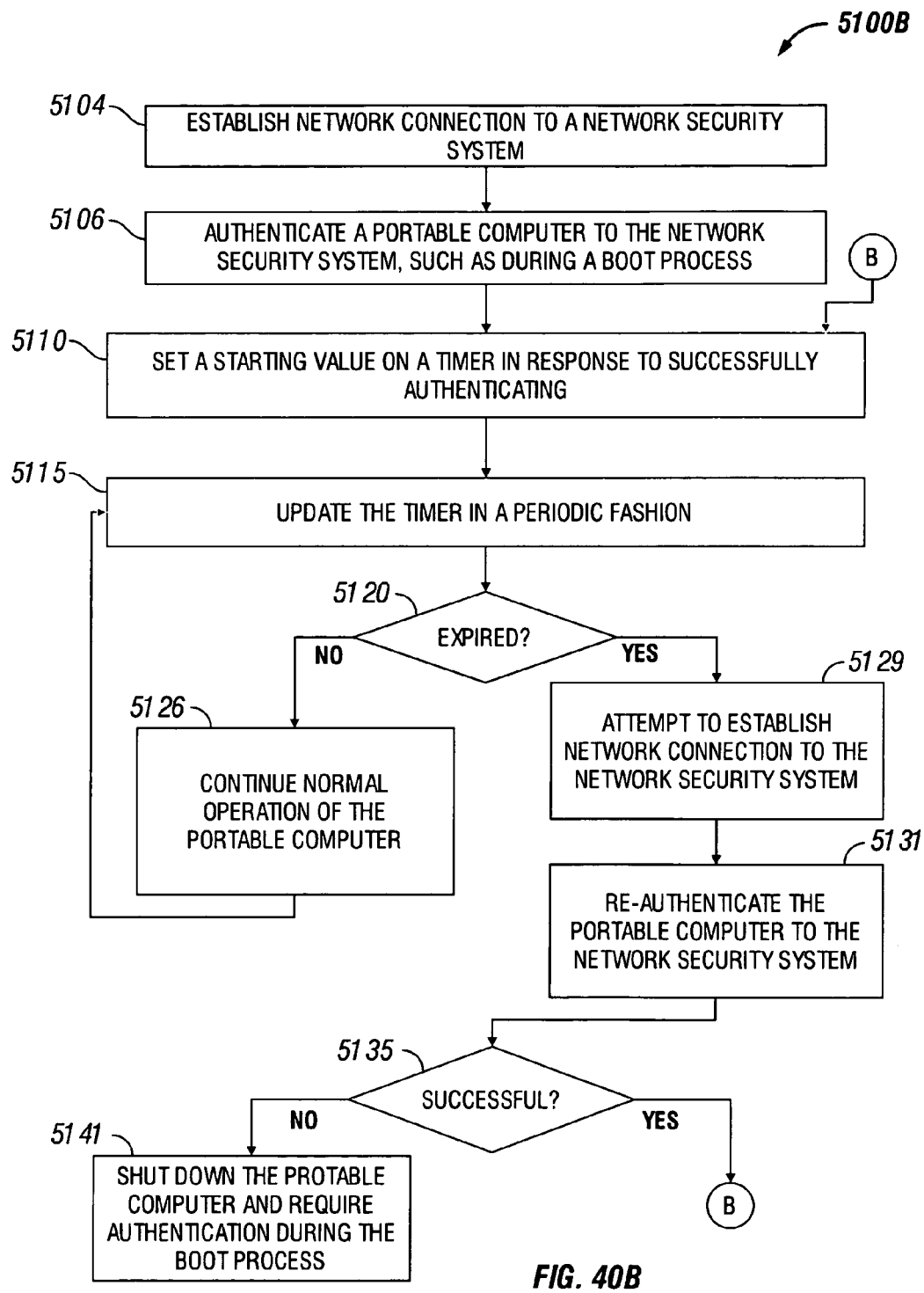
Figure 41:
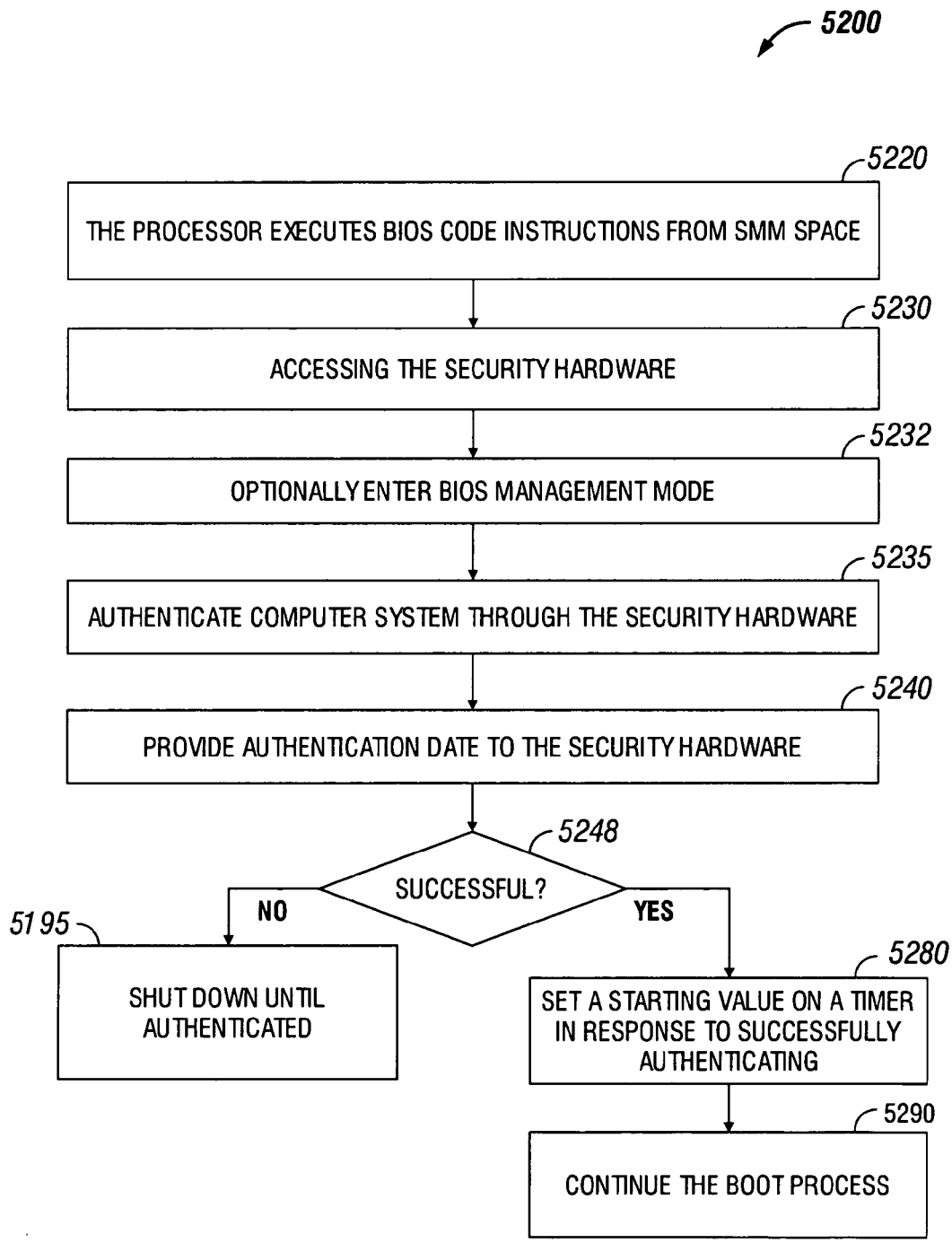
Figure 42A:
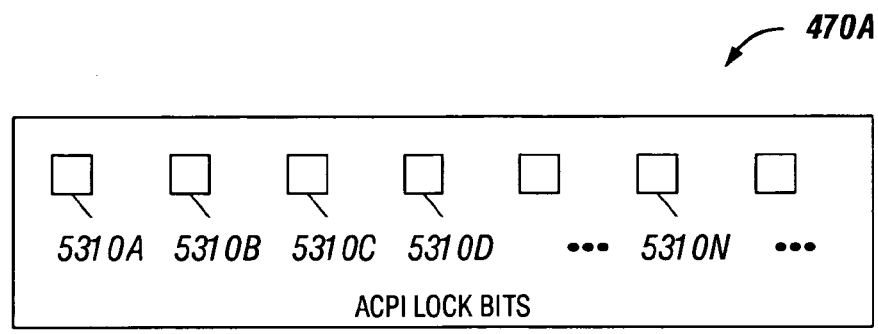
Figure 42B:
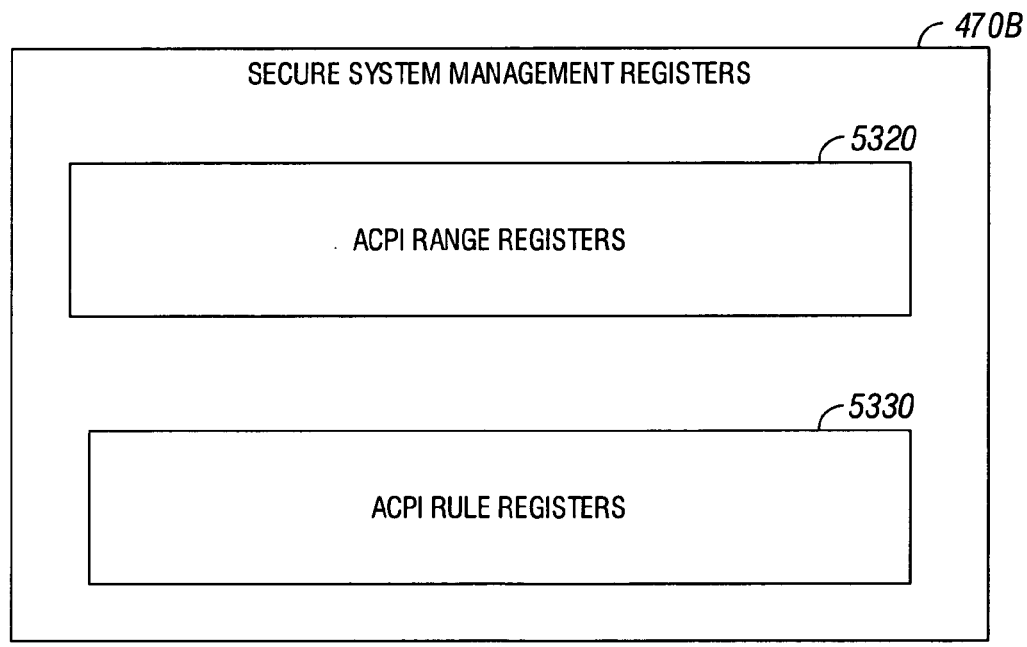

Turning now to FIG. 24, a method 3500 for changing the microcode update mode enable status, which includes a microcode mode lock, is shown. In response to receiving a request to enter the microcode mode (step 3505), the microcode control logic 3110 checks the status of the one or more microcode enable lock bits to see if the microcode mode is locked or unlocked (step 3510). If the microcode lock mode is unlocked (step 3515), then the microcode control logic 3110 initiates the microcode mode (step 3535). If the microcode lock mode is locked (step 3515), then the microcode control logic 3110 requests authorization to change the microcode mode lock status (step 3520). If the change is authorized (step 3525), then the microcode control logic 3110 changes the microcode mode lock bit to unlocked (step 3530). If the change is not authorized (step 3525), then the microcode control logic 3110 does not change the microcode mode lock bit.

In various embodiments, the microcode enable status may be changed by setting or resetting the one or more microcode enable status bits. For example, the microcode mode may be disabled, but inside SMM, a predetermined input to the microcode control logic 3110 may signal the microcode control logic 3110 to change the microcode mode status to enabled. In the embodiment of FIG. 20C, for example, once signaled, the microcode control logic 3110 will change the status of the one or more microcode enable bits from disabled to enabled.

In response to receiving a request to change the microcode mode status, the microcode control logic 3110 may check the status of the one or more microcode enable lock bits to determine if the microcode lock mode is enabled or disabled. If the microcode lock mode is disabled, then the microcode control logic 3110 may change the microcode mode status. If the microcode lock mode is enabled, then the microcode control logic 3110 will not change the microcode mode status.

It is noted that the method 3500 may alternatively terminate if the microcode update lock status is locked (step 3515), instead of requesting authorization to change the microcode update lock status (step 3520). The method 3500 may also include receiving a request to change the microcode update lock status (not shown) prior to the method 3500 requesting authorization (step 3520).]

Figure 11A:
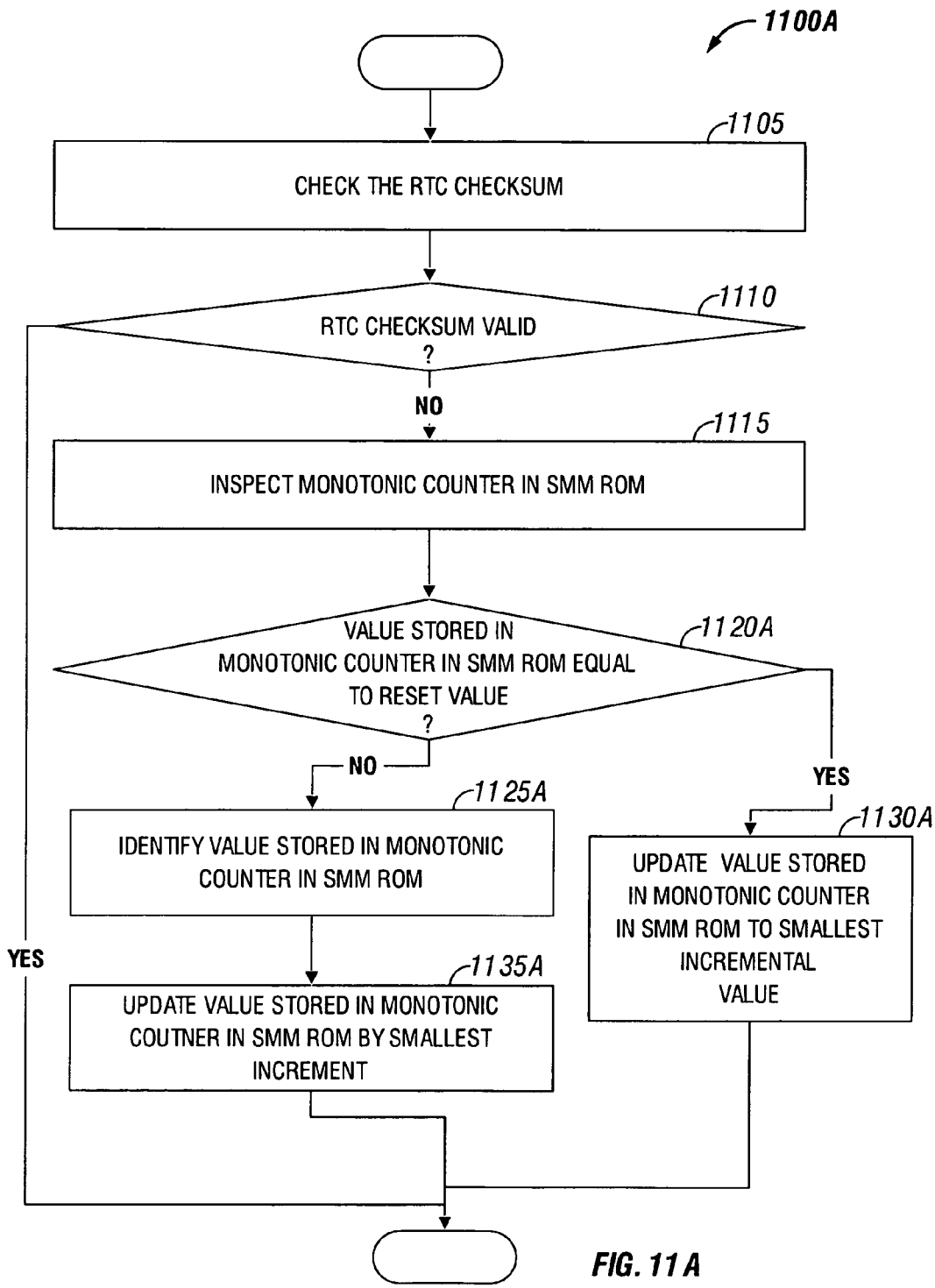
FIGS. 11A, 11B, 12, and 13 illustrate flowcharts of embodiments of methods for secure access to storage, according to various aspects of the present invention.
Figure 11B:
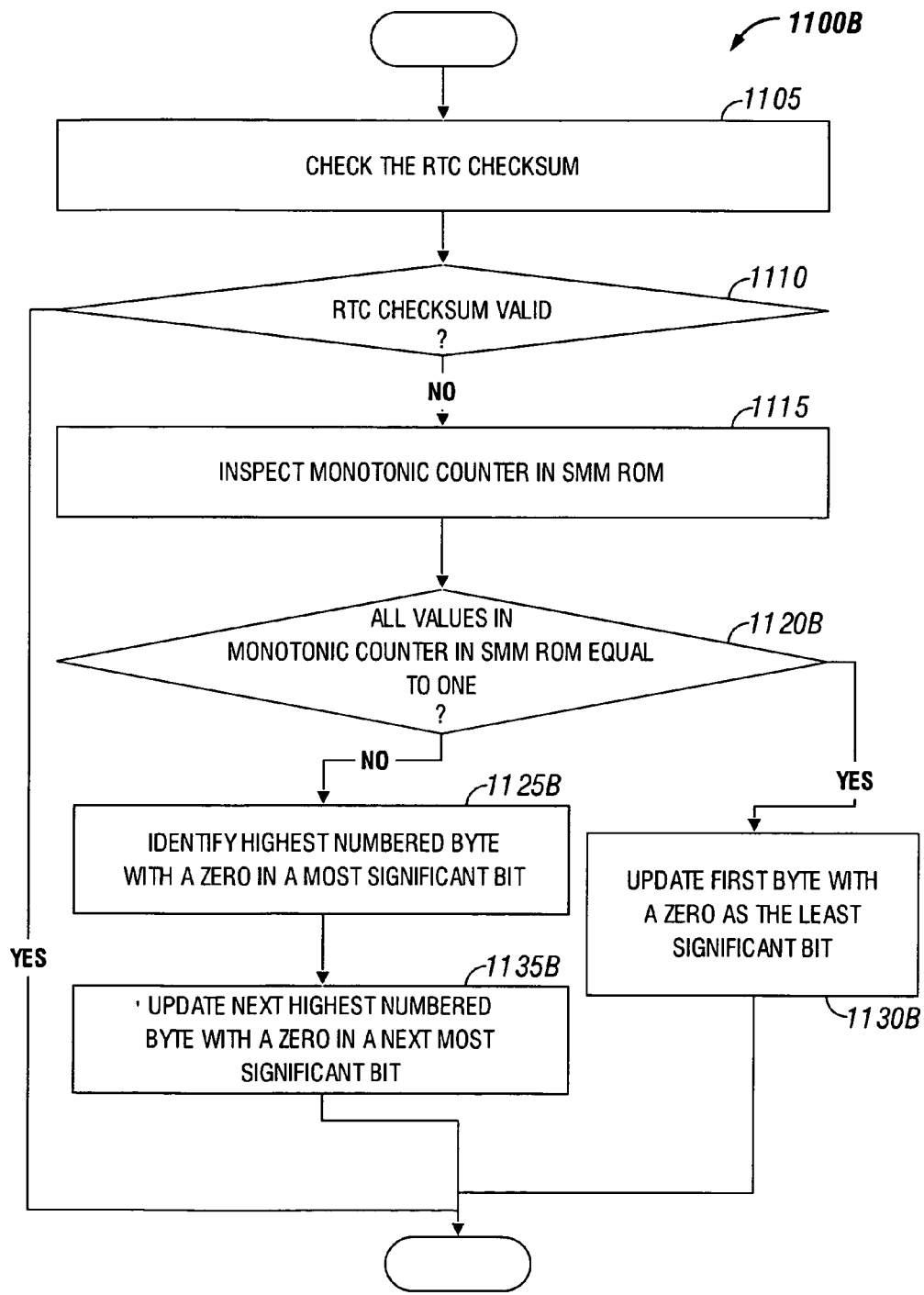
Figure 12A:
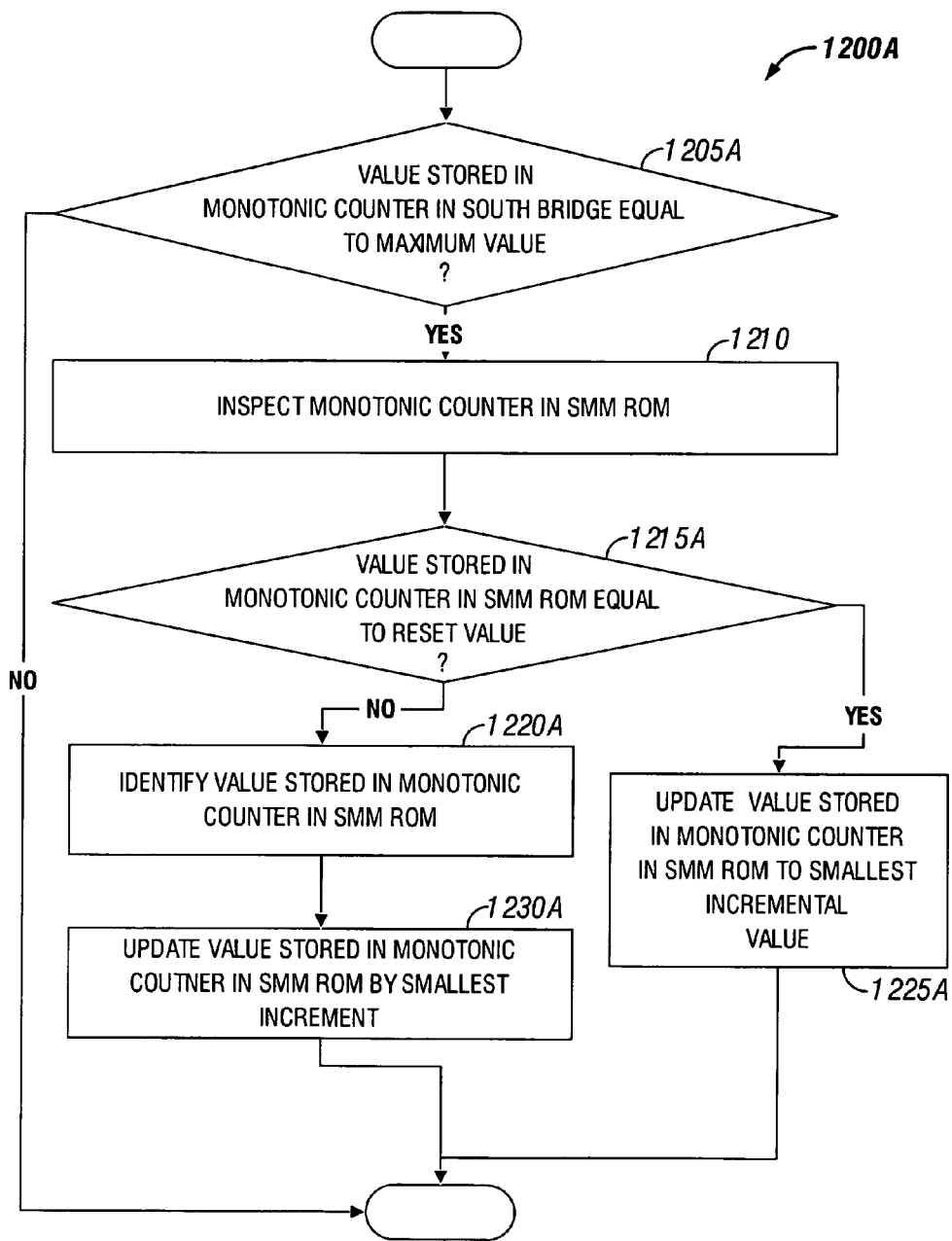
Figure 12B:
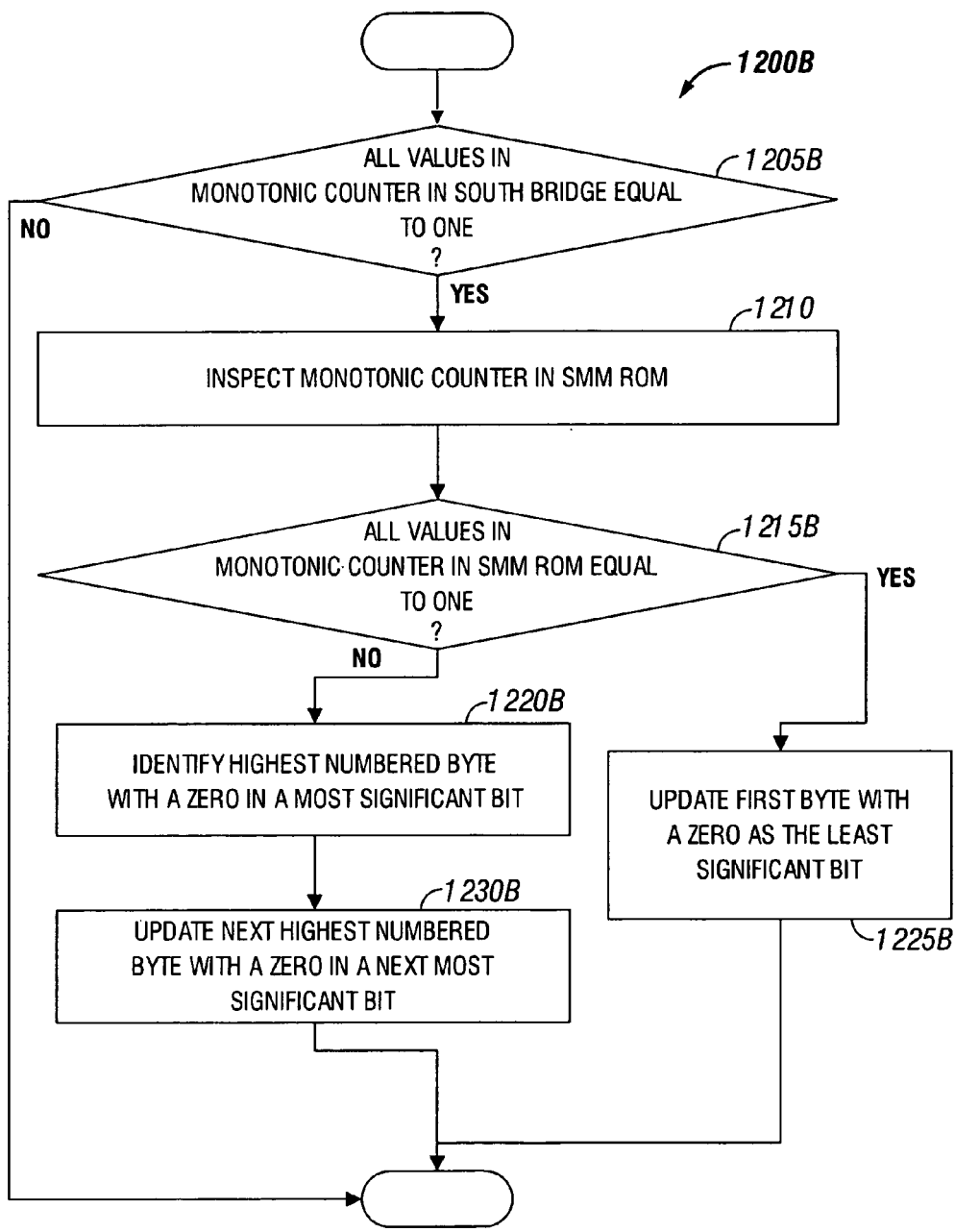
Figure 13A:
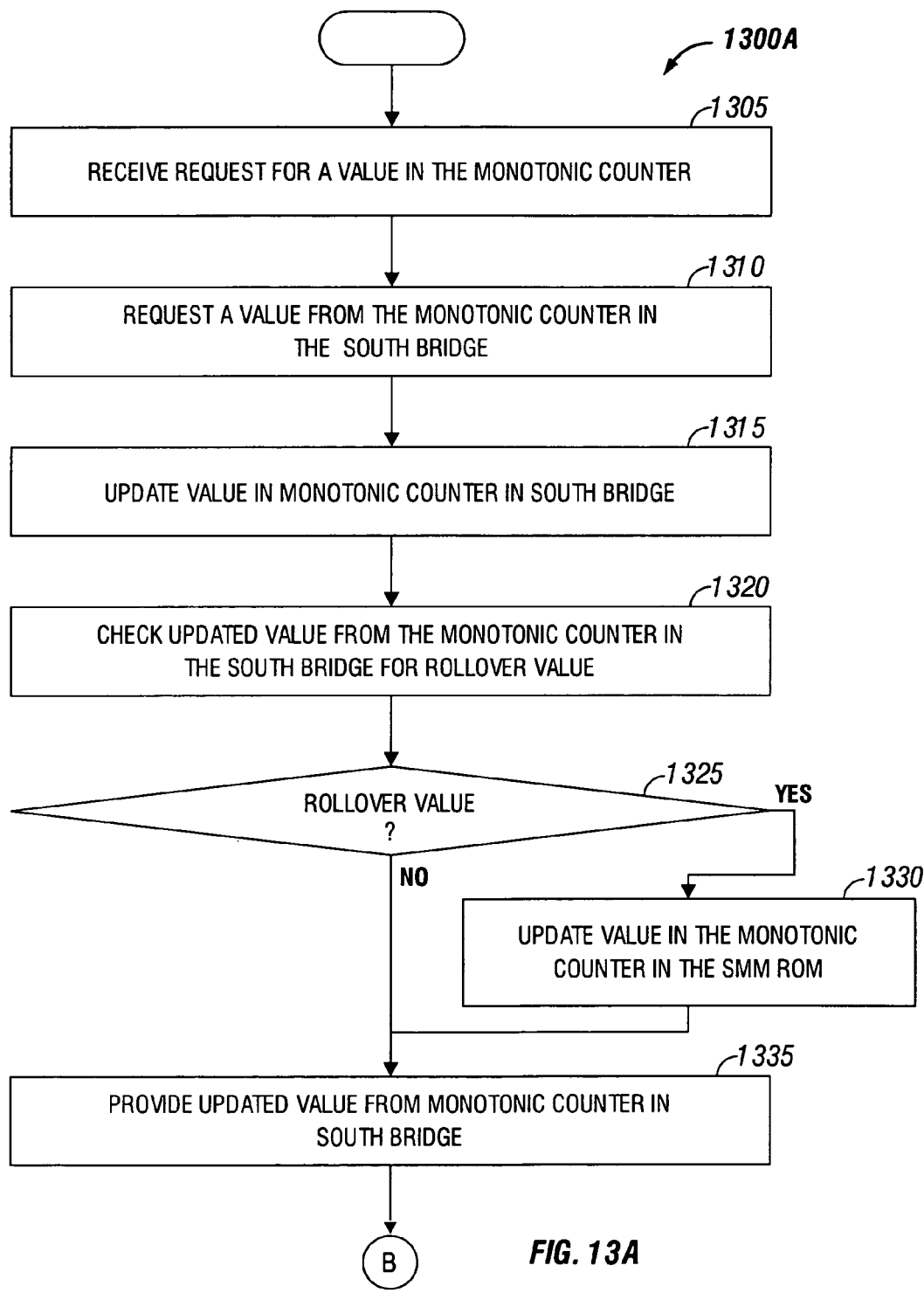
Figure 13B:
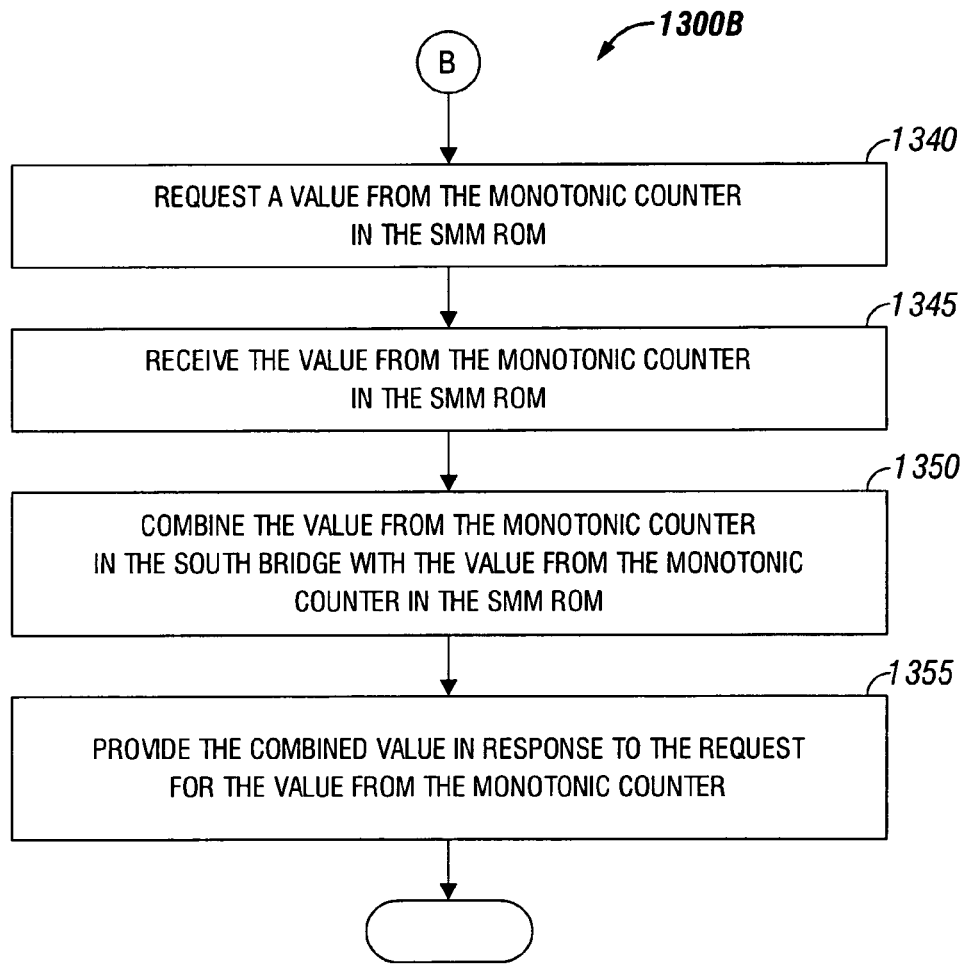
Figure 14A:
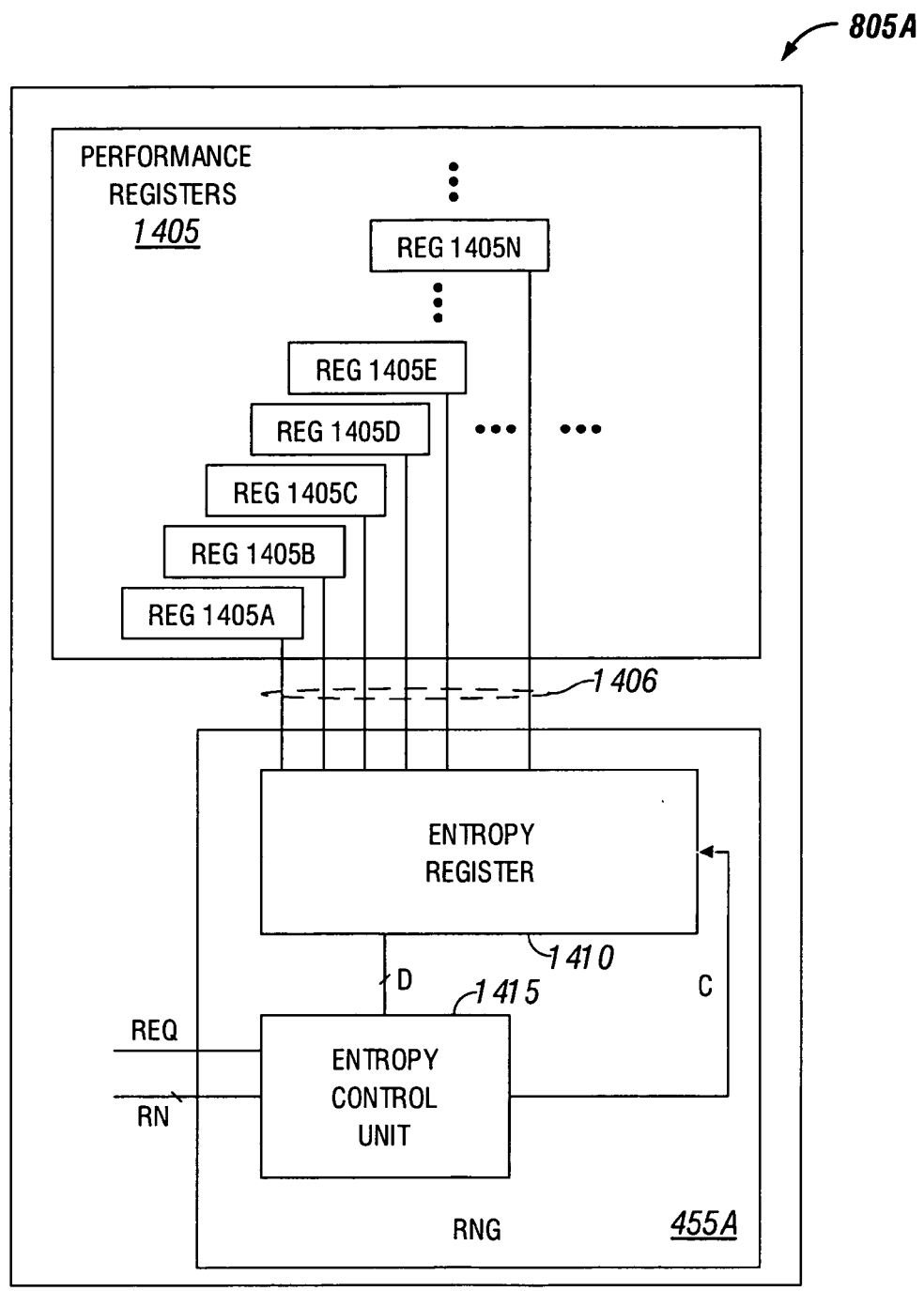
Figure 14B:
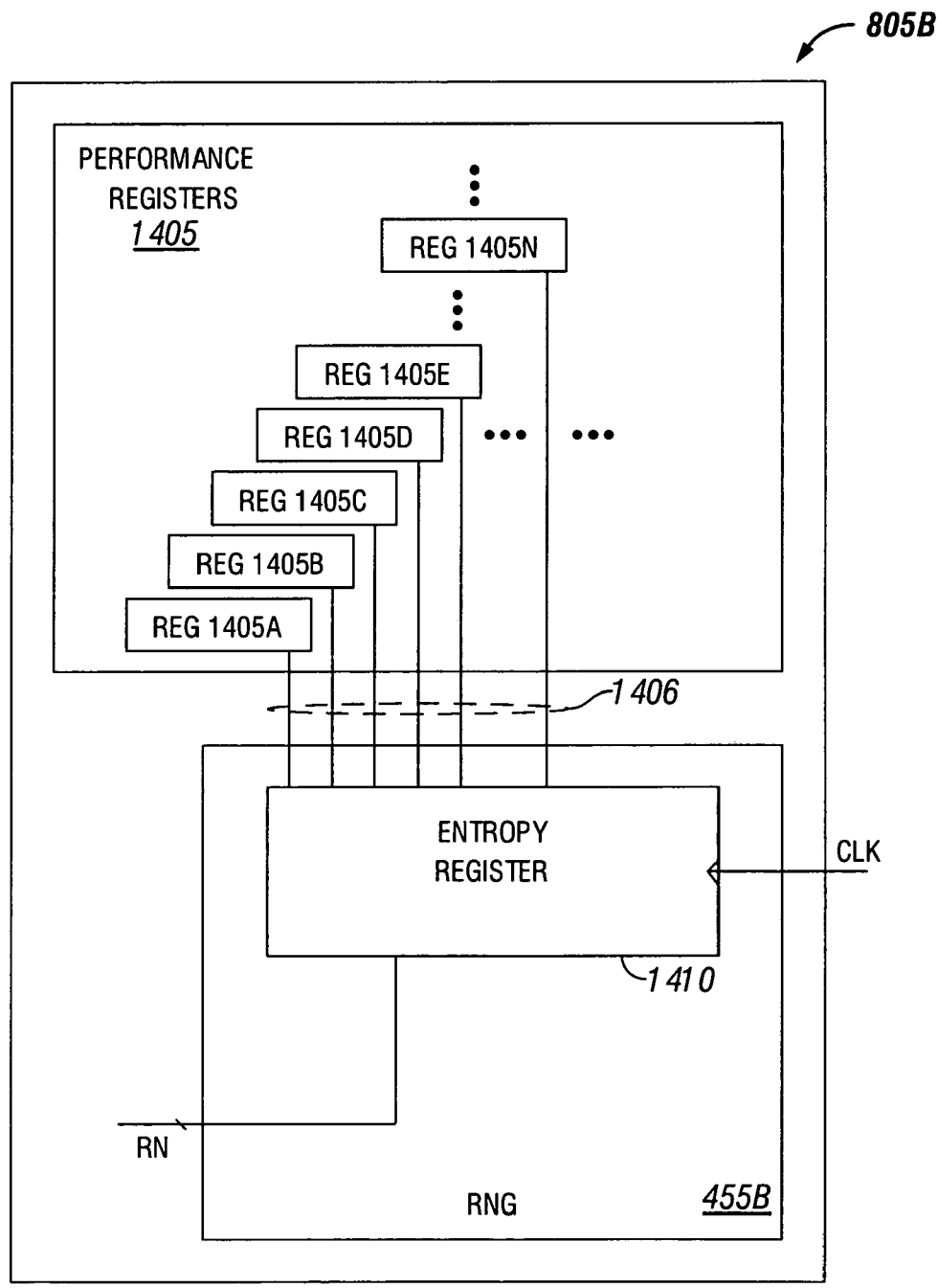
Figure 15:
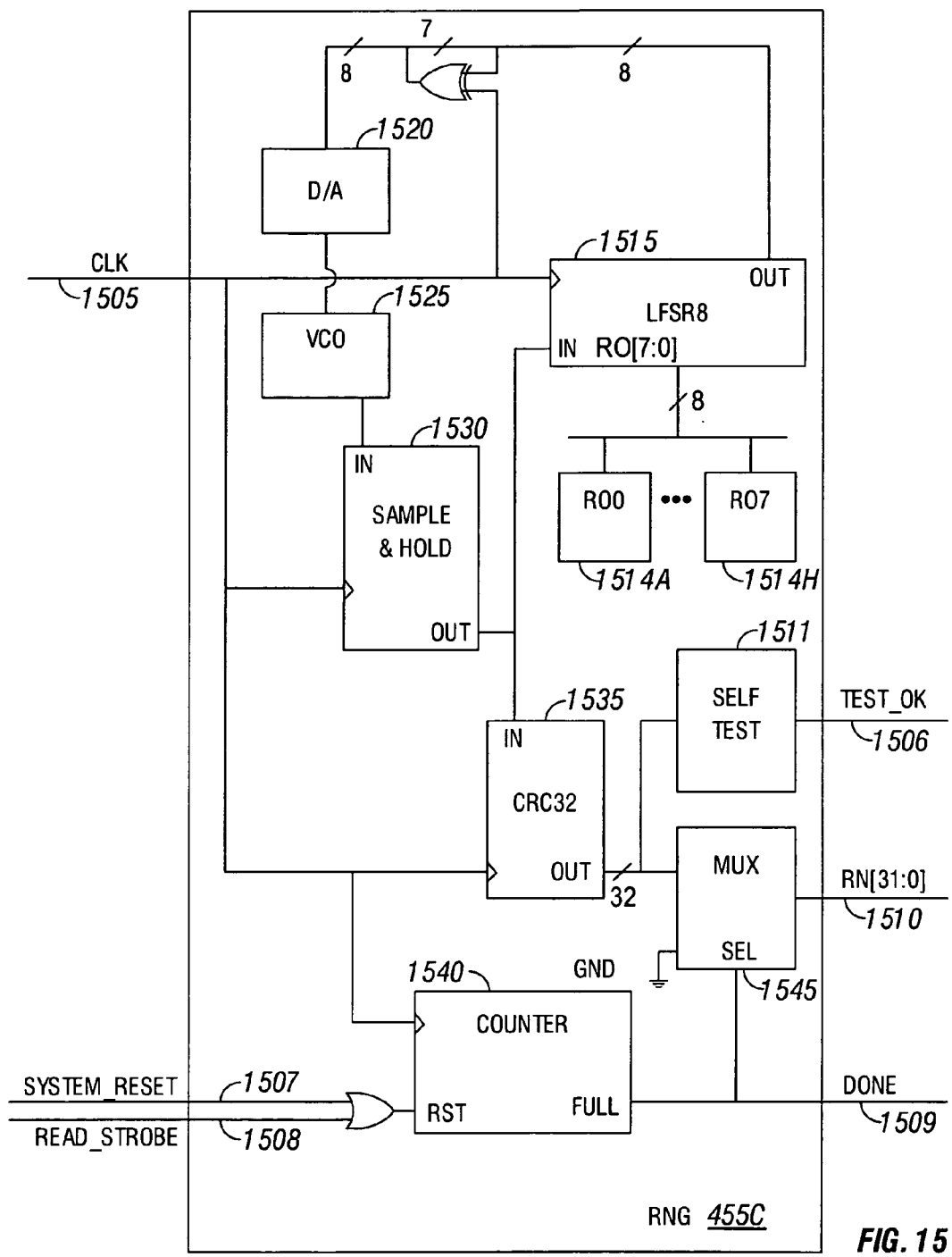
Figure 16A:
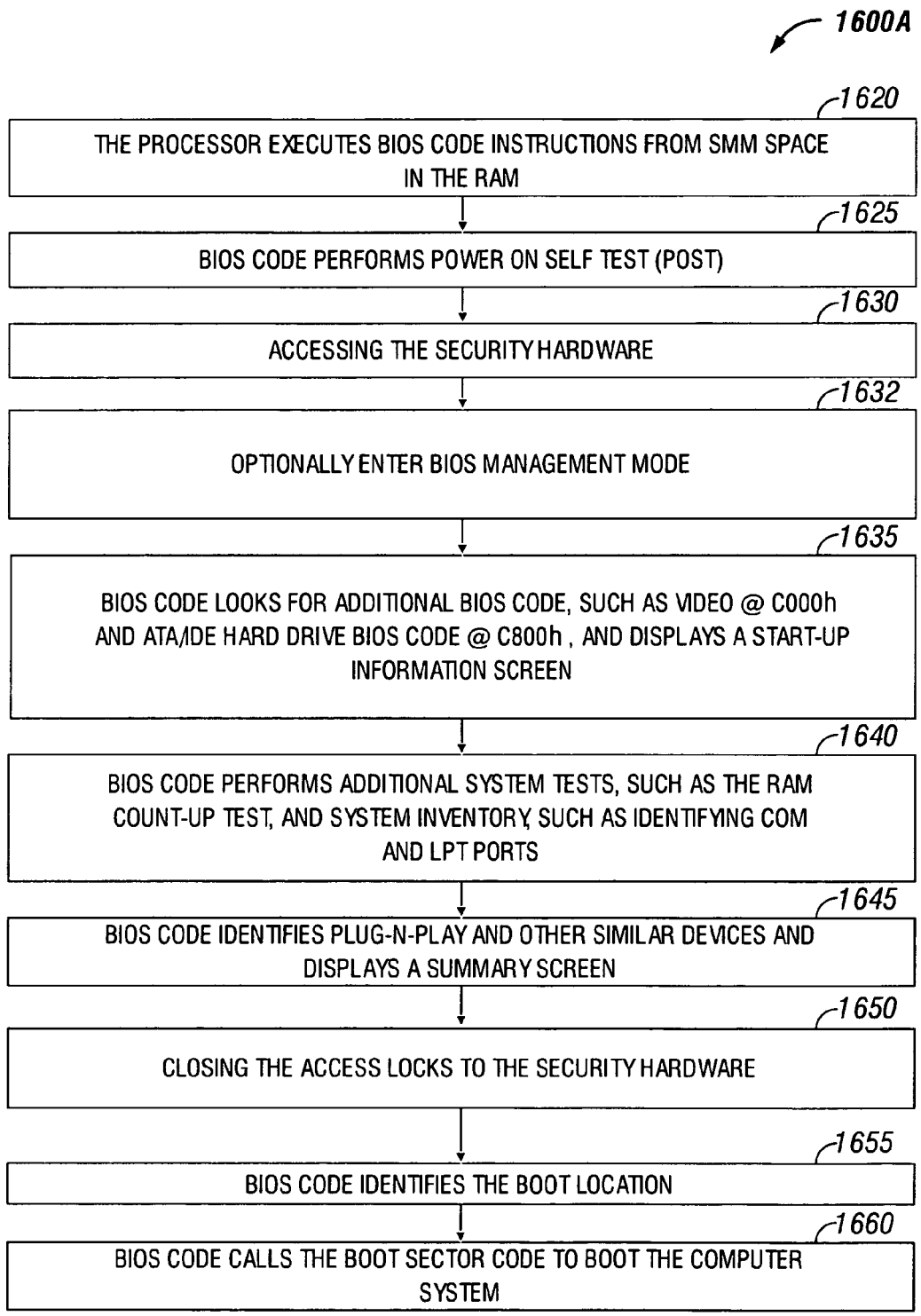
Figure 16B:
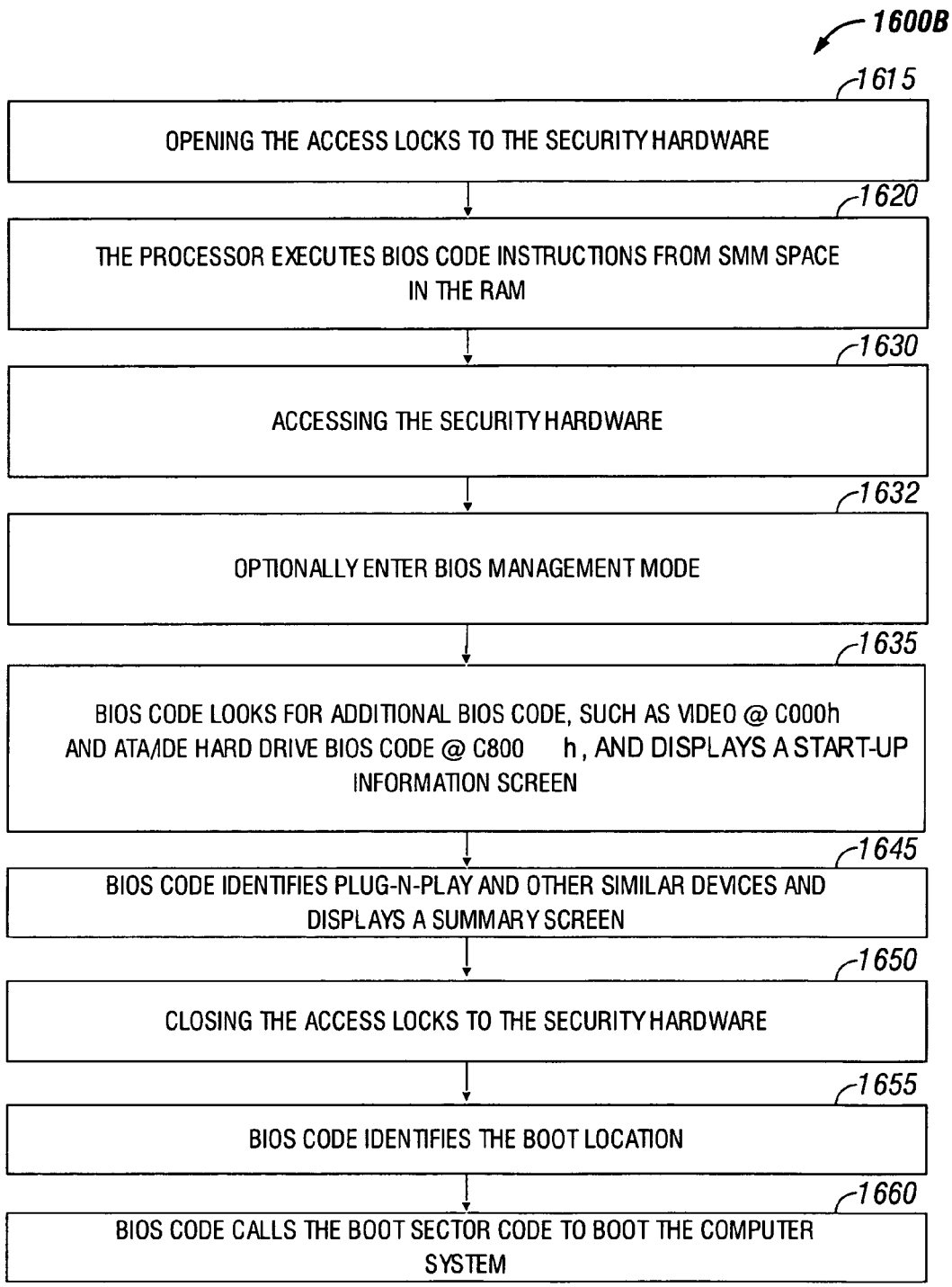
Figure 16C:
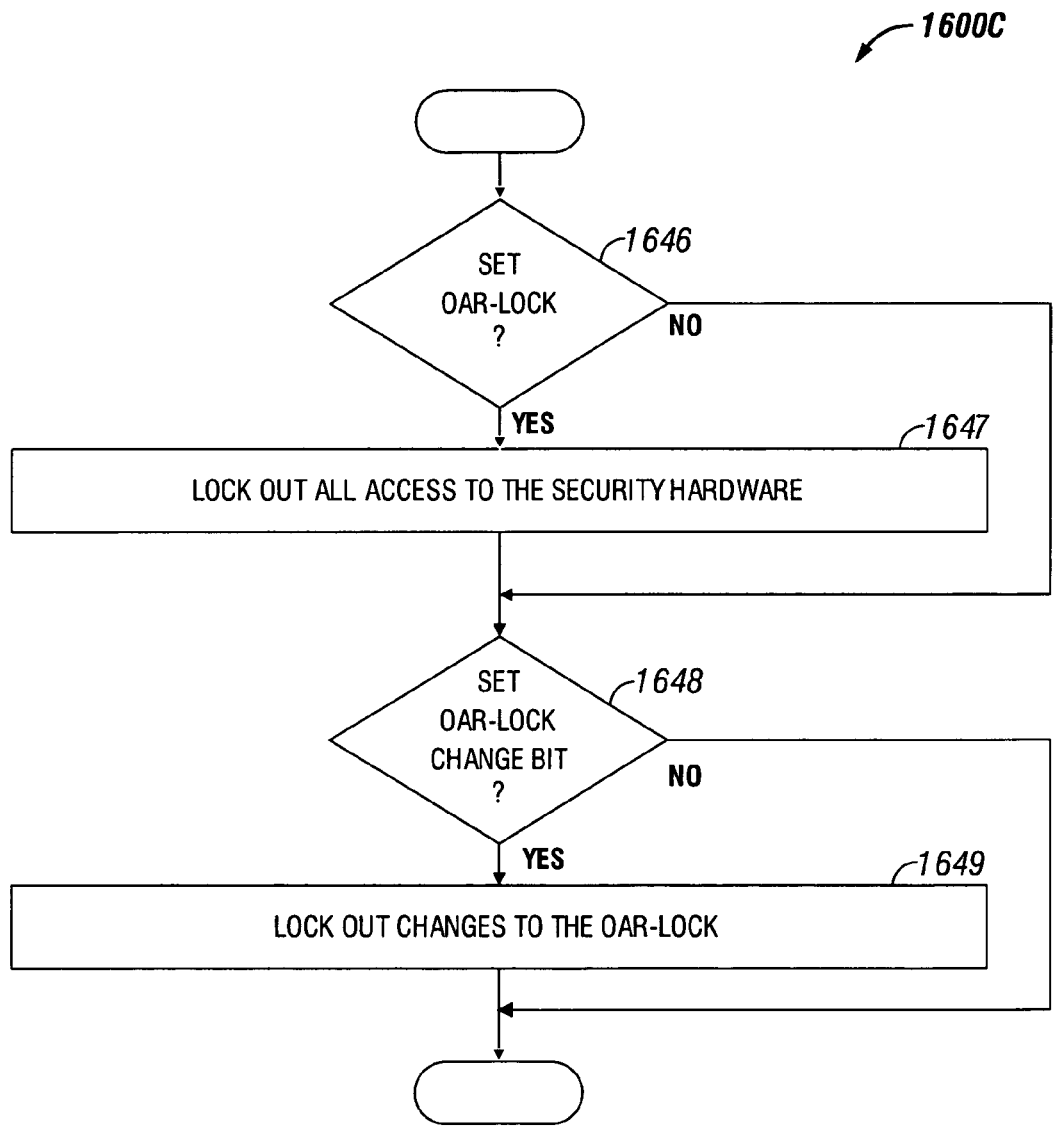
Figure 16D:
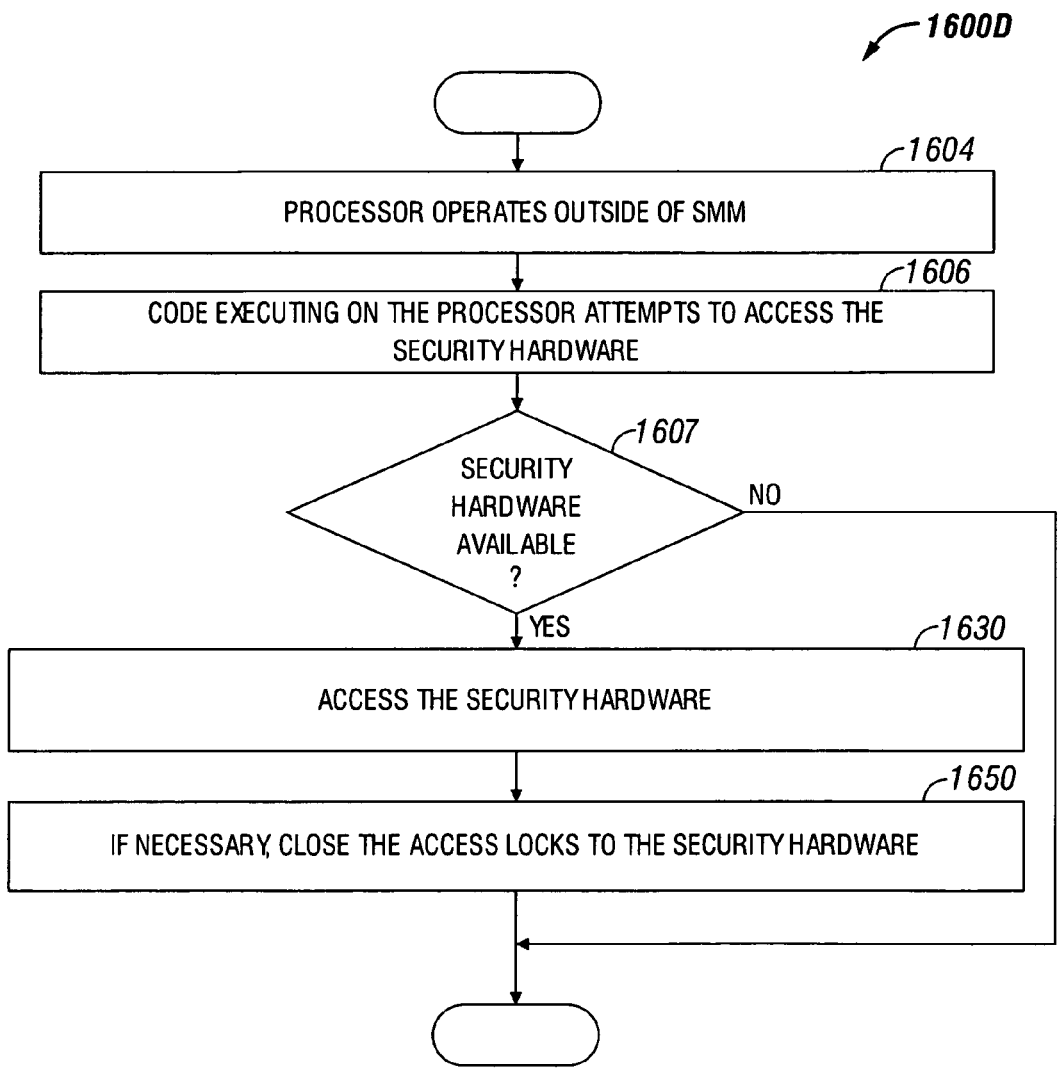
Figure 16E:
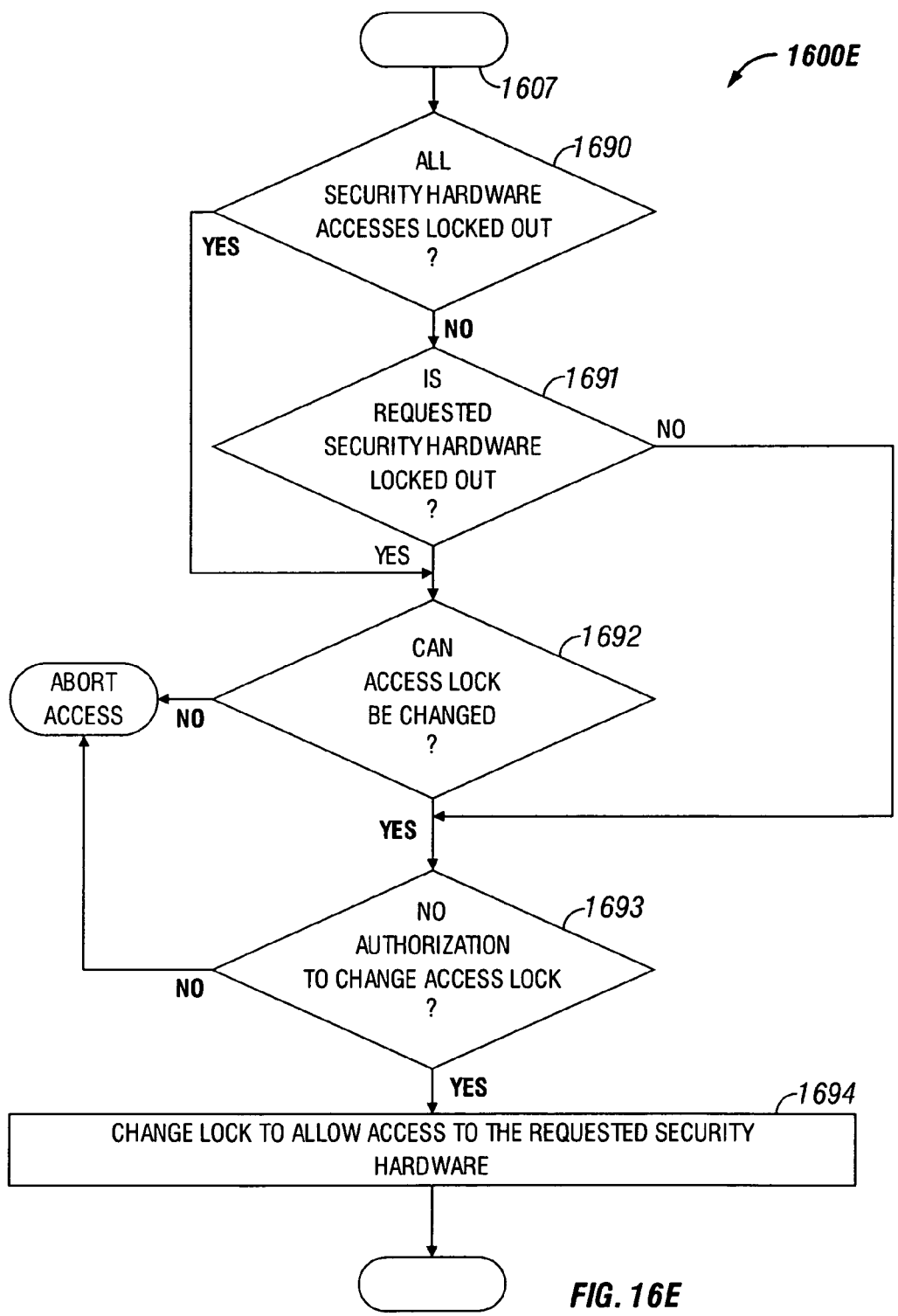
Figure 16F:
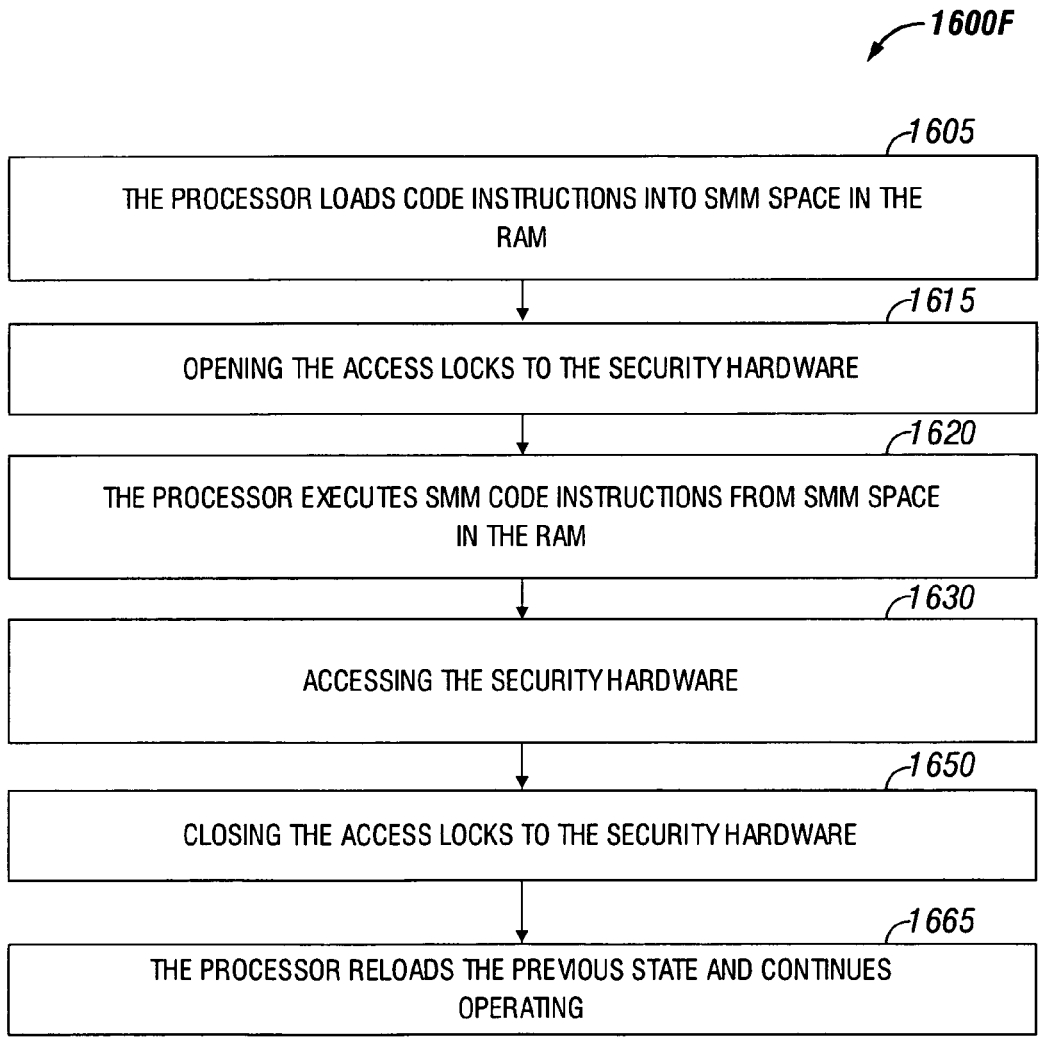
Figure 16G:
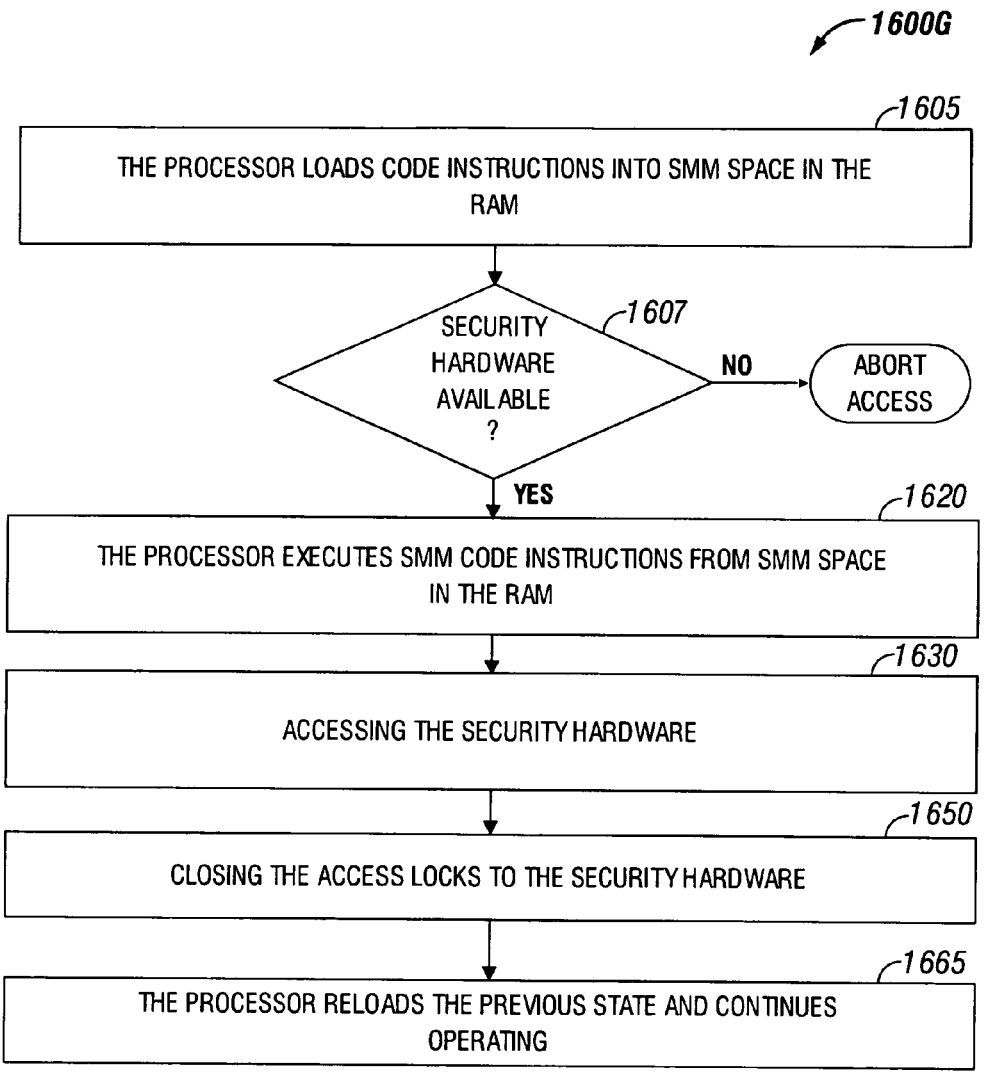
Figure 17A:
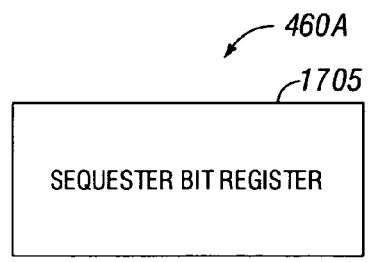
Figure 17B:
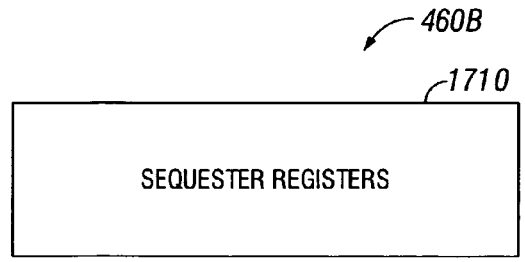
Figure 17C:
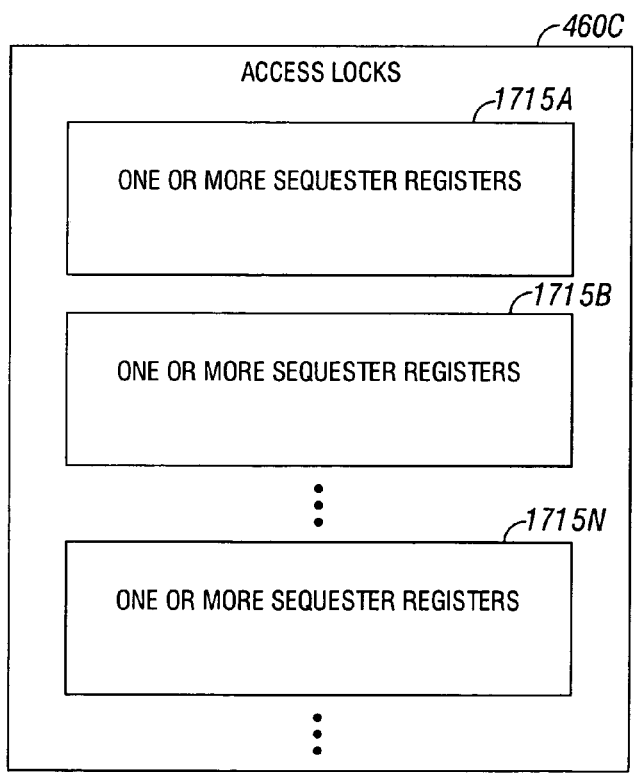
Figure 17D:
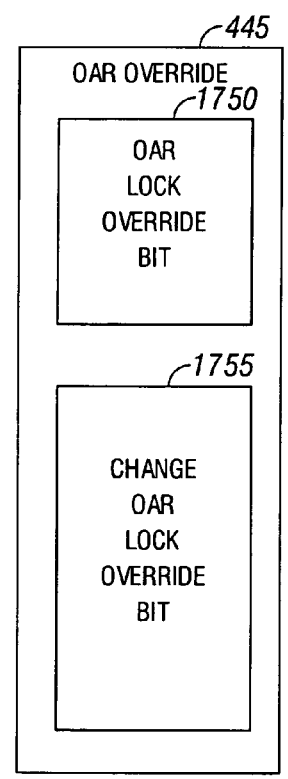

FIGS. 11A, 11B, 12, and 13 illustrate flowcharts of embodiments of methods 1100A, 1100B, 1110A, and 1120 for secure access to storage, according to various aspects of the present invention. FIG. 11A shows a flowchart of the method 1100A where a security device maintains secure access to a storage device, according to one aspect of the present invention. FIG. 11B shows a flowchart of the method 1100B where a crypto processor maintains secure access to a memory, according to one aspect of the present invention. FIG. 12 shows a flowchart of the method 1110A where a security device provides secure access control to a storage device using a challenge-response authentication protocol, according to one aspect of the present invention. FIG. 13 shows a flowchart of the method 1120 where a secret is used to unlock data access to a secure storage device.

Turning to FIG. 11A, the method 1100A includes the security device receiving a transaction request for a storage location associated with the storage device connected to the security device (block 1105A). The security device provides access control for the storage device (block 1110A). One embodiment of the access control shown in block 1110A is illustrated by the method 1100B shown in FIG. 12.

According to the method 100A, the security device maps the storage location in the transaction request according to the address mapping of the storage device (block 1115A). The security device provides the transaction request to the storage device (block 1120A). Under normal circumstances, the storage device will perform the requested transaction (block 1125A).

In various embodiments, the security device associated with the method 1100A may include a crypto processor or a block of logic configured to provide security for the storage device. The storage device may include an electronic storage medium like a memory or a magnetic or optical storage medium like a hard drive or an optical drive. The memory may include a RAM, a ROM, or a flash memory. The hard drive or optical drive may be fixed or removable. The transaction request may include, for example, a read request, a write request, or a combination of read and write requests. It is noted that in various embodiments, the memory (or the storage device) may include further security hardware of its own.

Turning to FIG. 11B, the method 1100B includes the crypto-processor receiving a transaction request for a memory location associated with the memory connected to the crypto-processor (block 1105B). The crypto-processor provides access control for the memory (block 1110B). One embodiment of the access control shown in block 1110B is illustrated in FIG. 12.

According to the method 1100B, the crypto-processor maps the memory location in the transaction request according to the address mapping of the memory (block 1115B). The crypto-processor provides the transaction request to the memory (block 1120B). Under normal circumstances, the memory will perform the requested transaction (block 1125B).

Turning to FIG. 12, the method 1110A includes the security device determining if a lock is in place for the storage location (block 1205). A transaction request may have been received for the storage location. If the lock is not in place (block 1210), then the method 1110A moves past the authentication portion. If the lock is in place (block 1210), then the security device provides a challenge for the storage location (block 1215). The challenge may be associated with the storage location or with the storage device that includes the storage location. The challenge may be in response to the transaction request. Next, the security device receives a response to the challenge (block 371220). The security device evaluates the response by comparing the response to an expected response (block 371225). If the evaluation is not correct (block 1230), then the method ends. If the evaluation is correct (block 1230), then the method proceeds with the security device providing the transaction request to the storage device (block 1235).

In various embodiments, the security device associated with the method 1110A may include a crypto processor or a block of logic configured to provide security for the storage device. The storage device may include an electronic storage medium like a memory or a magnetic or optical storage medium like a hard drive or an optical drive. The memory may include a RAM, a ROM, or a flash memory. The hard drive or optical drive may be fixed or removable. The transaction request may include, for example, a read request, a write request, or a combination of read and write requests.

Turning to FIG. 13, the method 1120 includes storing a secret in a storage device (block 1305). The storage device may include only a portion of a physical device. The storage device itself may be embodied as any storage device known in the art. The method 1120 may also include storing data in the storage device (block 1310) and storing code in the storage device (block 1315). The method 1120 may also include providing a lock (e.g. a lock bit or bits) to secure data stored in the storage device or the storage device itself (block 1315). Note that the above steps of method 1120 (blocks 1305–1320) may be performed relatively proximate in time, such as when the storage device is manufactured, installed, or initialized.

The method 1120 also includes reading the secret from the storage device (block 1325), such as, for example, when the computer system including the storage device or coupled to communicate with the storage device is booted. For the secret to remain secure, the reading of the secret preferably occurs when the storage device is in a secure or trusted configuration. The method 361120 may also read the code from the storage device (block 1330). The method 1120 stores the secret in a secure location (block 1325) and also may store the code in the secure location (block 1330). The secure location may be in the SMM memory space previously described, or in a secure memory, register, or other storage location in the computer system 100, such as in the processor 102 or in the south bridge 330.

In various embodiments, the storage device associated with the method 1120 may include an electronic storage medium like a memory or a magnetic or optical storage medium like a hard drive or an optical drive. The memory may include a RAM, a ROM, or a flash memory. The hard drive or optical drive may be fixed or removable. A read in method 1120 may describe any transaction request, such as, for example, a read request, a write request, or a combination of read and write requests.

For the purposes of this disclosure, references to ROM are to be construed as also applying to flash memory and other substantially non-volatile memory types. Note that while the methods of the present invention disclosed herein have been illustrated as flowcharts, various elements of the flowcharts may be omitted or performed in different order in various embodiments. Note also that the methods of the present invention disclosed herein admit to variations in implementation.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A computer system, comprising:
    a bus;
    a memory coupled to the bus, wherein the memory includes a plurality of storage locations, wherein the plurality of storage locations are divided into a plurality of memory units; and
    a device coupled to access the memory over the bus, the device being configured to determine whether the computer system is operating in a system management mode (SMM), and wherein the device includes one or more locks configured to control access to one or more of the plurality of memory units based on the determination of whether the computer system is operating in the system management mode (SMM).

2. The computer system of claim 1, wherein the bus is configured to operate according to a low pin count (LPC) bus protocol.

3. The computer system of claim 1, wherein the memory is a ROM.

4. The computer system of claim 3, wherein the ROM is a BIOS ROM.

5. The computer system of claim 1, wherein the device is a south bridge.

6. The computer system of claim 1, wherein the locks include a plurality of registers, wherein one or more entries in one or more of the plurality of registers indicate an access control setting for one or more of the memory units.

7. The computer system of claim 6, wherein at least one of the plurality of registers is configured to store three locking bits for one of the memory blocks, wherein the three locking bits include a read lock bit, a write lock bit, and a lock-down bit, wherein the read lock bit and the write lock bit are permanent until reset when the lock-down bit is set.

8. The computer system of claim 6, wherein at least one of the plurality of registers is configured to store eight bits, wherein the eight bits include three locking bits for one of the memory blocks and another three locking bits for another one of the memory blocks, wherein the three locking bits include a first read lock bit, a first write lock bit, and a first lock-down bit, wherein when the first lock-down bit is set, the first read lock bit and the first write lock bit are permanent until reset, and wherein the another three locking bits include a second read lock bit, a second write lock bit, and a second lock-down bit, wherein when the second lock-down bit is set, the second read lock bit and the second write lock bit are permanent until reset.

9. The computer system of claim 8, wherein the at least one of the plurality of registers is configured with bit 0 as the first write lock bit, bit 1 as the first lock-down bit, bit 2 as the first read lock bit, bit 4 as the second write lock bit, bit 5 as the second lock-down bit, and bit 6 as the second read lock bit.

10. A method for operating a computer system, the method comprising:
    requesting a memory transaction for one or more memory addresses;
    determining a lock status for the one or more memory addresses;
    returning the lock status for the one or more memory addresses;
    determining whether the computer system is operating in a system management mode (SMM);
    determining, based on the determination of whether the computer system is operating in the system management mode(SMM), if the lock status for the one or more memory addresses can be changed if the lock status indicates that the memory transaction for the one or more memory addresses is not allowed;
    changing the lock status of the one or more memory addresses to allow the memory transaction if the lock status of the one or more memory addresses can be changed.

11. The method of claim 10, wherein determining a lock status includes reading a first lock bit; and wherein returning the lock status includes returning the value of the first lock bit.

12. The method of claim 11, wherein determining if the lock status for the one or more memory address can be changed includes reading a second lock bit.

13. The method of claim 12, wherein changing the lock status of the one or more memory addresses to allow the memory transaction includes changing the value of the first lock bit.

14. A computer system, comprising:
- means for requesting a memory transaction for one or more memory addresses;
- means for determining a lock status for the one or more memory addresses;
- means for returning the lock status for the one or more memory addresses;
- means for determining whether the computer system is operating in a system management mode (SMM);
- means for determining, based on the determination of whether the computer system is operating in the system management mode (SMM), if the lock status for the one or more memory addresses can be changed if the lock status indicates that the memory transaction for the one or more memory addresses is not allowed;
- means for changing the lock status of the one or more memory addresses to allow the memory transaction if the lock status of the one or more memory addresses can be changed.

15. The computer system of claim 14, wherein the means for determining the lock status comprises means for reading a first lock bit; and wherein the means for returning the lock status includes means for returning the value of the first lock bit.

16. The computer system of claim 15, wherein determining if the lock status for the one or more memory address can be changed includes reading a second lock bit.

17. The computer system of claim 16, wherein the means for changing the lock status of the one or more memory addresses to allow the memory transaction includes means for changing the value of the first lock bit.

18. A computer readable program storage device encoded with instructions that, when executed by a computer system, performs a method of operating the computer system, the method comprising:
- requesting a memory transaction for one or more memory addresses;
- determining a lock status for the one or more memory addresses;
- returning the lock status for the one or more memory addresses;
- determining whether the computer system is operating in a system management mode (SMM);
- determining, based on the determination of whether the computer system is operating in the system management mode (SMM), if the lock status for the one or more memory addresses can be changed if the lock status indicates that the memory transaction for the one or more memory addresses is not allowed;
- changing the lock status of the one or more memory addresses to allow the memory transaction if the lock status of the one or more memory addresses can be changed.

19. The computer readable program storage device of claim 18, wherein determining a lock status includes reading a first lock bit; and wherein returning the lock status includes returning the value of the first lock bit.

20. The computer readable program storage device of claim 19, wherein determining if the lock status for the one or more memory address can be changed includes reading a second lock bit.

21. The computer readable program storage device of claim 20, wherein changing the lock status of the one or more memory addresses to allow the memory transaction includes changing the value of the first lock bit.

* * * * *